US011905008B2

(12) United States Patent
Rosen

(10) Patent No.: US 11,905,008 B2
(45) Date of Patent: Feb. 20, 2024

(54) VTOL AIRCRAFT

(71) Applicant: Air Vev Ltd, Pardes Hana (IL)

(72) Inventor: Chen Rosen, Mishmarot (IL)

(73) Assignee: Air Vev Ltd, Pardes Hana (IL)

( * ) Notice: Subject to any disclaimer, the term of this patent is extended or adjusted under 35 U.S.C. 154(b) by 408 days.

(21) Appl. No.: 17/419,797

(22) PCT Filed: Dec. 30, 2019

(86) PCT No.: PCT/IL2019/051433
§ 371 (c)(1),
(2) Date: Jun. 30, 2021

(87) PCT Pub. No.: WO2020/141513
PCT Pub. Date: Jul. 9, 2020

(65) Prior Publication Data
US 2022/0089279 A1    Mar. 24, 2022

Related U.S. Application Data

(60) Provisional application No. 62/786,564, filed on Dec. 31, 2018.

(51) Int. Cl.
*B64C 29/00* (2006.01)
*B64C 39/02* (2023.01)
(Continued)

(52) U.S. Cl.
CPC ........ *B64C 29/0033* (2013.01); *B64C 39/024* (2013.01); *B64U 10/10* (2023.01); *B64U 30/20* (2023.01)

(58) Field of Classification Search
CPC ... B64C 29/0033; B64C 39/024; B64C 29/02; B64U 10/10; B64U 30/20; B64U 10/00
See application file for complete search history.

(56) References Cited

U.S. PATENT DOCUMENTS 3,503,574 A   3/1970  Eickmann
8,602,348 B2  12/2013 Bryant
(Continued)

FOREIGN PATENT DOCUMENTS

BE    481057     7/1948
CN    206456557  9/2017
(Continued)

OTHER PUBLICATIONS

Communication Pursuant to Article 94(3) EPC dated Apr. 4, 2023 From the European Patent Office Re. Application No. 19835830.1 (6 Pages).
(Continued)

*Primary Examiner* — Valentina Xavier

(57) ABSTRACT

A VTOL aircraft comprising a plurality of motor assemblies, each configured to generate thrust by movement of air past the motor assembly along a respective axis of thrust of the motor assembly, and a wing, wherein 1) the orientations of the axes of thrust are each fixed, during operation of the aircraft, at a constant respective pitch angle oblique to a pitch orientation of the wing; 2) the plurality of motor assemblies is operable together to both fully support the aircraft in a hovering mode, and to propel the aircraft forward in a forward flight mode; 3) the wing does not intersect with any right cylinder centered on any motor assembly and having a central longitudinal axis aligned with the axis of thrust of the motor assembly, and having a radius equal to a radius of a propeller of the motor assembly.

20 Claims, 24 Drawing Sheets

Top view

Side view

◄---Flight Direction

(51) Int. Cl.
*B64U 10/10* (2023.01)
*B64U 30/20* (2023.01)

(56) References Cited

U.S. PATENT DOCUMENTS

| | | | |
|---|---|---|---|
| 8,733,690 | B2 | 5/2014 | Bevirt et al. |
| 9,873,508 | B2 | 1/2018 | Apkarian |
| 2010/0051740 | A1 | 3/2010 | Yoeli |
| 2011/0315809 | A1* | 12/2011 | Oliver .................... B64C 39/08 244/12.4 |
| 2012/0228972 | A1 | 9/2012 | Moya et al. |
| 2012/0286102 | A1 | 11/2012 | Sinha et al. |
| 2014/0158815 | A1 | 6/2014 | Renteria |
| 2015/0028151 | A1 | 1/2015 | Bevirt et al. |
| 2015/0175260 | A1 | 6/2015 | Hesselbarth |
| 2016/0236775 | A1 | 8/2016 | Eshkenazy et al. |
| 2016/0347447 | A1 | 12/2016 | Judas et al. |
| 2018/0331603 | A1 | 11/2018 | Jahshan |
| 2020/0317332 | A1* | 10/2020 | Didey .................... B64C 39/08 |
| 2021/0323662 | A1* | 10/2021 | Giurca ................ B64C 39/068 |

FOREIGN PATENT DOCUMENTS

| | | |
|---|---|---|
| DE | 102014000509 | 7/2015 |
| EP | 2604519 | 6/2013 |
| JP | 2014-528382 | 10/2014 |
| JP | 2017-525621 | 9/2017 |
| KR | 10-2015-0058197 | 5/2015 |
| KR | 10-1727019 | 4/2017 |
| WO | WO 2018/099856 | 6/2018 |
| WO | WO 2018/134795 | 7/2018 |
| WO | WO 2018/165057 | 9/2018 |
| WO | WO 2018/208596 | 11/2018 |
| WO | WO 2020/141513 | 7/2020 |
| WO | WO 2020/141513 A8 | 7/2021 |

OTHER PUBLICATIONS

Translation Dated Aug. 14, 2023 of Notice of Reason(s) for Rejection dated Aug. 1, 2023 From the Japan Patent Office Re. Application No. 2021-538771. (3 pages).
Notice of Reason(s) for Rejection dated Aug. 1, 2023 From the Japan Patent Office Re. Application No. 2021-538771. (2 pages).
International Preliminary Report on Patentability dated Jul. 15, 2021 From the International Bureau of WIPO Re. Application No. PCT/IL2019/051433. (17 Pages).
International Search Report and the Written Opinion dated Jul. 6, 2020 From the International Searching Authority Re. Application No. PCT/IL2019/051433. (26 Pages).
Invitation to Pay Additional Fees, Communication Relating to the Results of the Partial International Search and the Provisional Opinion dated Mar. 25, 2020 From the International Searching Authority Re. Application No. PCT/IL2019/051433. (15 Pages).
Kamal et al. "Design Methodology for Hybrid (VTOL + Fixed Wing) Unmanned Aerial Vehicles", Aeronautics and Aerospace Open Access Journal, 2(3): 165-176, Published Online Jun. 6, 2018.

* cited by examiner

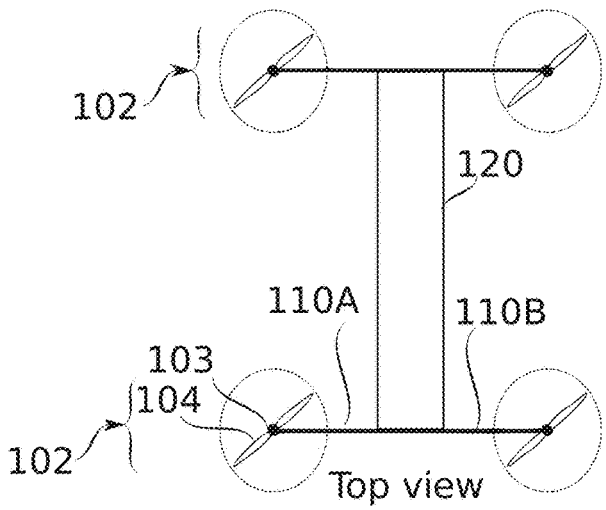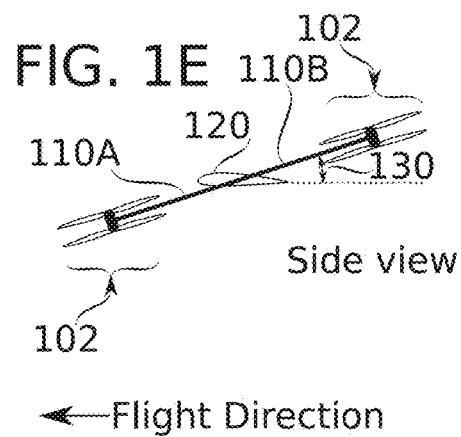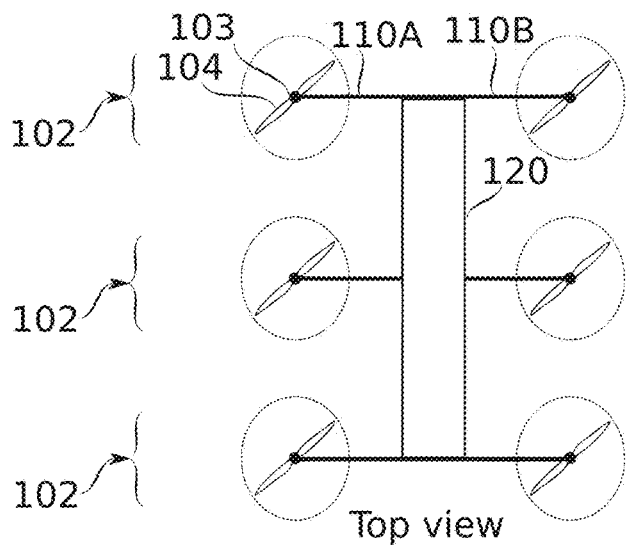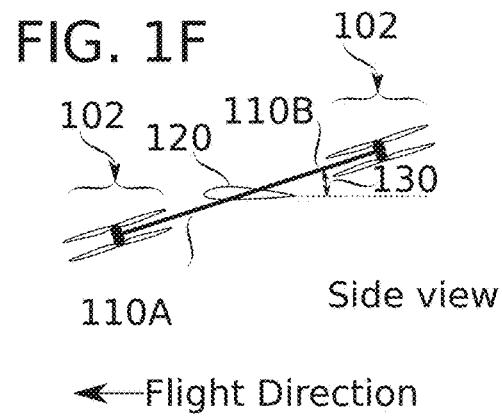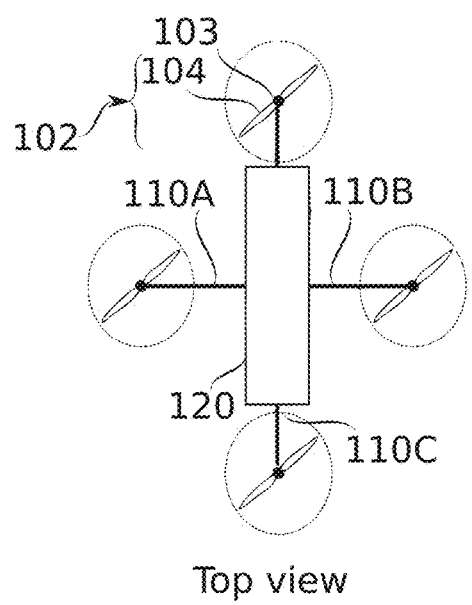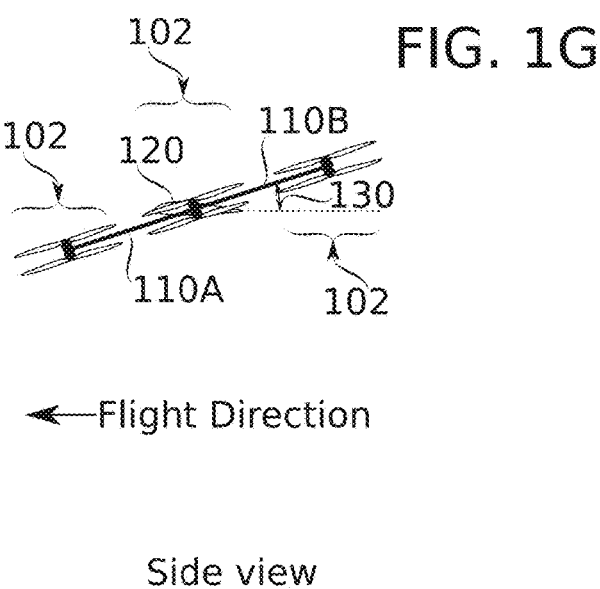

Top view

Side view

←— Flight Direction

Top view

Side view

←— Flight Direction

←Flight Direction

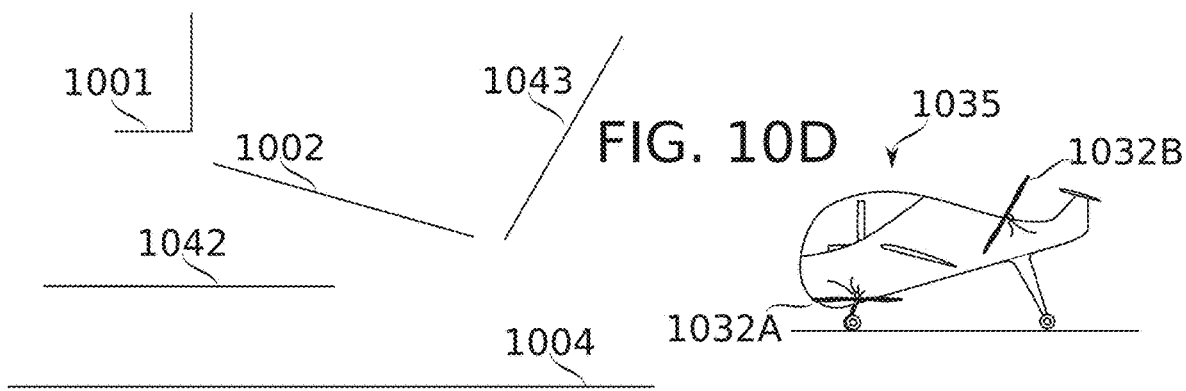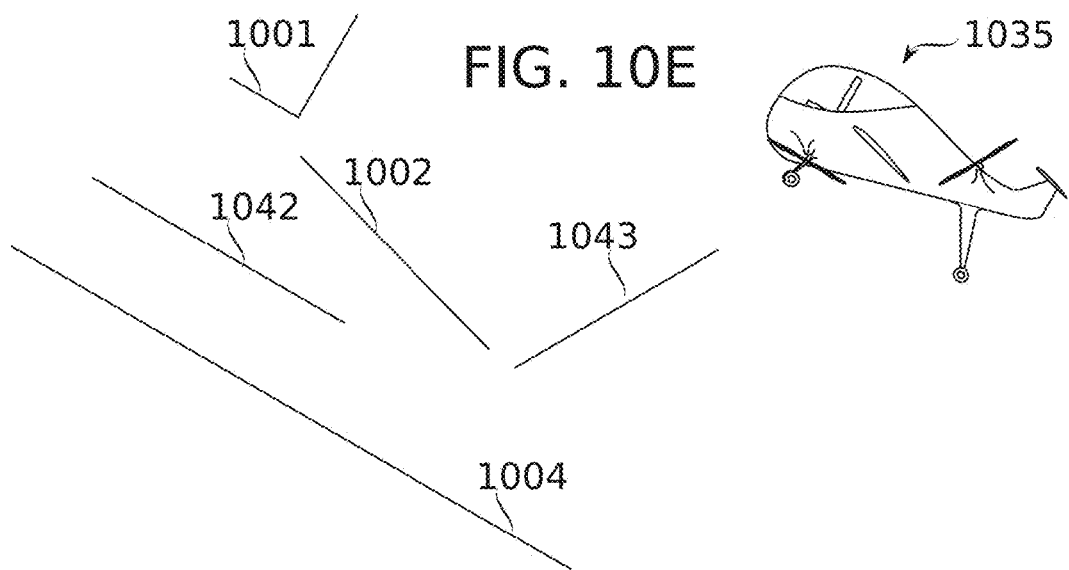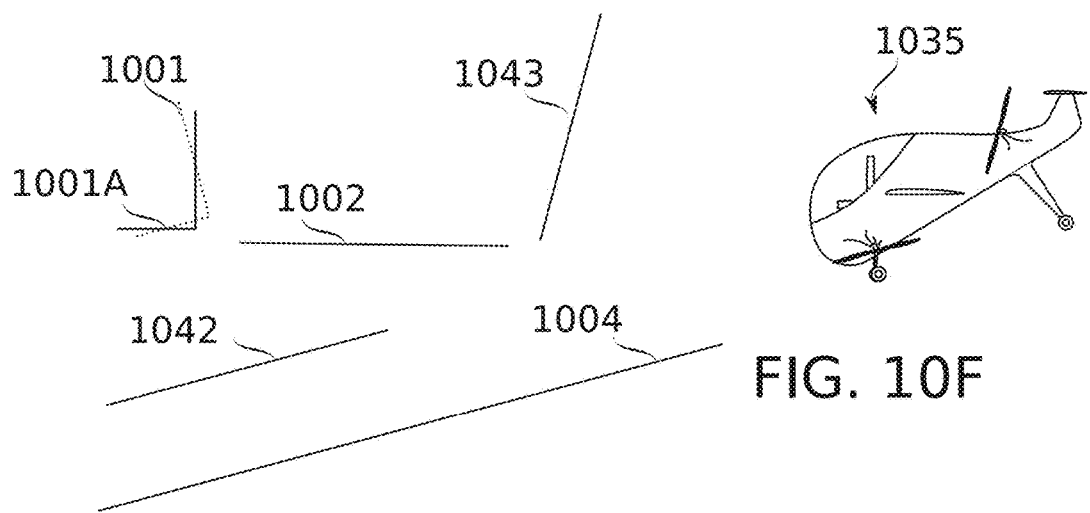

VTOL AIRCRAFT

RELATED APPLICATIONS

This application is a National Phase of PCT Patent Application No. PCT/IL2019/051433 having International filing date of Dec. 30, 2019, which claims the benefit of priority under 35 USC § 119(e) of U.S. Provisional Patent Application No. 62/786,564 filed on Dec. 31, 2018. The contents of the above applications are all incorporated by reference as if fully set forth herein in their entirety.

FIELD AND BACKGROUND OF THE INVENTION

The present invention relates to the field of airborne and flying vehicles, and, more particularly, to an electrically powered aircraft having vertical take-off and landing as well as stationary flight capabilities.

Multicopter aircraft designs use a plurality of power source-driven propellers to provide vertical lift and/or horizontal thrust. Multicopters are used and/or proposed for use in a range of applications including cargo and/or passenger transport.

Practical multicopters are enabled by technologies such as computerized control and/or sensing electronics, relatively lightweight and powerful electric motors, improvements in battery storage energy-to-weight ratios, and/or improvements to electricity generating using relatively lightweight generators.

Multicopters benefit in particular from a reduced or eliminated need to generate horizontal velocity before take-off. Lift generated from a fixed wing efficiently converts forward momentum into vertical thrust that can maintain an aircraft aloft. Several built and proposed aircraft designs merge vertical takeoff and/or landing capability using propeller-generated thrust with lift generated by a fixed wing in forward flight.

SUMMARY OF THE INVENTION

According to an aspect of some embodiments of the present disclosure, there is provided an aircraft including: a plurality of motor assemblies, each configured to generate thrust by movement of air past the motor assembly along a respective axis of thrust of the motor assembly; and a wing; wherein: the orientations of the axes of thrust are each fixed, during operation of the aircraft, at a constant respective pitch angle oblique to a pitch orientation of the wing; the plurality of motor assemblies is operable together to both fully support the aircraft in a hovering mode, and to propel the aircraft forward in a forward flight mode; and each motor assembly is positioned where the wing does not intersect the flow of air before entering or after leaving the motor assembly in a direction along the respective axis of thrust, within a radius of the motor assembly.

According to some embodiments of the present disclosure, the wing is configured to provide at least 25% of lift needed to support the weight of the aircraft during forward flight, at a speed above 55 km/h generated by thrust from the plurality of motor assemblies.

According to some embodiments of the present disclosure, the wing provides at least 50% of lift needed to support the aircraft against the acceleration of gravity during forward flight, at a speed generated by thrust from the plurality of motor assemblies.

According to some embodiments of the present disclosure, the axes of thrust are oriented between about 55°-80° away from the pitch orientation of the wing.

According to some embodiments of the present disclosure, the axes of thrust are oriented between about 65°-70° away from the pitch orientation of the wing.

According to some embodiments of the present disclosure, the wing is positioned between at least two of the plurality of motor assemblies along an axis of roll of the aircraft.

According to some embodiments of the present disclosure, at least one of the plurality of motor assemblies is located ahead of a center of gravity of the aircraft and below the wing, and at least one of the plurality of motor assemblies is located behind the center of gravity of the aircraft and above the wing.

According to some embodiments of the present disclosure, the plurality of motor assemblies include at least one motor assembly attached to the aircraft on either side of a center of gravity of the aircraft, along a roll axis of the aircraft.

According to some embodiments of the present disclosure, the plurality of motor assemblies is operable to fully support the aircraft during ground-stationary hovering of the aircraft.

According to some embodiments of the present disclosure, the plurality of motor assemblies is operable to provide horizontal thrust to the aircraft, while fully supporting the weight of the aircraft.

According to some embodiments of the present disclosure, the plurality of motor assemblies is operable to provide horizontal thrust to the aircraft, while fully supporting the aircraft against downward acceleration due to gravity, and while the aircraft is pitched with the wing at its most efficient angle of attack.

According to some embodiments of the present disclosure, each of the plurality of motor assemblies is mounted at the same oblique pitch angle relative to the pitch orientation of the wing.

According to some embodiments of the present disclosure, at least two of the plurality of motor assemblies is mounted within a span of the wing.

According to some embodiments of the present disclosure, the wing is configured to provide less than 100% of lift needed to support the weight of the aircraft during forward flight.

According to some embodiments of the present disclosure, the aircraft is configured to rotate through a pitch angle from a hovering orientation using thrust from the plurality of motor assemblies to a forward flight orientation with the wing at its most efficient angle of attack, while the motor assemblies fully support the aircraft against downward acceleration due to gravity.

According to some embodiments of the present disclosure, the aircraft is configured to rotate through a pitch angle from a grounded orientation of the aircraft resting on level ground to a hovering orientation using thrust from the plurality of motor assemblies by pitching a nose of the aircraft upward.

According to some embodiments of the present disclosure, the aircraft is configured to rotate through a pitch angle from a hovering orientation using thrust from the plurality of motor assemblies to a forward flight orientation with the wing at its most efficient angle of attack by pitching a nose of the aircraft downward.

According to some embodiments of the present disclosure, the aircraft is sized to carry at least one human passenger.

According to some embodiments of the present disclosure, the motor assemblies are rotors including a power source and a propeller rotated by the power source.

According to some embodiments of the present disclosure, the motor assemblies are attached to the aircraft through the fuselage.

According to some embodiments of the present disclosure, the oblique pitch angles between the axes of thrust and the pitch orientation of the wing are less than 75°.

According to some embodiments of the present disclosure, the power source includes an electric motor, aligned coaxially with the propeller.

According to some embodiments of the present disclosure, the oblique pitch angles between the axes of thrust and the pitch orientation of the wing are greater than 45°.

According to some embodiments of the present disclosure, a plane of contact of the landing gear with the ground with the aircraft at rest on the ground is oblique to both the pitch orientation of the wing and the axes of thrust of the plurality of motor assemblies.

According to an aspect of some embodiments of the present disclosure, there is provided a method of launching an aircraft from ground to forward flight, including: exerting thrust from motor assemblies of the aircraft at a pitch angle oblique to the ground, starting from a fully grounded position of the aircraft; reorienting the thrust from the motor assemblies of the aircraft to a pitch angle perpendicular to the ground while maintaining contact with the ground; and reorienting the thrust from the motor assemblies oblique to the ground to accelerate the aircraft horizontally; wherein the motor assemblies are attached to a frame of the aircraft, and each reorienting includes reorienting the frame of the aircraft.

According to some embodiments of the present disclosure, the aircraft includes a fixed wing, fixed in orientation with respect to at least 50% of the mass of the aircraft, and including rotating the wing, by rotation of the aircraft, from a fully grounded pitch angle position oblique to its level-flight orientation, to a pitch angle still more oblique from its level-flight orientation while the aircraft is in the air, and then to the level-flight orientation of the aircraft during forward motion of the aircraft.

According to an aspect of some embodiments of the present disclosure, there is provided a self-tilting rotor mounting assembly of an aircraft, including: a pivoting bar attached to the aircraft, and configured to pivot, relative to the aircraft, around a pivot axis parallel to a pitch axis of the aircraft; a plurality of rotors, mounted on the pivoting bar on either side of the pivot axis; wherein the rotors are operable to pivot the bar around the pivot axis.

According to some embodiments of the present disclosure, a pivoting angle range of the pivoting bar relative to the aircraft is mechanically limited between a more horizontal angle which directs thrust from the rotors to a more vertical direction, and a more vertical angle which directs thrust from the rotors to a more horizontal direction.

According to some embodiments of the present disclosure, the pivot axis is located behind a center of gravity of the aircraft and a center of aerodynamic lift of the aircraft, and configured so that weight of the aircraft holds the pivoting bar in the more horizontal angle during hovering flight, and so that the aerodynamic lift relieves the weight of the aircraft during forward motion of the aircraft, allowing the pivot bar to rotate in a pitch downward direction without pitching the aircraft downward.

According to some embodiments of the present disclosure, the pivot is configured with a resistance that slows pivoting when the rotors operate to pivot the bar around the pivot axis.

According to an aspect of some embodiments of the present disclosure, there is provided a variable blade-pitch rotor, including: a first and a second electrical motor, each including a stator and a rotor, and each electrical motor being coaxially arranged with respect to the other; a plurality of propeller blades, each attached to the rotor of each of the first and second electrical motors; wherein a pitch of the propeller blades is altered according to a relative angular position of the rotors of the first and second electrical motors.

According to some embodiments of the present disclosure, a change in the relative angular position of the rotors induces one of the group consisting of: rotation of respective gears to which each of the propeller blades is mounted; and movement of respective levers to which each of the propeller blades is mounted.

According to some embodiments of the present disclosure, the pivoting bar converts between the more horizontal angle and the more vertical angle by rotating in a pitch-downward direction, relative to the aircraft.

According to some embodiments of the present disclosure, the propeller blade pitch is configured to adjust blade pitch from a minimum pitch to a maximum pitch within less than a second.

According to an aspect of some embodiments of the present disclosure, there is provided a guarded propeller of a winged aircraft, including a guard surrounding a propeller within a plane of rotation of the propeller; wherein the guard is shaped as an oblique circular cylinder having a top side and a bottom side, such that walls at a leading side and a trailing side of the guard are oriented from top to bottom generally parallel to a wing-plane of the aircraft, and walls on either lateral side of the guard are oriented from top to bottom oblique to the wing plane of the aircraft.

According to some embodiments of the present disclosure, the leading side and trailing side of the guard are shaped with an airfoil cross-section, each having a relative more blunted leading edge, and a relatively more tapered trailing edge.

According to an aspect of some embodiments of the present disclosure, there is provided an electrical motor including: a rotor and a stator; wherein the stator includes a plurality of individually wire-wound coils spaced around a circumference of the stator; and wherein each of the individually wire-wound coils: is wound by a respective wire which does not wind any of the other coils, and occupies a single position around the circumference of the stator; and wherein all of the individually wire-wound coils are configured to receive power simultaneously to act on the rotor.

According to some embodiments of the present disclosure, the single positions of the individually wire-wound coils are not internally separated into portions by others of the individually wire-wound coils.

According to some embodiments of the present disclosure, the electrical motor includes a respective controller for each individually wire-wound coil, configured to select at least one of a strength and a polarity of electrical current delivered to the coil, according to a relative position of the rotor.

According to an aspect of some embodiments of the present disclosure, there is provided a battery-powered aircraft, including: a fuselage surrounding a center of gravity of the aircraft; a plurality of battery units; a plurality of pairs of electrically powered rotors, the rotors of each pair being mounted diagonally to each other on opposite sides of the center of gravity, and each pair separated by rotors of at least one other of the plurality of pairs along a circumference around the center of gravity; wherein each battery unit provides power to both rotors of one of the pairs of electrically powered rotors.

According to some embodiments of the present disclosure, each of the pairs of electrically powered rotors is powered by more than one of the plurality of battery units.

According to an aspect of some embodiments of the present disclosure, there is provided a multirotor aircraft, including: a fuselage; a plurality of rotors attached to the fuselage; and a plurality of separately operating flight controller units, each flight controller unit including a respective inertial measurement unit (IMU); wherein each of the rotors is separately controlled by a respective flight control unit, based on measurements from the flight control unit's respective IMU.

According to some embodiments of the present disclosure, each of the plurality of flight controller units receives measurements from the respective IMU of each other flight controller unit.

According to some embodiments of the present disclosure, the flight controller units are interconnected so that each has access to a same estimate of overall aircraft flight state.

According to some embodiments of the present disclosure, each individually wire-wound coil is configured to operate as a sensor of the position of the rotor, and the respective controller delivers current to the coil, based on sensor measurements from the individually wire-wound coil.

According to some embodiments of the present disclosure, each flight controller unit issues commands targeted to bring about a same overall aircraft flight state, based on a same estimate of overall aircraft flight state.

According to some embodiments of the present disclosure, each flight controller unit is configured to issue commands modified by changes in its own IMU measurements relative to the same estimate of overall aircraft flight state, and wherein the modification includes an adjustment in response to flexing of a frame of the multirotor aircraft.

According to an aspect of some embodiments of the present disclosure, there is provided a multirotor aircraft including: a fuselage; a plurality of rotors attached to the fuselage, each rotor including a plurality of contra-rotating, coaxially mounted propellers; and a flight controller; wherein the flight controller is configured to assert yaw authority over the aircraft by adjusting the rotational speed of just one of the propellers of each of the plurality of rotors.

According to some embodiments of the present disclosure, each of the plurality of rotors is tilted to direct a portion of rotor thrust in a yaw direction.

According to some embodiments of the present disclosure, the flight controller is configured to adjust yaw thrust and yaw torque simultaneously to the effect that adjustment of each induces yaw in the same direction.

According to an aspect of some embodiments of the present disclosure, there is provided an aircraft including: a plurality of motor assemblies each configured to generate thrust by movement of air past the motor assembly along a respective axis of thrust of the motor assembly; and a wing; wherein: the plurality of motor assemblies is operable together to fully support the aircraft in a hovering mode, and to propel the aircraft forward in a forward flight mode; the plurality of motor assemblies is mounted within a wingspan of the wing; and each motor assembly is positioned where the wing does not intersect the flow of air before entering or after leaving the motor assembly along the axis of thrust and within a radius of the motor assembly, while the motor assemblies operate at pitch angles oblique to a pitch orientation of the wing.

According to some embodiments of the present disclosure, the plurality of motor assemblies includes motor assemblies mounted ahead of and below the wing, and motor assemblies mounted behind and above the wing.

According to an aspect of some embodiments of the present disclosure, there is provided a multirotor aircraft, operable in both hovering and forward flight modes, including: a fuselage; aerodynamic surfaces attached to the fuselage including at least horizontal lift-generating surfaces, and vertically projecting yaw stabilizing surfaces; a plurality of rotors attached to the fuselage; and a flight controller; wherein the flight controller is configured, in the hovering mode, to assert continuous yaw authority to yaw-stabilize the aircraft by adjusting the rotational speed of the rotors; and also configured, in the forward flight mode, to stop adjusting the rotational speed of the rotors to yaw-stabilize the aircraft.

According to an aspect of some embodiments of the present disclosure, there is provided an aircraft including: a plurality of motor assemblies, each configured to generate thrust by movement of air past the motor assembly along a respective axis of thrust of the motor assembly; and a wing; wherein: the aircraft masses at least 50 kg; the orientations of the axes of thrust are each fixed, during operation of the aircraft, at a constant respective pitch angle oblique to a pitch orientation of the wing; and the plurality of motor assemblies is operable together to both fully support the aircraft in a hovering mode, and to propel the aircraft forward in a forward flight mode.

According to an aspect of some embodiments of the present disclosure, there is provided a method of setting thrust vectors of motor assemblies of an aircraft, including: providing propellers having a peak efficiency for at providing thrust while moving perpendicularly through air at a selected airspeed, planning a cruising speed period of flight for the aircraft at a speed above the selected airspeed; and setting the thrust vectors of the motor assemblies at an angle selected to restore at least a portion of efficiency lost due to travelling at the speed above the selected airspeed.

Unless otherwise defined, all technical and/or scientific terms used herein have the same meaning as commonly understood by one of ordinary skill in the art to which the present disclosure pertains. Although methods and materials similar or equivalent to those described herein can be used in the practice or testing of embodiments of the present disclosure, exemplary methods and/or materials are described below. In case of conflict, the patent specification, including definitions, will control. In addition, the materials, methods, and examples are illustrative only and are not intended to be necessarily limiting.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system" (e.g., a method may be implemented using "computer circuitry"). Furthermore, some embodiments of the present disclosure may take the form of a computer program product embodied in one or more computer readable medium(s) having computer readable program code embodied thereon. Implementation of the method and/or system of some embodiments of the present disclosure can involve performing and/or completing selected tasks manually, automatically, or a combination thereof. Moreover, according to actual instrumentation and equipment of some embodiments of the method and/or system of the present disclosure, several selected tasks could be implemented by hardware, by software or by firmware and/or by a combination thereof, e.g., using an operating system.

For example, hardware for performing selected tasks according to some embodiments of the present disclosure could be implemented as a chip or a circuit. As software, selected tasks according to some embodiments of the present disclosure could be implemented as a plurality of software instructions being executed by a computer using any suitable operating system. In some embodiments of the present disclosure, one or more tasks performed in method and/or by system are performed by a data processor (also referred to herein as a "digital processor", in reference to data processors which operate using groups of digital bits), such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well. Any of these implementations are referred to herein more generally as instances of computer circuitry.

Any combination of one or more computer readable medium(s) may be utilized for some embodiments of the present disclosure. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium may also contain or store information for use by such a program, for example, data structured in the way it is recorded by the computer readable storage medium so that a computer program can access it as, for example, one or more tables, lists, arrays, data trees, and/or another data structure. Herein a computer readable storage medium which records data in a form retrievable as groups of digital bits is also referred to as a digital memory. It should be understood that a computer readable storage medium, in some embodiments, is optionally also used as a computer writable storage medium, in the case of a computer readable storage medium which is not read-only in nature, and/or in a read-only state.

Herein, a data processor is said to be "configured" to perform data processing actions insofar as it is coupled to a computer readable memory to receive instructions and/or data therefrom, process them, and/or store processing results in the same or another computer readable storage memory. The processing performed (optionally on the data) is specified by the instructions. The act of processing may be referred to additionally or alternatively by one or more other terms; for example: comparing, estimating, determining, calculating, identifying, associating, storing, analyzing, selecting, and/or transforming. For example, in some embodiments, a digital processor receives instructions and data from a digital memory, processes the data according to the instructions, and/or stores processing results in the digital memory. In some embodiments, "providing" processing results comprises one or more of transmitting, storing and/or presenting processing results. Presenting optionally comprises showing on a display, indicating by sound, printing on a printout, or otherwise giving results in a form accessible to human sensory capabilities.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present disclosure may be described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE SEVERAL VIEWS OF THE DRAWINGS

Some embodiments of the present disclosure are herein described, by way of example only, with reference to the accompanying drawings. With specific reference now to the drawings in detail, it is stressed that the particulars shown are by way of example, and for purposes of illustrative discussion of embodiments of the present disclosure. In this regard, the description taken with the drawings makes apparent to those skilled in the art how embodiments of the present disclosure may be practiced.

In the drawings:

FIGS. 1E-1G schematically represent rotor-driven aircraft comprising a wing with rotors oriented at a fixed oblique angle relative to a level-flight pitch axis orientation of the wing, according to some embodiments of the present disclosure;

FIGS. 1H-1O schematically represent rotor-driven aircraft comprising a wing and fuselage, with rotors oriented at a fixed oblique angle relative to a level-flight pitch axis orientation of the wing, according to some embodiments of the present disclosure;

DESCRIPTION OF SPECIFIC EMBODIMENTS OF THE INVENTION

Figure 1A:
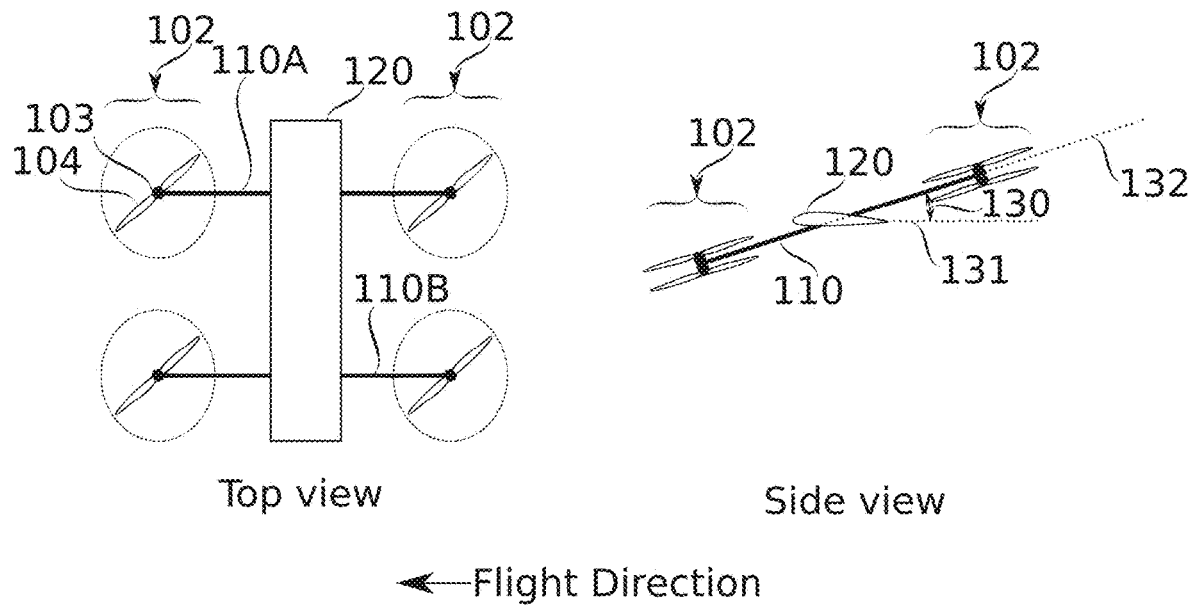
FIG. 1A schematically represents an aircraft comprising a rotor-driven wing with rotors oriented at a fixed oblique angle relative to a level-flight pitch axis orientation of the wing, according to some embodiments of the present disclosure.

The present invention relates to the field of airborne and flying vehicles, and, more particularly, to an electrically powered aircraft having vertical take-off and landing as well as stationary flight capabilities.

Overview

A broad aspect of some embodiments of the present disclosure relates to an unmanned or manned, winged air vehicle (aircraft) comprising a plurality of powered propellers oriented at a fixed angle oblique to the orientation of at an at least one wing of the aircraft. Herein, this configuration feature is referred to as a "fixed oblique wing-rotor angle," further details and definitions of which are described hereinbelow. As examples, an "oblique angle" of a wing relative to a propeller is optionally selected from within a range between 5° and 45°, within a range between 10° and 35°, within a range between about 15° and 30°, and/or within a range between about 20° and 25°.

In some embodiments, the aircraft is configured for vertical takeoff, oblique takeoff (herein considered a type of vertical takeoff, as next defined), and/or short takeoff. In some embodiments, the aircraft is configured for vertical landing and/or short landing.

Potential advantages of vertical takeoff and/or landing for aircraft include a decrease in a required amount of land space for using the aircraft, reduced specialization of the space that is required for takeoff and landing (e.g., a parking lot can also be a landing pad), and/or increased safety of takeoff and landing (e.g. velocities near the ground are lower). Potential advantages of fix-winged (non-revolving wing) aircraft include generation of efficient and reliable lift from forward motion through air alone.

Aircraft designs have sought to combine VTOL capability with fixed (non-revolving) wing flight assistance. It is noted that the term "fixed wing" is used in the art to mean "a wing which does not revolve around a center to generate lift", as opposed, for example, to the rotors of a helicopter, multicopter, or autogyro, and this is the sense of the term as used here. Meanings associated with other uses of the term "fixed" are described hereinbelow.

There are several potential problems associated and/or addressed by the efforts at VTOL and fixed-wing combination. Broadly, these problems have included reliability of the vertical/horizontal flight transition, added mechanical complexity, added deadweight, and other penalties stemming from engineering compromises needed to achieve a hybrid of both vertical and forward flight using a non-revolving winged aircraft.

Some designs have simply provided separate vertically and horizontally oriented thrusters (accepting increased deadweight). In contrast, and potentially avoiding the vertical thrust capability of a fixed-wing VTOL aircraft "going to waste" during forward flight, dynamic- and static-transition solutions have been proposed and/or implemented. Dynamic implementations allow thrust to be redirected relative to the body of the aircraft itself, for example, by making a rotor's mounting rotatable, and/or by use of baffles. However, dynamic solutions are particularly associated with increased mechanical complexity, as well as potential safety issues during flight transitions. Addressing these problems comes, moreover, with associated potential increases in regulatory complexity and expense.

Static-transition solutions such as tail-sitters have also been proposed and/or implemented, wherein substantially a whole aircraft transitions 90° from a state in a vertical orientation to a state in a horizontal orientation—the same thrusters being used throughout, first vertically oriented to provide takeoff lift, then, gradually, tilting to add horizontal velocity, the tilt increasing until sufficient lift is achieved to complete the 90° transition to the aircraft's cruising orientation. The transition reverses to allow landing, with the added complication of safely canceling the aircraft's forward velocity without missing the target landing zone.

As new technologies become available, solutions that previously were unavailable or unnoticed potentially enter into viability. For example, with the advent of increasing small but still powerful electrical motors, increasing electrical storage capabilities to complement them, and cheap and sophisticated control electronics, a variety of aircraft powered by a plurality of propeller-coupled electrical motors (herein, "rotors") have been, are being, and it is expected will be developed. This field of endeavor in general is referred to herein as "multirotor technology".

There has been some recognition that a fixed wing-generated lift could be used together with multirotor technology (e.g., according to design approaches described above).

The inventors, surprisingly, have realized that a fixed (non-revolving) wing with a fixed and oblique wing-rotor angle, optionally coupled to other design features as described herein, offers potential advantages (particularly but not exclusively when coupled to multirotor technology) for phases of flight including forward flight (cruising), takeoff, and/or landing. In particular, potential advantages accrue to aircraft sized large enough to carry cargo and/or passengers, for example, aircraft with an unloaded mass of 50 kg or more, and/or a loaded mass of 120 kg or more; optionally including sizes capable of carrying a plurality of passengers, e.g., 2, 3, 4, 6, 8, 10 or more passengers. Particularly for aircraft at or above these size ranges, concerns of safety, robustness, simplicity, reliability, range, efficiency, reserve power, and/or responsiveness to control are of great significance, for example with respect not only to basic functionality, but also to regulatory approvals and/or market acceptance.

In a forward flight mode of the aircraft, in some embodiments, lift generated from the wing is parallel and opposite to the direction of the pull of gravity, while lift generated from the powered propellers is oriented in a direction which is both forward and upward. This mode of operation provides potential advantages for energy efficiency over use of powered propellers alone to generate lift, insofar as wing-generated lift is configured to contribute more flight assistance than the contributed flight burden of its weight and drag. Since the wing (at least under standard operation) is not carrying all the weight of the aircraft, it can optionally be designed lighter, thinner and/or smaller than in a fully wing-supported design, potentially increasing the wing's net contributed flight assistance. Rotor operation and/or design also receives a potential advantage, insofar as rotors optionally operate in a lower-thrust regime once enough forward speed is developed for fixed wing lift to contribute flight assistance. Optionally, rotor components (e.g., electrical motor and/or propeller) can be reduced in weight, power, and/or speed as requirements placed on sustained rotor thrust output are reduced.

In some embodiments, the aircraft is configured with a multirotor design wherein aircraft control (stabilization and maneuvering) is exerted through applying differential thrust to rotors of the aircraft. Flight control software can reduce or eliminate a need for flight surface stabilization of yaw, roll and/or pitch during forward flight. Reduced flight control surfaces potentially increases efficiency. Conversely, flight control software is optionally configured to reduce (and optionally cease entirely) assertion of stability control in one or more axes at higher speeds as the aerodynamic properties of the aircraft assert themselves. For example, an aircraft comprising a rear-mounted vertical stabilizer is potentially protected from yaw at a sufficiently high forward speed; momentary yaw tends to bring the vertical face of the stabilizer into an orientation that air flow pushes against until the forward-facing yaw orientation is restored. Similarly, an aerodynamic pitch angle is optionally established by a balance of forces between a main wing and horizontal stabilizer (or other configuration comprising a plurality of wings), that tends to keep aircraft pitch within a range narrow enough that the flight software can abandon asserting pitch control during forward flight. Triggering a reduction and/or elimination of stability (that is, reduction and/or elimination of the assertion of flight software control) in one or more axes can be automatic according to measured forward speed, or manual.

The fixed wing optionally does not itself include control surfaces. This has a potential advantage for simplicity of design and/or weight. Alternatively, the fixed wing includes control surfaces, for example for emergency control if power to one or more of the rotors' motor is lost, and/or for added maneuverability.

Potential benefits are not limited to effects on forward flight characteristics, however; and different fixed and oblique wing-rotor angle configurations have different potential advantages.

The inventors have realized that some potential short-flight aircraft applications balance similar energy budget requirements for forward flight and hovering (e.g., energy budget requirements within about a factor of two of each other). Relatively long and high-efficiency forward flight is balanced by relatively short but lower-efficiency hovering flight, particularly when assigning the safety margin part of the energy budget to hovering flight. This assignment is a reasonable choice for flights between two predetermined points, since the need for a safety margin is then likely to be encountered due to impeding conditions at the landing site that require the aircraft to loiter and/or maneuver in hover to avoid and/or wait out the impeding condition. Thus, for example, 30 minutes of forward flight capability may be provided with the assumption of about four minutes of hovering capability (including safety margin). In some embodiments, hovering flight takes about five times the power of forward flight (e.g., due to lack of the advantages of aerodynamic lift), resulting in a nominal balance of forward flight and hovering flight energy budgets in a ratio of about 3:2.

An aspect of some embodiments of the present disclosure relates to forward flight of an aircraft equipped with an oblique wing-rotor angle, wherein the rotors are mounted, relative to the wing, so that the wash of their thrust is directed out of the airflow encountered by the wing during forward flight. In some embodiments, the oblique wing-rotor angle is fixed.

In some embodiments, the rotors are mounted within the wing span (e.g., closer to the fuselage than the tips of the wing). In some embodiments, the mounting configuration comprises at least one rotor mounted with its center below and in front of the wing, and at least one rotor mounted with its center above and behind the wing. In this configuration, optionally, the rotors are mounted to occupy a generally planar configuration, which is tilted (around the pitch axis) relative to the orientation of the wing.

In some embodiments of the present disclosure, both wing and propellers generate lift during cruising forward flight (e.g., at a speed greater than about 55 km/h); for example, the wing generates at least 10% of lift, 25% of lift, 30% of lift, 50% of lift, "most of the lift" (more than 50% of the lift), or 70% of lift; with the propellers providing the remainder of lift, including at least 10% of lift. From among these examples, it is a potential advantage for lift produced by the wing to be a relatively large proportion of total lift in forward flight (e.g., most of the lift), as use of wing lift optionally reduces a need for using a vertically-oriented component rotor thrust to remain airborne, while the sum of vertically-oriented thrust and horizontally-oriented thrust needed for forward flight generally remains lower than the vertically-oriented thrust needed for horizontally stationary hovering flight.

Insofar as both rotors and wing are used in generating lift, it is a potential advantage for them to be placed and otherwise configured to avoid interfering with each other's lift-generating function. Both propellers and wings are intended to operate in a laminar flow of air (at least as they initially encounter it); turbulence, when it occurs, tends to introduce vibrations and loss of efficiency significant to the aircraft's performance. Primary wash from the propellers is turbulent, and oriented in the same direction as thrust. Wings also leave turbulence in their wake. Thus, the operation of both wings and propellers potentially benefits from keeping their "outputs" (wakes/washes) away from each other's "inputs" (leading edge/intake). For purposes of the descriptions provided herein, a wing is said to avoid interfering with a rotor's thrust insofar as it does not intersect with a right cylinder centered on the rotor, having a central longitudinal axis aligned with an axis of thrust produced by the rotor (or other type of motor assembly), and having a radius equal to the radius of the rotor's propeller, turbine blade, jet outflow aperture, or other primary airflow generating/airflow shaping component. Intersection of the wing with air disturbances induced by a motor assembly outside this cylinder are considered, at least for purposes of description, to be non-interfering with motor assembly thrust as such.

The lateral position of the rotor centers (that is, their distance away from the aircraft center along the axis of pitch) optionally ranges from centered on the aircraft to outside the wingspan of the aircraft. Rotors not centered on the aircraft are preferably provided in matched pairs (one on either side), to maintain balance and equalize flight stresses. Potentially, a multirotor aircraft (for example, a multicopter with six or more rotors) continues to fly safely (optionally with suitable adjustments to control) even if one or more rotors are inoperative or even missing.

A particular advantage of mounting motors within the wing span is reduction of stresses on mountings—the mounting members being optionally shorter, for example, less leverage is applied to joints that attach them to the rest of the aircraft. Avoiding mounting motors on or from the wing tips (as another example) would also potentially allow the wings themselves to be more lightly constructed, potentially resulting in deadweight savings. Flight stability is potentially enhanced by mounting rotors far apart from one another, even though this also tends to increase leverage stresses on mountings. By mounting motors to the front and back of the fuselage, the mounting members of some embodiments are still kept short, taking advantage of the stiffness of the fuselage itself.

Furthermore, insofar as the wing and the rotors are independent of each other for positioning, the wing may be designed as long and/or thin as is suitable for its function in providing lift, without concern for extending it into the wash of the rotors, or concern for strengthening to support the rotors themselves and/or to transfer the thrust of the rotors to the aircraft.

The concept of mounting motors both ahead of and behind the wing allows the aircraft to act (in at least some flight conditions) with the flight characteristics of an unwinged multirotor aircraft, with the center of gravity supported between the rotors (including between within a plane perpendicular to gravity's pull). In the same configuration, the wing (at least in rapid forward flight) also can exert its lift at or near the center of gravity.

An aspect of some embodiments of the present disclosure relates to modes of takeoff and/or landing of an aircraft equipped with a fixed oblique wing-rotor angle. A fixed oblique wing-rotor angle offers particular potential advantages with respect to the range of such modes which are supported, e.g., by provision of suitably configured landing gear.

In a vertical takeoff mode of the aircraft, in some embodiments, the propellers are oriented (e.g., by pitch axis rotation of the whole aircraft) to exert lift parallel and opposite to the pull of gravity (incidentally tilting the orientation of the wing away from its orientation in level forward flight according to the fixed oblique angle). This mode can be used to raise or lower the aircraft in a hovering mode, including to takeoff or land without ground travel. Vertical takeoff is without ground travel and/or without generating fixed-wing lift. Optionally, vertical takeoff is preceded by a maneuver which levels propellers that are initially tilted by raising one side of the aircraft while the other side remains in contact with the ground.

In an oblique takeoff mode of the aircraft, the aircraft launches (without ground travel and/or without previously generating significant fixed-wing lift) in a direction which is oblique to the ground. Optionally, the propellers are initially oriented at an angle oblique to the ground ("tilted"), and the direction of oblique takeoff is perpendicular to the orientation of the propellers. Optionally, the wings are pitched to their orientation for level forward flight during oblique takeoff. However, there is no limitation of oblique takeoff to exclude other wing pitches—tilted either forward (aircraft nose pitched further down) or backward (aircraft nose pitched further up).

During oblique takeoff, the tilted propellers generate both forward thrust and lifting thrust. The transition to sufficient thrust for takeoff happens quickly enough that forward thrust either does not result in forward travel on the ground, or results in forward acceleration which is weak enough that at the velocity of takeoff, the wing is contributing less than 10% of lift forces acting on the aircraft. Forward travel, if it occurs, may comprise incidental movement as ground friction is overcome during a period of thrust ramp up. Optionally, forward travel in oblique takeoff is over a distance less than the length of the aircraft.

After oblique takeoff, the aircraft optionally reorients in the air to a vertical thrust (leveled propeller) mode, with or without cancellation of forward velocity developed during initial takeoff. Oblique takeoff may be considered as belonging in the category of vertical takeoff (and herein is generally treated so), insofar as a distinguishing feature of vertical takeoff over other modes of aircraft launch is a lack of reliance on the development of lift by a fixed wing in forward motion. Accordingly, "vertical takeoff" includes oblique takeoff herein, except where descriptions relate specifically to ground-stationary hovering.

Landings reverse the orientation stages of takeoff, however there may be maneuvers to reduce or cancel ground velocity. If not completely canceled before landing, the landing is "oblique", and the aircraft decelerates at least in part while on the ground. The term "vertical landing", herein, includes landing from an airborne state with without significant fixed wing lift being generated (for example, less than 10% of total lift), even if there is a non-zero ground velocity upon ground contact. However, embodiments described herein may be assumed to enter a ground-stationary hovering state before landing on a small target, e.g., a landing pad, to avoid any suggestion of "instantaneous braking". After initial touch down (e.g., touching the ground while in a ground-stationary hovering state), an aircraft may re-orient as it settles further, causing the rotors to return to a tilted state.

Vertical/oblique landing and takeoff are subsumed herein under the abbreviation VTOL (vertical takeoff and/or landing, noting that the abbreviation is often defined with the conjunction "and"). The abbreviation VTOL should be understood to be descriptive of an aircraft capability, and not as limiting it to just vertical takeoff and landing; nor should the abbreviation VTOL be understood to assert that vertical takeoff and vertical landing are necessarily conjoined.

As examples of non-vertical takeoff or landing operation: in a short takeoff mode of some embodiments of aircraft described herein, the aircraft taxis a short distance along the ground before taking off. Herein, a "short takeoff mode" is fixed-wing assisted, with airspeed at takeoff sufficient for the wing to be contributing at least 10% of the total lift force. In some embodiments, an aircraft is capable of a short landing, wherein the aircraft touches the ground in forward motion with at least 10% of its remaining lift generated by a fixed wing. For purposes of definition, a short takeoff allows an aircraft to clear a 15 m obstacle within 450 m of commencing a takeoff run.

An aspect of some embodiments of the present disclosure relates to a winged aircraft, configured with powered propellers oriented at a fixed angle oblique to the wing, wherein, in a landed state, the propellers are also held at an oblique angle to the ground.

The basic "tail-sitter" design briefly mentioned above potentially subjects occupants and/or cargo to a 90° rotation of position which can be uncomfortable and/or result in significant cargo shifting. Mitigation of such an extreme change in angle, e.g., by a rotating seat or compartment, potentially requires overcoming fuselage, cabin, and/or cockpit design challenges.

In some embodiments of the present disclosure, such huge rotations are avoided at the outset. The forward flight to hovering flight orientation adjustment, for example, is the same as the fixed oblique wing-rotor angle, preferably less than 45°, and e.g., within a range between about 15° and 30°, and/or within a range between about 20° and 25°. A few degrees of seating or compartment tilt potentially reduce the effective angle change experienced by contents of the aircraft still further, in some embodiments.

Continued reliance during forward flight on rotor thrust for lift means that lift efficiencies are potentially reduced over a purely fixed wing lift—but considered from a baseline of a multirotor-driven aircraft without a wing, there is nevertheless a potential advantage for lift efficiency gains.

Moreover, there are potential advantages for when aircraft contents experience orientation differences, relative to the ground.

The inventors have realized that a surprising alternative to the two-state transition is a three-state transition, which is optionally implemented using a rotor-powered aircraft having wing and rotors oriented at oblique angles to one another. Alternatively, in some embodiments, orientation transition can optionally be avoided for takeoff and/or landing.

In some embodiments, on or shortly after take-off, an aircraft first transitions from a landed state with rotors (and/or the net combined rotor thrust vector) tilted away from the vertical, to an intermediate vertical takeoff state with rotors and/or the net combined rotor thrust vector vertical (optionally beginning with landing gear still touching the ground). Next, after takeoff and/or sufficient altitude is gained, the aircraft transitions to a third position with the rotors and/or the net combined rotor thrust vector again tilted away from vertical—optionally at the same orientation as in the landed state, or in another orientation. Then, in some embodiments, seating or other aircraft hold arrangements are made to be most comfortable for the grounded configuration of the aircraft. There is a disruption of this orientation just during takeoff, and then, during normal flight, the comfortable orientation is restored.

In an oblique takeoff mode variant of vertical takeoff, there does not even need to be an intermediate disruption; the same orientation is optionally held throughout the transition from grounded aircraft to full forward flight. This has a potential advantage for reducing a maximum tilting angle of aircraft contents during takeoff.

On landing, the sequence reverses. The transition from hover state (e.g., with rotors vertically oriented) to landed state (e.g., with rotors tilted from vertical) optionally happens in the air (potentially briefly imparting horizontal acceleration before the aircraft touches down allowing land braking), or after contact with the ground.

As noted, the seating position of occupants on the ground are optionally the same both before takeoff, and during flight, leaving the phase of "tilted seating" to just the periods of vertical takeoff, landing, and potentially velocity reduction before landing. Optionally, there remains some difference in seating orientation in each case. For example, the aircraft in forward flight is the "most comfortable" orientation for those seated inside, while the rotors are tilted forward according to the fixed oblique wing-rotor angle. On the ground, the aircraft is tilted slightly back from this angle (e.g., within the range of about 1°-10°), giving the occupants a feeling of moderate reclining. It should be understood that a moderate range of adjustable chair angles (e.g., up to about) 10°-15° can be used to modify seating angle further; however is deemed appropriate.

The tilted-rotor landed state is achieved, in some embodiments, by a suitable selection of the relative lengths of rotor mounting arms and landing gear. It is noted in particular that positioning a front-placed rotor below the wing has the potential effect of bringing it quite close to the ground, where it is potentially more vulnerable to interactions with dust and/or debris. Optionally, longer landing gear and/or moderate "back tilt" is used to mitigate this vulnerability. Optionally, the landing gear itself is adjustable to change the orientation of the aircraft on the ground (e.g., tilted forward for cargo loading and/or passenger boarding; tilted back before takeoff to keep front rotors clear of the ground).

Slowdown of the aircraft, in some embodiments, comprises reducing forward tilt of the aircraft. The wing, in this configuration, potentially becomes a brake, at least at higher velocities. Optionally, aircraft rotor pitch is reversed (past the position of a vertical net thrust vector) to add further deceleration. Optionally, the aircraft is controlled to yaw through about a half turn while maintaining at least a portion of its forward-oriented rotor pitch, after which it decelerates for a period while flying backward through the air. Such a maneuver is optionally performed after airspeed drops enough that the wing does not destabilize the aircraft beyond the ability of the control system to compensate.

Optionally (for example, under automatic and/or automatically assisted piloting), horizontal deceleration (optionally while flying backward) reduces ground speed to 0 at about the same time as the aircraft touches the ground. A potential advantage of this is to maintain a more level aircraft during descent, which may increase occupant comfort and/or reduce a risk of cargo shifting and/or unbalancing the aircraft.

In some embodiments, auxiliary motors are provided (optionally relatively low-powered) which activate as needed to provide additional thrust for hovering, horizontal maneuvering, acceleration, deceleration, and/or balancing of opposite thrusts (particularly at landing and/or takeoff). This is a potential advantage to allow low-acceleration maneuvering with reduced tilt adjustments (e.g., to pitch). The auxiliary motors are optionally light, to reduce their deadweight penalty. Optionally, they are mounted to feather their blades, retract, and/or swivel out of the flow of air during rapid forward flight to reduce drag. Optionally, they operate during forward flight to produce additional thrust; optionally they are reversing for use, e.g., during landing maneuvers. In some embodiments, the auxiliary engines are a convenience, but not required for maneuvering or otherwise maintaining airworthiness of the aircraft. In some embodiments, auxiliary engines provide redundancy, e.g., for stabilization. For example, an event such as a collision (e.g., a collision with a tall ground obstacle that damages a plurality of motor-mounting arms, and/or a motor-mounting arm carrying a plurality of motors) could potentially disable a number of main motors sufficient to create flight instability that the remaining motors cannot fully compensate for. Auxiliary motors could be activated in such a condition to help maintain at least a portion of flight stability, e.g., enough to balance the aircraft long enough to execute an emergency landing.

For example, in an 8-motor (or another) coaxial arrangement, with 2 motors on each arm, an external impact from a pole for example would disable 2 motors on the same arm, and the vehicle will lose stability and might tip over. With the additional 2 motors, stability is maintained in such an event.

An aspect of some embodiments of the present disclosure relates to a self-tilting rotor mounting assembly of an aircraft, comprising a plurality of rotors mounted on a pivoting bar and on either side of a pivoting mount (also referred to herein as a hinge) of the pivoting bar; wherein the rotors are operable to pivot the bar around the pivoting mount, and around a pitch axis.

In some embodiments, a pivoting angle range of the pivoting bar is limited to be between a relatively horizontal orientation, and a relatively vertical orientation. The orientation is selected by changing relative power to the rotors on either side of the pivoting mount, resulting in a bistable mechanism selectably convertible between two modes by changing relative power of the rotors.

In one mode, the pivoting bar is locked against the more-horizontal side of the pivoting angle range, and in the other, the pivoting bar is locked against the more-vertical side of the pivoting angle range, In some embodiments, a portion of the mode-switching control is exercised through use of forces placed on the aircraft's centers of gravity and lift. In some embodiments, the aircraft's center of gravity and its aerodynamic center of lift are both positioned forward of a center of pivoting of the pivoting mount. A pivoting angle range of the pivoting bar is limited so that in hovering flight, the weight of the aircraft locks the fuselage and pivoting bar in relative orientations suitable for generation of hovering thrust. Once forward-flight generated lift relieves weight forces from the pivot, the pivoting bar is rotated to a more vertical orientation (e.g., by suitable adjustment to relative power of the front and rear rotors), while the pitch of the rest of the aircraft remains stabilized by aerodynamic forces. Optionally, there is another limit to the pivoting angle range so that a suitable balance of rotor thrusts also "locks" the mounting assembly into a fixed forward flight configuration.

Optionally, a pivoting bar is positioned in either lateral side of the aircraft, and the pivoting bars are joined between them to form a single pivoting frame. Optionally, pivoting bars are mechanically unlinked, and coordinated, for example, by flight control software. Optionally, a single pivoting bar is held at a position (e.g., behind the aircraft) where the rotors are free to move without colliding with the aircraft body.

In some embodiments, the pivoting mount is positioned so that the center of pivoting is longitudinally offset to be in front of the center of gravity of the self-tilting rotor mounting assembly. In a motors-off state, the self-tilting rotor mounting assembly thus tends, under the force of gravity, to rotate clockwise; as seen from the side with the front of the aircraft on the left. This tendency of rotation is mechanically stopped at a position which holds the rotors in an orientation suitable for hovering flight, e.g., with the rotor thrust vectors pointed vertically downward initially as the rotors start up. Once in the air, the center of gravity of the pivoting mount no longer controls the attitude of the pivoting mount, instead it is controlled by differential thrust forces.

In some embodiments, a center of gravity of the aircraft fuselage and wing is placed forward of the center of pivoting. As a result, as the aircraft lifts under thrust from the rotors, the aircraft fuselage and wing tend to rotate in a pitch-downward direction. This pitch-downward movement tends to pull the pivoting mount in a pitch-downward direction too, since it can't move any further in a relatively pitch-upward direction compared to the fuselage. As a result, the self-tilting rotor mounting assembly and the fuselage-wing assembly remain locked together in substantially the same relation they had on the ground, even though the causes of the forces are different.

Tilting of the whole aircraft can be controlled by commanding different relative thrusts on the forward rotor(s) compared to rear rotor(s), including thrust that balances any tendency of the center of gravity to pitch the whole aircraft downward.

At this point, the rotors are re-oriented to exert forward thrust. As velocity builds, the wing correspondingly begins to generate forward lift, from a center of lift which is also forward of the center of pivoting (and, in some embodiments, forward of the center of gravity of the wing and fuselage). This lift removes the "lock" exerted by the weight of the aircraft on the pivoting mount. From this point, relatively more thrust delivered to the rear rotor(s) than the front rotor(s) will tend to rotate the pivoting mount into a more vertically-oriented directly, without following by the aircraft fuselage and wing, since these are now being held pitched relatively upward by the forces of the wing's lift.

Optionally, the speed of the rotational transition is limited by a resistance of the pivot; e.g., a frictional (e.g., surface friction and/or viscosity imposed) or and/inertial (e.g., flywheel imposed) resistance to pivoting, so that the pitch-rotation movement of the pivoting mount is slowed (e.g., held to a gradual re-orientation). In preparation for vertical landing, the upper (rear) rotor(s) are optionally provided decreased power relative to the lower (front) rotor(s), returning them to the hover position. As airspeed drops, the weight of the aircraft returns to be supported by the pivoting mount, restoring the hover lock.

An aspect of some embodiments of the present disclosure relates to a variable blade-pitch rotor comprising two co-axial electrical motors. In some embodiments, the two co-axial electrical motors each hingingly attach to a different portion of the base of the propeller blades of the rotor. Changes in the relative positioning of the electrical rotor portion of each electrical motor translate into a change in propeller blade pitch. In some embodiments, only one of the electrical motors is directly attached to the blade. Rotation of the blade is driven by a geared (e.g., ratchet and pinion) mechanism, coupled to the relative positioning of an electrical rotor portion of the other electrical motor. In some embodiments, the blade pitch is variable through its whole range (e.g., from a minimum pitch to a maximum pitch) within less than a second. The range of pitch variation is, for example, a range of about 5°, 10°, 15°, or another range.

An aspect of some embodiments of the present disclosure relates to a propeller guard which is shaped so that it exerts a reduced aerodynamic drag when oriented to a direction oblique to the propeller it surrounds. In some embodiments, a wall of the propeller guard is shaped generally as an oblique cylinder, with the obliquity of the cylinder selected so that each radial cross-section of the propeller guard wall points along the direction of level forward flight of the aircraft. In some embodiments, at least portions of the propeller guard wall are formed as an airfoil, optionally an airfoil shaped to generate lift.

An aspect of some embodiments of the present disclosure relates to an electrical motor comprising plurality of individually wire-wound coils, wherein each of the individually wound coils occupies a single position around a stator of the electrical motor (e.g., not separated from itself by interposition of another coil). In some embodiments, each coil also acts as and/or is associated with an electrical and/or magnetic force sensor which detects the angular position of magnets of the rotor. For each individual coil, a respective individual coil controller selects the polarity and/or strength of electrical current delivered to the coil, based on the sensing.

Optionally, a plurality of the individually wound coils are configured to coordinate to act as a single phase of the electrical motor (e.g., exerting substantially the same level and polarity of electromotive force at the same time) even though their coils are not electrically interconnected. Optionally they coordinate to act as a single phase of the electrical motor even though their respective controllers are not in mutual communication.

Optionally, all the individually wound coils operate simultaneously to exert force on the electrical motor's rotor. This is a potential advantage for allowing an electrical motor to exert more peak force for a given number of coils. While component numbers are potentially multiplied, each component itself may be lighter than otherwise required, e.g., due to a reduced power handling requirement for an individual coil. Another potential advantage is that loss (e.g., due to shorting) of a single coil does not necessarily prevent the electrical motor from operating. Another potential advantage is that the coils themselves may be manufactured with reduced complexity and/or cost. Another potential advantage is that coils can be individually replaced in the electrical motor, e.g., as part of electrical motor maintenance.

An aspect of some embodiments of the present disclosure relates to arrangement of battery unit power delivery so that each of a plurality of battery units powers a different corresponding set of rotors, each set of rotors being made up of rotors positioned at diagonally opposite corners of the aircraft. In some embodiments, this configuration acts to potentially prevent aircraft instability resulting from loss of power from a single battery unit causing a sudden imbalance of diagonally opposite thrusts.

In some embodiments, rotors having a plurality of propellers and a corresponding plurality of power units driving the propellers are optionally powered by a different battery unit for each of the power units. Accordingly, in some embodiments, there are two battery units configured to power each rotor, each battery unit also powering a power unit of the diagonally opposite rotor. Herein, this is also referred to as a "diagonally wired" power configuration.

The rotors are "diagonally opposite" such that an imbalance between diagonally opposite rotors of delivered thrust would tend to rotate the aircraft around a diagonal axis of rotation, about perpendicular to the diagonal across which the diagonally opposite rotors is mounted. The diagonal axis of rotation passes so close to the remaining rotors that they would need to provide at least two times as much change in thrust as the thrust difference of the imbalance to provide a corrective stabilizing thrust, and optionally even more: for example, five, ten or more times as much thrust. It is noted that diagonally opposite rotors are also rotors in a set of "balanced role" rotors, as described in relation to FIG. 15, herein.

Accordingly: when, for example, one power unit (e.g., one of a plurality of power units) of a diagonally opposite pair of rotors ceases to function entirely, there is potentially no rotor outside that pair which can modify its own thrust in time to overcome thrust imbalances which may then develop between the diagonally opposite pair of rotors. In some embodiments, (e.g., in a configuration comprising rotors at each of four corners of the aircraft), the diagonal axis of rotation upon failure of one rotor potentially passes so close to the remaining rotor subsets that none of them is even operable to deliver a counterbalancing thrust sufficiently controlled as to maintain aircraft stability. As a result, these remaining rotor subsets are potentially ineffective to provide recovery even from a relatively small and/or transient imbalance. For example, in some embodiments, if one rotor subset of a pair has a significant power failure (e.g., losing half or all its power), rotation around the diagonal axis is initiated. Once rotation is sensed (e.g., by an inertial measurement unit connected with the aircraft's control systems) a normal aircraft response, in some embodiments, is to reduce power in the other (diagonally opposite) rotor subset. However, the rotation will have already developed a certain amount of momentum before it is sensed; and in any case the control of power may not reduce instantly, and/or the attempt to restore stability may lead to oscillations in the aircraft attitude. This is potentially a particular problem for a heavier aircraft having concomitantly greater momentum. While even this situation is not necessarily unrecoverable (e.g., the center of gravity of the aircraft itself may be slung low enough to assist in preventing flipping), it is a potential advantage to remove or reduce, for at least some failure modes, a risk of control lag that could allow rotation and/or rotational momentum around the diagonal axis to build up.

With the diagonally-wired power configuration, failure modes involving loss of battery unit power (e.g., loss of connection, or functional failure of the battery unit itself), are potentially self-balancing, in the sense that loss of power is inherently simultaneous between diagonally opposite rotors, so that thrust balancing begins as an inherent part of the failure itself, regardless of a flight controller sensing the onset of rotation and/or commanding a correction.

In some embodiments, loss of power to a rotor's power unit (e.g., due to battery unit failure) is sensed by a controller of the rotor. This may optionally be used as a signal to automatically begin increasing power to another power unit of the rotor (e.g., even before a change in aircraft attitude is sensed). This has a potential benefit, e.g., for reducing control lag in responding to a power loss failure mode. Optionally, the portion of power increase due to the signal is transient; e.g., the effect of the signal is reduced over time in favor of attitude sensing-based control. Transience has the potential advantage allowing more immediate responsiveness (e.g., to reduce loss of flight equilibrium after a failure) without introducing a permanent new factor that could itself interfere with re-establishing flight equilibrium.

Optionally, the signal is propagated for use in the control of other rotors, e.g., to command or confirm shutdown or power reduction of a power unit of a diagonally opposite rotor (optionally, transiently). This has a potential advantage for reducing control lag in response, e.g., to damage affecting just one rotor's power connection.

An aspect of some embodiments of the present disclosure relates to arrangement of a plurality of flight controller units such that each of a plurality of rotors is under the control of its own corresponding flight controller. Optionally, each flight controller is mounted at the site of the rotor(s) it controls, and optionally comprises its own inertial measurement unit (IMU). This provides a potential advantage for robustness, insofar as failure of a single flight controller affects control of just one rotor. This also provides a potential advantage for reducing flight control resonances which may be produced, e.g., due to strut and/or airframe flexing, since each rotor is under the control of a flight controller having an IMU that measures the same local variations in rotor attitude due to airframe flexing.

In some embodiments, the flight controller units share flight data (e.g., IMU data), such that each flight controller has access to identical flight data describing a current flight state of the aircraft. Accordingly, each flight controller unit has access to an identical description of the overall aircraft flight state. Optionally, the data from each flight controller unit's IMU are combined into a single estimate of aircraft flight state using a same combination method for each of the flight controller units (e.g., comprising same algorithms and optionally weights for averaging, and/or same methods of exclusion of handling exceptions such as outlier data).

Optionally, each flight controller unit nevertheless takes special account of flight data measured by its own IMU in generating control commands to its particular rotor and/or assessing results of these control commands. In some embodiments, for example, a flight controller optionally issues control commands targeted to the overall flight state of the aircraft (e.g., as calculated from the shared flight data, optionally identically for all flight controller units). However, the flight controller optionally attributes particular weight to flight data from its own IMU in order to determine immediate effects of commands—such as rates of attitude change—which may be in part absorbed by local airframe flexing before resulting in a general change in aircraft flight state. This determination optionally affects how the flight controller adjusts control outputs, potentially assisting in damping or preventing control oscillations.

An aspect of some embodiments of the present disclosure relates to yaw control of a multirotor aircraft, wherein the rotors comprise a plurality of coaxially mounted, contra-rotating propellers.

In some embodiments of the present disclosure, yaw control is exerted through reactions to changes in rotational momentum as rotor blades are accelerated/decelerated, and/or rotation imparted to air mass by drag from the spinning rotor. Herein this is referred to as "yaw torque". Additionally or alternatively, rotors are oriented with a tilt around the roll axis (and/or, optionally, around an axis perpendicular to an axis extending approximately between the rotor and the aircraft's center of gravity). The tilt is a few degrees (e.g., 5° or less) inward or outward, relative to a midline axis of the aircraft parallel to the roll axis. This potentially provides the rotors with a component of thrust which is available to assist yaw control, referred to herein as "yaw thrust". Preferably, the tilt diverts a component of thrust in the yaw direction which is about equal to or lower than the ability of the rotor to compensate for using yaw torque.

Optionally, in the case of single-propeller rotor designs, the direction of tilt is selected so that yaw thrust is added to yaw torque. For example, the speed of rotors spinning clockwise e.g., as seen from above) is increased to exert yaw torque in a counter-clockwise direction. The same rotors are also oriented to point so that an increase in their thrust also results in counter-clockwise yaw.

It is generally preferred to be able to exert yaw control without affecting effects of forces exerted in other directions—e.g., without inducing changes in pitch, roll, or altitude. Accordingly rotors are typically controlled so that rotors in counter-balancing positions (e.g., diagonally opposite one another) increase rotation/thrust at the same time, in a ratio that avoids rolling or pitching the aircraft. To avoid altitude changes, additional thrust from rotors which provide yaw torque/yaw thrust increase is balanced by reducing thrust from other rotors, typically rotors which provide yaw torque/yaw thrust in the opposite direction—and this reduction is itself preferably diagonally balanced. Accordingly, yaw control to a clockwise direction (for example) is optionally exerted by increasing, for example, all counter-clockwise spinning rotors, and decreasing clockwise-spinning rotors.

In some embodiments, rotors are arranged with a plurality of coaxially arranged propellers, for example two contra-rotating coaxial propellers per rotor. Yaw control using yaw thrust can be provided by such an arrangement, but if both coaxial propellers spin faster at once, they counterbalance each other's yaw torque effects, potentially reducing available yaw control. Contrariwise, if (for example) clockwise propellers spin faster while counterclockwise propeller spin slower, the net change in yaw thrust is reduced, and yaw control using yaw thrust is potentially impaired. Particularly with heavier aircraft and/or a limited energy budget, loss of yaw authority to either effect can become a significant disadvantage. Reducing yaw steering forces available can, for example, impair the ability of the aircraft to control its yaw orientation in opposition to wind forces, even when the aircraft itself is ground-stationary; this is a potential problem for safety and/or low-speed maneuverability. Even in still air, slowing down yaw maneuvering potentially increases time in a hovering phase of flight in particular, which is both (1) a phase of flight in which energy is being used quite quickly and (2) a phase of flight which is likely to be considered as having assigned to it flight reserve energy, which accordingly also subtracts from the aircraft's rated range.

In some embodiments of the present disclosure, flight controllers are configured (at least in normal circumstances) to exert yaw torque on only one of the two propellers in each rotor having coaxially arranged propellers, such that each rotor is controlled to increase or reduce together both yaw thrust and yaw torque. Thus, if a rotor is mounted with a tilt providing clockwise-oriented yaw thrust, its counterclockwise-spinning propeller will be spun faster to add both clockwise yaw torque and clockwise yaw thrust at the same time. The clockwise-spinning propeller speed is left unchanged—since by spinning faster, it would counteract yaw authority exerted through yaw torque, and by spinning slower, it would counteract yaw authority exerted through yaw thrust.

A counterpart rotor mounted diagonally (for example) to the rotor is preferably controlled likewise, to maintain net forces such that pitch/roll is not disturbed. So that altitude is also maintained, rotors tilted to provide counterclockwise-oriented yaw thrust are preferably reduced in net thrust by specifically reducing rotation of their clockwise-spinning propellers, but not their counterclockwise-spinning propellers. This has the further effect of increasing net thrust around the yaw axis in the controlled-to direction.

In some embodiments, the controlled propellers are all the top-layer propellers, or all the bottom layer propellers of their respective rotors. For example, in a rotor configuration comprising an even number of rotors, each rotor with a top propeller spinning clockwise and bottom propeller spinning counterclockwise is adjacent to two rotors with the opposite configuration (and vice-versa), and moreover each rotor is adjacent to two rotors tilted to exert yaw thrust in an opposite direction to itself. The propeller used for control in each rotor's case rotates in a direction opposite the direction of the rotor's yaw thrust exertion. One or more rotors may be excluded from use in yaw control; for example, in the case of an odd number of rotors.

Optionally, e.g., with motors on opposite sides of the aircraft tilted in opposite directions, rotors on opposite sides have reverse relative top-to-bottom orders of clockwise- and counterclockwise-spinning propellers (and the top-to-bottom order is optionally reversed both left/right and front/back).

In some embodiments, flight control optionally abandons active exertion of yaw authority during forward flight above a certain air speed, except upon receipt of pilot commands. This is allowed for embodiments that have sufficient vertically-projecting aerodynamic surfaces to induce inherent yaw stability of the aircraft.

Definitions

Herein, forward flight movement within a plane oriented perpendicular to gravity is referred to as "level forward flight," or flight "parallel to the ground". When "flight" is referred to without other modification, "level forward flight" should be understood.

A wing of the aircraft is referred to as being level, or parallel to the "ground", "plane of the earth", or "earth plane" when the aircraft is in level forward flight, regardless of how the actual form of the wings or any cross-section thereof may be oriented. For example, an up-swept wing is still referred to as being "parallel to the ground" during wing-level forward flight, and a "level wing" (at its "level-flight pitch orientation") is dependent on the direction of air flow at constant altitude, not details of wing-chord orientation and/or angle of attack within the context of forward flight. Herein, reference to a wing in level flight and/or wing-level forward flight is reference to an idealized condition wherein the orientation of the wing is parallel to flat ground, and lift forces balance gravity forces. At constant velocity, drag forces balance horizontal thrust forces in the direction of forward flight. This is not necessarily the true condition of forward flight, depending on flight phase and flight conditions such as aircraft loading, but it serves as a reference.

In contrast, the "orientation of a wing", specifically, should be understood to be the pitch orientation of the wing's chord, measured between the advancing edge and leading edge of the wing (and "pitch orientation" of a wing refers to the same orientation). Since wing chords can potentially be pitched slightly differently at different cross-sections, "orientation of a wing" refers more particularly to the mean, chord-length weighted orientation of the wing chord. In the case of embodiments comprising a plurality of wings, the orientation is calculated for the wing- and chord-length weighted average of chord orientations of all the wings. In case a wing's chord orientation is variable (e.g., its shape is variable), the chord meant is more particularly the one applicable in the wing configuration that is most efficient during forward flight at the jointly most efficient cruising speed.

Typically, a wing is oriented to generate its ideal (most efficient) angle of attack during a forward flight motion which is within about 0°-12° of wing's chord orientation. The ideal angle of attack is most efficient in terms of lift-to-drag ratio over the wing as a whole while moving through still air at the aircraft's rated cruising speed.

To be explicit: an "oblique wing-rotor angle" is measured relative to a wing orientation that is fixed by the inherent properties of the aircraft's airframe, regardless of the particulars of a particular flight. Herein, in relation to an aircraft, orientations and angles (and changes therein) refer more specifically to orientation/angle relative to the pitch axis of the aircraft, unless specifically noted otherwise. Yaw and roll components of orientation/angulation are referred to explicitly as necessary.

Herein, a "rotor" should be understood by default to comprise a unit that provides powered thrust to the aircraft; for example, comprising a propeller, a power source, and a shaft coupled to the propeller that the power source spins, making the propeller spin. In reference to an element capable of producing thrust, the terms "motor" and "motor assembly" are also used herein. In general, a motor (as a thrust-generating device) can be implemented as a rotor, or another propulsive device such as a turbine or jet. Herein, the term "motor assembly" refers a thrust-generating device in this sense. Conversely, where reference is made herein to a rotor, it should be understood that the rotor is optionally replaced with another type of motor assembly (e.g., a jet or turbine), except insofar as descriptions specifically relate to performance aspects particular to propellers, such as contrarotating propellers and/or propeller pitch angle. The orientation plane of propellers of a rotor can be understood to be perpendicular to its net direction of thrust; for embodiments using thrust generating devices which lack propellers, references to "the plane of the propellers" can be substituted with "the plane perpendicular to the net direction of thrust".

Where the term "motor" refers specifically to a power source such as an electric motor (and not the thrust-generating element/motor assembly overall), it is specifically stated to be a "motor (as such)" and/or it is otherwise indicated that the term refers to a power source, specifically.

The power source may comprise, for example, an electric motor (as such), an internal combustion engine, or a turbine. Arrangements for providing energy in the form of electricity or fuel to the power source are considered separate from the power source. Contrariwise, reference to a "propeller" of an aircraft implies the existence of a power source to which the propeller is attached via a rotating shaft, but the term "propeller" as used herein does not as such include the power source. It is not excluded that a single power source may power more than one propeller, or conversely that a propeller is powered by more than one power source, however. The default convention of a one-to-one relationship between propeller and power source is adopted herein for purposes of description, but some embodiments are described, e.g., where a single propeller is operated by a compound power source, e.g., an electrical motor that delivers power to a single propeller through two co-linear stator/rotor pairs. It is noted that "rotor", in addition to the meaning given above, is a term used for a component of an electrical motor. Herein, this alternative sense is indicated, e.g., by specifying that the rotor is part of an electric motor, and/or paired with a corresponding stator.

The "orientation of a propeller", herein, refers to the orientation of the plane in which the propeller spins, and the "orientation of a motor", herein, refers to the orientation of the axis of rotation of the propeller's shaft (which is, accordingly, at right angles to the orientation of the propeller). A wing which is oriented obliquely to the orientation of a propeller is accordingly also oblique to the orientation of the motor, although, e.g., it may be angled 30° from the orientation of the propeller, and 60° from the orientation of the motor. Specifically, herein, an "oblique angle" of a wing relative to a propeller is optionally selected from within a range between 5° and 45°, within a range between 10° and 35°, within a range between about 15° and 30°, and/or within a range between 20° and 25°. Effects including potential advantages of different angle selections are discussed in relation to embodiments described, herein.

Again, the component of angulation referred to herein is around the pitch axis, unless otherwise noted.

Several of the particular embodiments described herein are described as having a fixed oblique wing-rotor angle. Herein, description of an angle between orientations (e.g., of a propeller and a wing) as "fixed" specifies functionally that the angle does not change during operation of the aircraft embodiment, and in particular, does not change as part of transitioning the aircraft between forward flight and takeoff/landing modes. Structurally, in some embodiments, a fixed angle between two components is provided by interconnection of the aircraft's components (e.g., using static struts and fasteners) without provision for modifying the components' relative orientations in flight. It is not excluded that the fixed angle can be converted by reconfiguration of the aircraft on the ground. Examples with angles described as "fixed" do not exclude embodiments which admit some degree of flexing of members such as struts during flight, e.g., as a result of changing forces exerted on the aircraft. Nor does the term exclude embodiments which include moveable wing control surfaces; what is "fixed" is the main body of the wing, e.g., as its orientation is set by the orientation with which the base of the wing is affixed to the aircraft fuselage. In some embodiments, "fixed" means unmoving relative to at least 50% of the mass of the aircraft.

Herein angles described in relation to an oblique wing-rotor angle (that is an angle relative of the wing relative to a plane of the propeller) are applicable also to an oblique wing-axis-of-thrust angle (referring to an axis of thrust of a rotor oriented perpendicular to the propeller). This angle is defined as 90° minus the fixed oblique wing-rotor angle. The angle, thus transformed, still refers to the same actual configuration. In cases where rotor thrust is deflected by a baffle, the thrust axis "of the rotor" should still be considered to be at right angles to the orientation of the plane of the rotor propeller.

Advantages of a fixed and oblique wing-rotor angle potentially include mechanical simplicity, reduced risk, cost, and/or weight for an aircraft with this feature. However, it should be understood that there are also potential advantages for an oblique wing-rotor angle whether fixed or not fixed. Accordingly, wing-rotor and wing thrust angles described as "fixed" for some embodiments are optionally implemented instead (in some alternative embodiments) with that same particular angle as an available, preferred for use in forward flight, but not fixed configuration; that is, the angle is variable in flight. Such embodiments, wherever referred to explicitly, have a "variable" oblique wing-rotor angle. The teaching that such complementary embodiments should be understood from the explicitly given "fixed" angle examples does not change the meaning of "fixed". Rather, any of the embodiments described herein as comprising a fixed oblique wing-rotor angle are complementary to other embodiments, which use a variable oblique wing-rotor angle for cruising forward flight.

An oblique wing-rotor angle (fixed or variable) has potential advantages, in some embodiments, for use (together with a fixed wing) of a fixed-pitch propeller design which is jointly optimized to provide thrust in both forward flight and hovering modes of aircraft operation. Optionally, a rotor (or set of rotors) is operable in a first orientation (or set of orientations) relative to the wing which provides hovering (e.g., net-vertical) thrust, and an at least second orientation (or set of orientations) relative to the wing which provides a component of thrust for forward flight. The orientation conversion (from hover to forward flight mode) may optionally be through any suitable angle; in some embodiments, the orientation conversion passes through an angle substantially the same as the size of the oblique wing-rotor angle described herein for fixed and oblique wing-rotor angles, e.g., an angle selected from within a range between 5° and 45°, within a range between 10° and 35°, within a range between about 15° and 30°, and/or within a range between about 20° and 25°.

Optionally, the conversion range is relatively small (e.g., within a range up to about 5°, 10°, or another angle). Optionally, this provides a potential advantage by ensuring that the rotor is located in a safe and fully flight-capable orientation throughout its physically available range of movements, while retaining potential benefits of added hover and/or flight efficiency gained by "tuning" the angle, e.g., according to the aircraft's current load and/or other flight conditions.

The angle conversion mechanism optionally comprises, for example, any suitable gear, cable, and/or linkage-driven mechanism. A small angle mechanism has potential advantages for use with certain types of angle conversion mechanisms; for example, a sliding bar linkage which provides just a few degrees (e.g., less than 10°) of actuated motion is potentially lighter, simpler, less-obtrusive, and/or more robust than a linkage which allows a full 90° of motion, or even a lesser range of motion such as 45°. In particular, a rotor may be mounted using a plurality of linkage bars, and optionally tilted by shortening or lengthening the bars relative to each other. A two-bar mount (for example) potentially achieves stiffness similar to a single-bar mount using less material. Power cabling and/or hosing to rotors is optionally provided with flexibility and slack as necessary for embodiments with convertible-angle rotors.

Accordingly with some of the above-described elements: in some embodiments, there is provided an unmanned or manned air vehicle with three or more propellers and one or more wings, wherein the wings are parallel to the earth plane during flight, and motors are fixed at an angle relative to the wing so that in forward flight, part of motor thrust creates lift and part pulls the aircraft forward. During takeoff and/or landing, the aircraft optionally hovers with propellers parallel to the ground (that is, the aircraft is capable of vertical takeoff and landing).

Except as relates to embodiments of aircraft with features that explicitly require a particular mode of operation, embodiments of aircraft described herein are optionally manned and/or unmanned; and aircraft are optionally operated from the vehicle, from the ground, and/or fly in automated mode.

Except as relates to embodiments of aircraft with features that explicitly require a particular motor type, motors for aircraft embodiments described herein are optionally, for example, electric, internal combustion and/or turbine motors (as such).

Except as relates to embodiments of aircraft with features that explicitly require a particular thrust propulsion type, air thrust propulsion for aircraft embodiments described herein is optionally provided, for example, by propellers, ducted fans, jet engines, and/or rocket boosters.

An aspect of some embodiments of the present disclosure relates to an aircraft designed to perform both hovering flight and forward flight, wherein at least 50% of its forward flight horizontal thrust is delivered from rotors oriented oblique to the wing. In some embodiments, this oblique angle is between about 20° and 25°. Optionally, the oblique angle is fixed. Optionally, the oblique angle is adjustable. Optionally, the oblique angle range of between about 20° and 25° is adjusted to for forward flight from another angle outside this range.

The inventors have realized that while an obliquely angled rotor directs a significant portion of its thrust vertically (reducing its contribution to forward-flight thrust), there is a potential recovery of horizontal thrust efficiency otherwise lost at higher speeds, particularly for a rotor comprising propeller blades which are also productive of efficient hovering thrust. Fixed propeller blades generally have an associated freestream air speed of greatest efficiency. As the freestream air speed increases past this speed, the blades may be said to lose their "bite"—they can't deliver as much energy to air they pull through, because the air is already moving too fast. A higher blade pitch potentially increases high-speed performance; for example, variable pitch blades are typically designed to increase their blade pitch at faster airspeeds.

Hovering-use propeller blades in particular optionally comprise regions of relatively low blade pitch (to reduced/avoid stalling at low freestream air speeds), even though this low pitch potentially reduces effective power at relatively high (e.g., cruising forward flight) freestream air speeds. Orientation of a rotor (e.g., one comprising such blades) nearer to horizontal means that the propeller "sees" a slower airstream, since only a portion of the total forward air velocity is directed parallel to the rotor's thrust axis. This potentially allows a relatively hover-optimized (low-speed optimized) propeller blade to nevertheless provide efficient levels of forward thrust at high air velocities, for example, at about twice the speed (for a given efficiency) of an equivalent propeller oriented to produce thrust in a fully horizontal direction.

Without commitment to a particular theory of operation, the inventors have found that orientation of a hover-capable propeller to an angle between about 20° and 25° oblique to the direction of forward flight potentially takes particular advantage of this propeller characteristic.

Optionally, a particular aircraft is designed with a particular optimal cruising speed, optimized e.g., by the selection of wing/rotor angle, propeller blade pitch, and/or wing design; within constraints, e.g., of weight, required range, required time in the air, available energy budget, and/or required energy reserves. Typical cruising airspeeds of some embodiments of the present disclosure are in a range between 30-130 knots (between about 55 km/h and 240 km/h). A typical amount of wing lift produced at about 50% of designed cruising speed is about 25% of aircraft weight. A typical amount of wing lift produced at about 75% of designed cruising speed is about 50% of the aircraft weight. At cruising speed, a typical amount of wing lift produced is about 70%-90% of aircraft weight.

Before explaining at least one embodiment of the present disclosure in detail, it is to be understood that the present disclosure is not necessarily limited in its application to the details of construction and the arrangement of the components and/or methods set forth in the following description and/or illustrated in the drawings. Features described in the current disclosure, including features of the invention, are capable of other embodiments or of being practiced or carried out in various ways.

Fixed Wing-Fixed Motor Mounting Arrangement

Figure 1B:
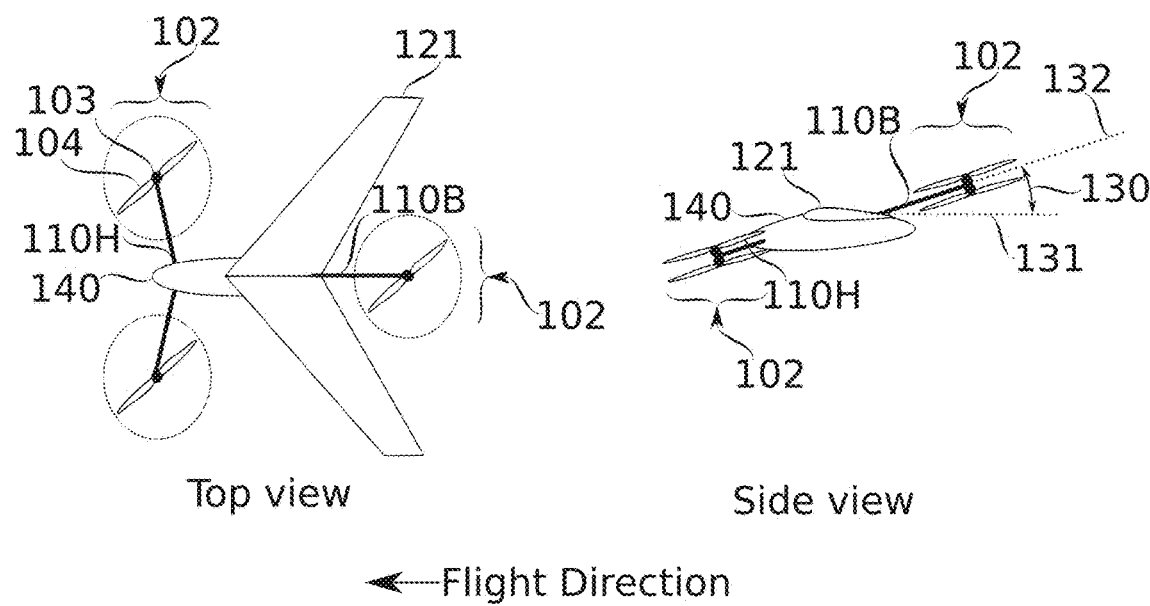
FIG. 1B schematically represents a propeller-driven wing attached to an aircraft fuselage, with rotors oriented at a fixed oblique angle relative to a level-flight horizontal orientation of the wing, according to some embodiments of the present disclosure.

Reference is now made to FIG. 1A, which schematically represents an aircraft comprising a rotor-driven wing 120 with rotors 102 oriented at a fixed oblique angle relative to a pitch axis orientation 131 of the wing 120, according to some embodiments of the present disclosure. Reference is also made to FIG. 1B, which schematically represents a propeller-driven wing 121 attached to an aircraft fuselage 140, with rotors 102 oriented at a fixed oblique angle relative to an orientation 131 of the wing 121, according to some embodiments of the present disclosure. Views are shown as the aircraft are oriented during level forward flight in the direction shown. In both figures, fixed oblique wing-rotor angle 130 is shown (around the pitch axis) between propeller orientation 132, and wing orientation 131; the angle shown is an example, and in some embodiments is selected, for example, from within a range between 5° and 45°, within a range between 10° and 35°, within a range between about 15° and 30°, and/or within a range between about 20° and 25°.

FIG. 1A shows a configuration wherein pairs of front and rear rotors 102 are fixed to the wing 120, each rotor 102 in a pair being fixed by a single respective forward arm 110A or rear arm 110B attached to wing 120, which is thereby positioned between the rotors 102. In FIG. 1A—as for embodiments shown in other figures herein—each rotor 102, in some embodiments, comprises one or more propellers 104, and one or more motors 103 as power sources. In some embodiments, a rotor 102 comprises counter rotating propellers. This is a potential advantage for balancing torque forces. Optionally, a fuselage (not shown) is attached to wing 120.

FIG. 1B shows an aircraft configuration including a fuselage 140, to which at least one rear rotor 102 is attached at a fixed oblique angle relative to wing 120 by a rear arm 110B, and a pair of front rotors 102 is attached, each by a respective forward/lateral arm 110H. Optionally, each a rotor comprises a plurality of propellers and power sources.

Features shown in FIGS. 1A-1B include front-mounted rotors 102 placed lower than the wing 120, and back-mounted rotors 102 placed above wing 120. This configuration reduces or prevents spoilage of airflow both over wing 120, and into rotors 102 (front and back), even when (as in FIG. 1A) all of them are located in-line along a front-to-back axis (parallel to the roll axis). In full forward flight, both the rotors 102 and the wing 120 provide lift. To maintain height in hovering and/or low-velocity flight, power to rotors 102 can be increased, and/or rotors 102 can be re-oriented (by re-orienting the aircraft, e.g., including re-orientation of wing 120) so that the propeller orientation 132 is, for example, substantially parallel to the ground.

Accordingly, the lift provided by wing 120 is not necessary to maintain the aircraft in the air, but can provide (at the cost of wing drag) extra lift to offset loss of lift (for any particular certain power) due to forward tilting of the thrust angle of rotors 102. Optionally, operation with rotors 102 alone is established as airworthy, with the result that wing 120 is never depended on to bear the whole weight of the aircraft. Optionally, this allows wing 120 to be designed with a smaller, thinner, and/or more lightweight construction, potentially reducing drag and/or load.

In some embodiments, rotors (comprising motors as such and propellers) installed forward of the center of gravity have different tilt angles (in any axis, optionally including the pitch axis) and/or different propeller geometry in relation to the rotors (motors as such and propellers) installed rear of the center of gravity. This option is available to all aircraft embodiments described herein.

In some embodiments, an air vehicle (aircraft) design places the center of lift produced by the wing forward or rear of the aircraft's center of gravity. This potentially leads to the air vehicle developing an up or down pitch moment during forward flight. In some embodiments, this is compensated for by flight control commanding, e.g. more power to the forward motors and less to rear motors in the case of the center of lift being rear of center of gravity, and vice versa for the center of lift being in front of center of gravity. This option is available to all aircraft embodiments described herein, except as relates to embodiments of aircraft with a feature that requires for its functionality placement of the center of lift at the aircraft's center of gravity.

Optionally, design and/or tilt angle of the propellers and motors that are on the side forward or rear of the center of gravity that requires additional power during forward flight are relatively optimized for forward flight performance (e.g., by power source strength and/or propeller design), while design and/or tilt angle of the propellers and motors that are on the side forward or rear of center of gravity that requires less power during forward flight, can be optimized for hover performance. Potentially this increases overall performance.

Propeller design optimization, in some embodiments, comprises adjustment to the design of the (optionally fixed) pitch angling of the propeller blade to be relatively-well optimized for efficiency at a higher relative speed of air therethrough, or a lower relative speed of air therethrough. For example, the propeller has a peak efficiency at a first (perpendicular) airspeed, but is intended for use in flight at a speed above this. A portion of the efficiency of the propeller is regained, in some embodiments, by tilting it to an oblique angle compared to the direction of forward flight. Accordingly, thrust efficiency lost to forward flight by this oblique orienting is optionally recaptured, at least in part.

In some embodiments, pitch angling of a propeller blade optimized for forward flight performance comprises a portion pitched so steeply (that is, generating such a large advance ratio for a given rate of freestream air speed) that it stalls during hovering flight. For example, the stall zone of a forward-flight optimized propeller blade is at least 20% of the blade length, at least 30%, or at least 50% of the blade length. Typically, the stall zone extends from a radially inward portion of the blade (e.g., the side attached to the propeller hub) outward. At a typical stall angle, the angle of attack is about 15° or greater off the orientation of the blade- or wing-chord.

In some embodiments, for example, propellers on the side forward or rear of the center of gravity are given a relatively greater blade pitch angling (and/or larger stall zone) than propellers on the opposite side. In some embodiments, propellers located nearer or further from the center of gravity are given a relatively greater blade pitch angling (and/or larger stall zone) than propellers more distant from the pitch angle center of gravity (propellers within one of these groups are optionally located on the same or different sides of the pitch angle center of gravity). More particularly, in some embodiments, propellers relatively closer to the center of gravity are relatively optimized (e.g., by choice of pitch angle) to deliver efficient high thrust during hovering, compared to propellers relatively further away from the center of gravity. The further propellers are optionally configured to deliver a lower hovering thrust (e.g., due to stall losses and/or by controlling propeller rotational speed) making use of their relative mechanical advantage.

In some embodiments, front and back rotors are mounted at different distances along the roll axis from the center of gravity (e.g., different distances in hovering flight, and/or at other flight angles). This potentially affects what relative thrusts are used to maintain a particular pitch angle. For example, torque exerted on the aircraft body by thrust from a rotor nearer to the center of gravity is optionally counterbalanced by torque exerted further from the center of gravity by another rotor using a lower thrust. This, in turn, is used, in some embodiments, to allow a rotor optimized for forward thrust to be angled to produce less downward thrust (e.g., during landing) than a rotor which is optimized for producing hovering thrust. In some embodiments, forward-flight total thrust provided from rotors with a more nearly vertical in-flight thrust orientation is reduced compared to total thrust from rotors with a more nearly horizontal in-flight thrust orientation, by designing the aircraft with a center of gravity nearer to the more nearly horizontal rotors. Alternatively, in some embodiments, loss of vertical thrust from the more nearly horizontal-thrusting rotors is compensated for by placing them at a relatively greater distance from the aircraft center of gravity. Optionally, flight control software is configured to adjust power depending on differences in the center of gravity which may occur, for example, due to differences in load weights and/or distributions, and/or movements of passengers and/or cargo during flight. These adjustments are optionally programmed explicitly, and/or determined, e.g., by using automated sensing of the responsiveness of the aircraft attitude in response to commanded rotor power.

It is noted that the center of lift of aerodynamic surfaces may also contribute to shifting an "effective" center of gravity of the aircraft during forward motion, in embodiments where the center of aerodynamic lift is offset from the aircraft's static center of gravity.

In some embodiments, a relatively low-thrust "hover assist" motor is placed relatively quite far along the roll axis from the center of gravity, e.g., at least 2×, 3×, or 4× further than counterbalancing motors on the other side of the center of gravity. This potentially provides an assist to allow main motors on a same side of the center of gravity as the hover assist motor to be mounted at a more nearly thrust-horizontal attitude, providing a potential advantage for forward flight efficiency. Optionally, the hover assist motors are recessed, carried in a streamlined cowling, featherable (e.g., flattenable relative to the direction of airflow), collapsible, and/or retractable to reduce drag during forward flight. Optionally, a lower power requirement keeps the hover assist motor and its mountings light enough that the deadweight and/or drag penalty is justified by the increase in horizontal thrust efficiency. The hover assist motor, in some embodiments, is not required to be operable for airworthiness of the aircraft; but rather provides an optional alternative to maneuvers such as deceleration and/or hovering that the aircraft would otherwise perform while oriented at a different and/or more variable pitch angle.

It is noted in particular that when front and rear rotors are mounted at different pitch orientations (attitudes), the hovering mode may be with neither propeller type being horizontal to the ground, but rather, e.g., with the planes of the propellers meeting to form a V or inverted V. Herein, such a configuration should be considered to produce a thrust direction equivalent to a "ground-horizontal" orientation for rotors which all share a common pitch orientation, insofar as the net direction of thrust is concerned: since the thrust produced by all rotors combined is orthogonal to the ground.

Figure 1C:
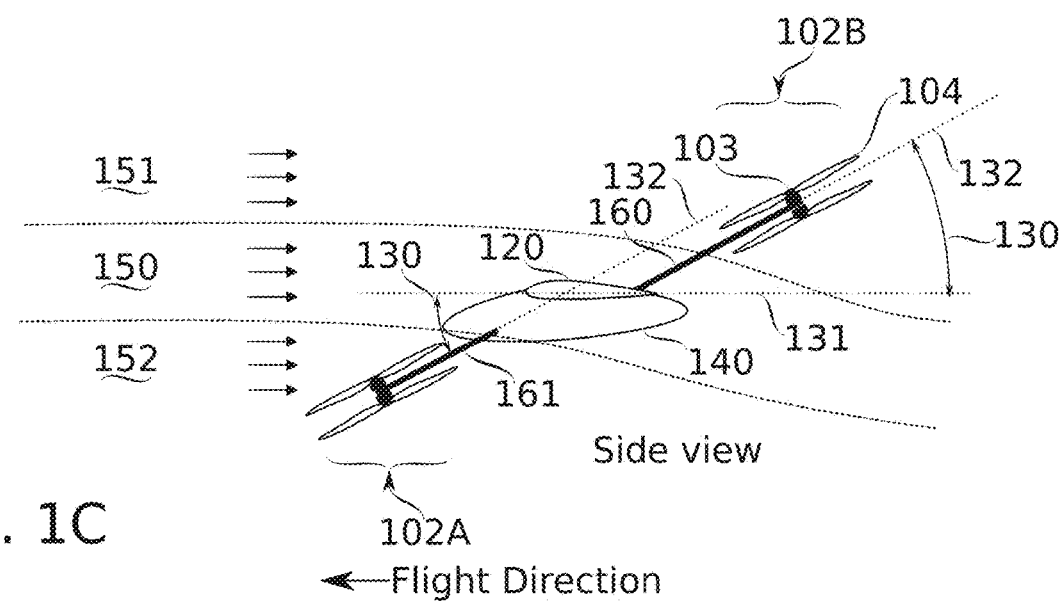
FIG. 1C schematically represents flows of air respectively through forward rotor(s), rear rotor(s), and over a wing of an aircraft having rotors oriented at fixed oblique angles to the wing, according to some embodiments of the present disclosure.

Reference is now made to FIG. 1C, which schematically represents flows of air 152, 151, 150 respectively through forward rotor(s) 102A, rear rotor(s) 102B, and over a wing 120 of an aircraft having rotors 102A, 102B oriented at fixed oblique angles to the wing 120, according to some embodiments of the present disclosure.

In some embodiments of the present disclosure, the motors (e.g., rotors 102A, 102B) are positioned in a way that airflow to and from the propellers is not disturbed by the wing or flow disturbance by the wing is minimized. For example, none of the motors directs air onto and/or in the direction of a wing surface, and/or none of the motors has a thrust vector pointing at a wing surface. Additionally, in some embodiments, the rotors are positioned so that air that is potentially disturbed, e.g., by wing eddies, is not taken through the rotors. For example, as shown in FIG. 1C, forward rotors 102A are mounted on arms 161 below and in front of wing 120 (the rotors should be understood to be mounted at least one on either lateral side of the aircraft), and rear rotors 102B (also on either lateral side of the aircraft) are mounted on arm 160 above and behind wing 120. Additional to being positioned in front of the wing, forward rotors 102A are positioned in front of a center of gravity of the aircraft; in addition to being positioned behind the wing, rear rotors 102B are positioned behind a center of gravity of the aircraft.

During forward flight airflow to the wing 120 is not disturbed (or minimally disturbed) by wake of propellers 104, and airflow to and from the propellers 104 is not disturbed by the wing 120. During hover, airflow to and from propellers 104 is not disturbed (or minimally disturbed) by wing 120.

This avoidance of mutual interference (e.g., assembling rotors onto arms extending away from fuselage 140 and/or wing 120 surfaces) is a potential advantage for efficiency of lift and/or forward thrust generating components used with for a fixed wing-rotor hybrid aircraft.

Figure 1D:
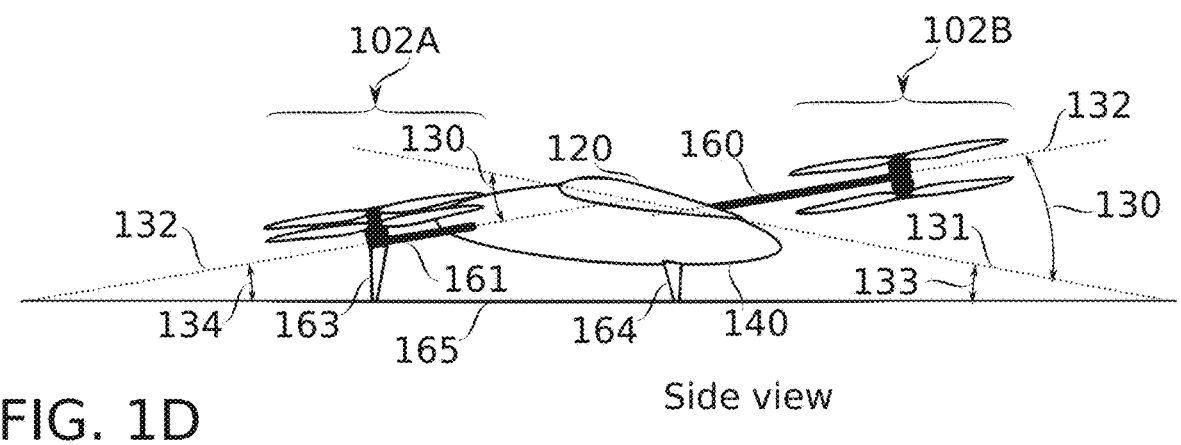
FIG. 1D schematically represents an arrangement of landing gear on an aircraft comprising a wing with rotors oriented at a fixed oblique angle relative to a level-flight pitch axis orientation according to some embodiments of the present disclosure.

Reference is now made to FIG. 1D, which schematically represents an arrangement of landing gear 163, 164 on an aircraft comprising a wing 120 with rotors 102 oriented at a fixed oblique angle relative to wing orientation 131 according to some embodiments of the present disclosure.

Landing gear 163, 164, in some embodiments, are mounted on arms 161, 160 that support motors (e.g., rotors 102A, 102B). Landing gear is optionally, for example, of skid, leg, or wheeled type and is optionally retractable during flight.

It may also be noted that in the landed configuration shown, angle 134 between ground plane 165 and the pitch 132 of propellers of rotors 102A 102B is oblique, and also angle 133 between ground plane 165 and the pitch 133 of wing 120 is oblique. In some embodiments, this results in a landed aircraft pitch orientation which is between the hovering flight pitch of the aircraft, and the full forward flight orientation of the aircraft. Relationships, features, and potential advantages of different aircraft orientation angles and/or orientations of individual elements relative to one another are discussed, for example, in relation to FIGS. 10A-10F, herein.

Reference is now made to FIGS. 1E-1G, which schematically represent rotor-driven aircraft comprising a wing 120 with rotors 102 oriented at a fixed oblique angle relative to an orientation 131 of the wing 120, according to some embodiments of the present disclosure.

FIGS. 1E-1F each show a configuration wherein pairs of front and rear rotors 102 are fixed to the wing 120, each rotor 102 being fixed by a single respective forward arm 110A or rear arm 110B attached to wing 120, which is thereby positioned between the rotor 102 pairs. Each rotor, in some embodiments, comprises one or more propellers 104, and one or more motors 103 as power sources. Any number of such pairs can be used, in any location across the wing or its edges. In FIG. 1E, each of two rotor pairs is mounted on a respective tip (outside edge) of wing 120; in FIG. 1F, an added pair of rotors is mounted at the middle of the wing 120. A difference between FIG. 1F and FIG. 1E is the addition of two additional rotors. It should be understood that more rotors (e.g., to support a heavier wing body) are optionally added, for example as shown.

FIG. 1G shows a combination of a single pair of mid-wing mounted rotors 102 on bars 110A, 110B, with an additional pair of rotors 102 each attached by a bar 110C to a respective outside edge of the wing 120, the bars 110C extending generally parallel to the pitch axis of wing 120 rather than toward the front or rear.

Reference is now made to FIGS. 1H-1O, which schematically represent rotor-driven aircraft comprising a wing 121 and fuselage 140, with rotors 102 oriented at a fixed oblique angle relative to an orientation of the wing 121, according to some embodiments of the present disclosure.

Motors are optionally attached directly to any suitable part of the air vehicle, for example: fuselage or fuselage extensions (including structures also referred to herein as "arms" or "bars"), wings, supporting struts between wings or between wing and fuselage, and/or on vertical surfaces or stabilizers.

Figure 1H:
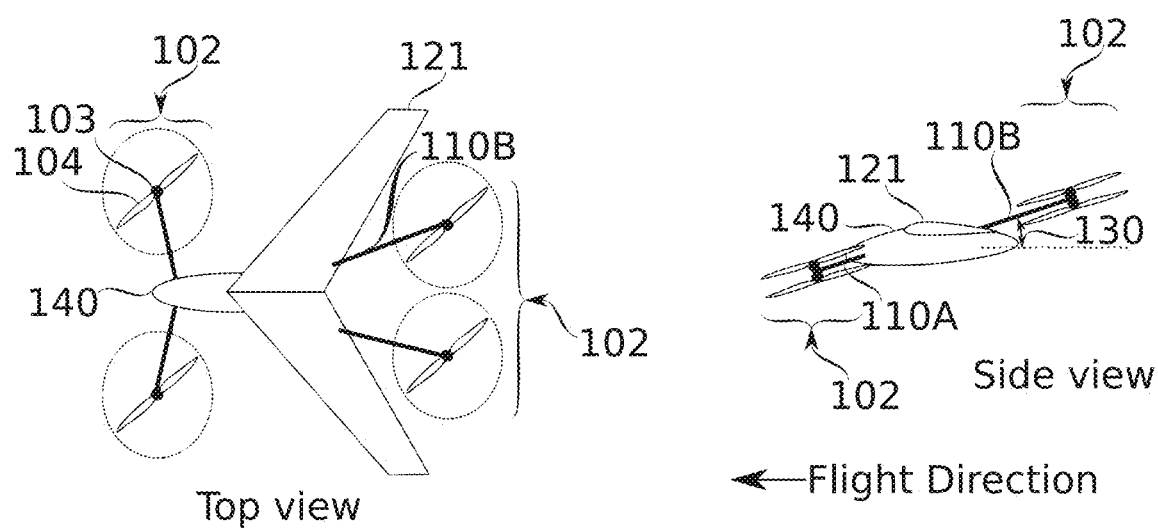
Figure 1I:
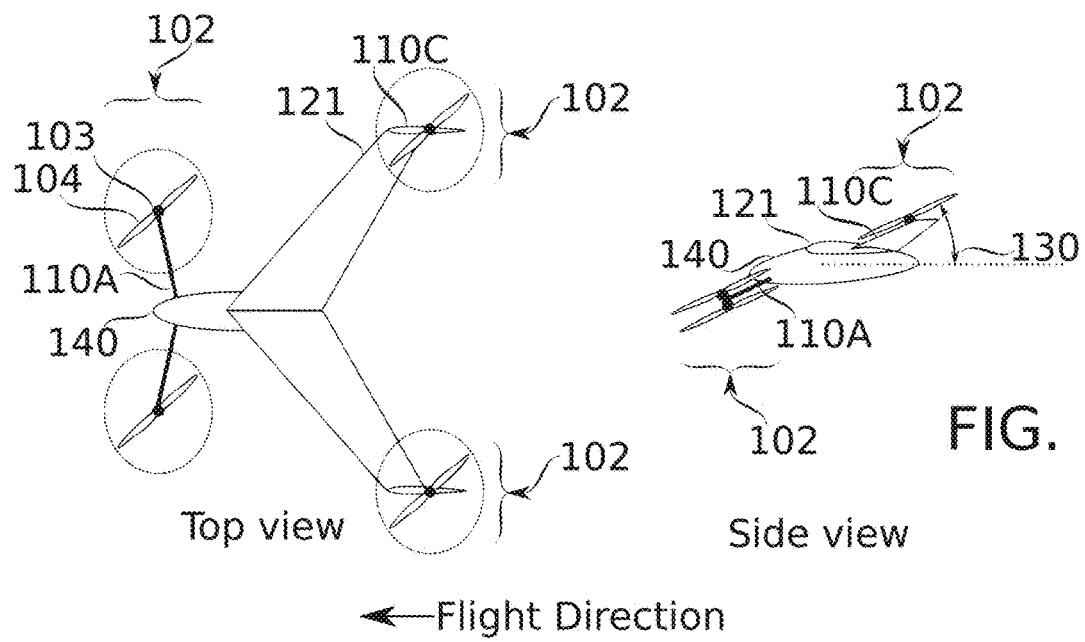
Figure 1J:
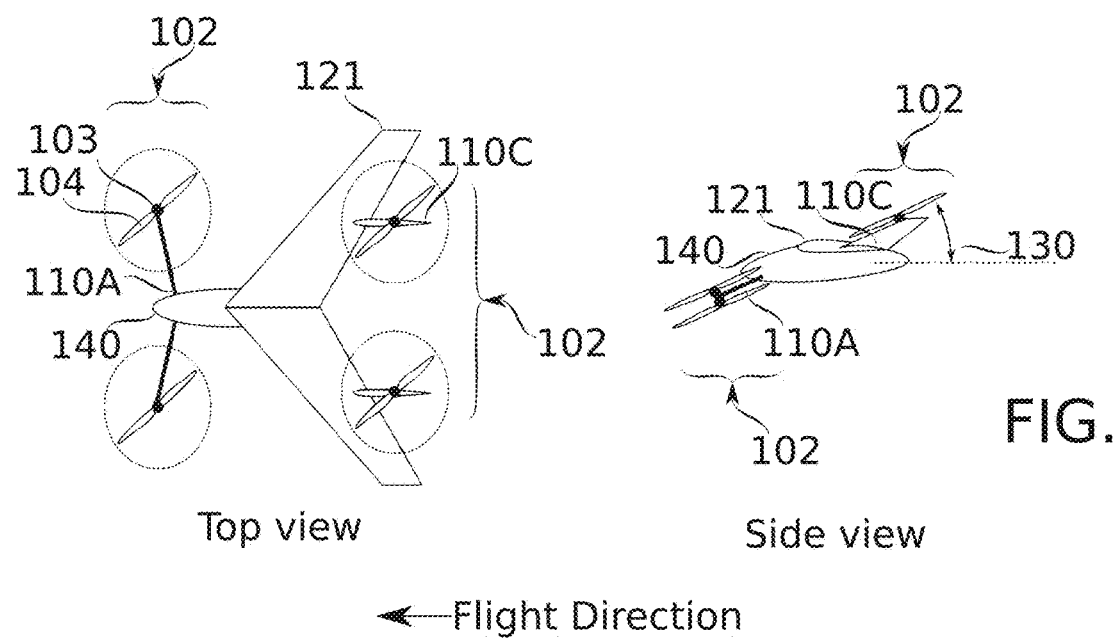
Figure 1K:
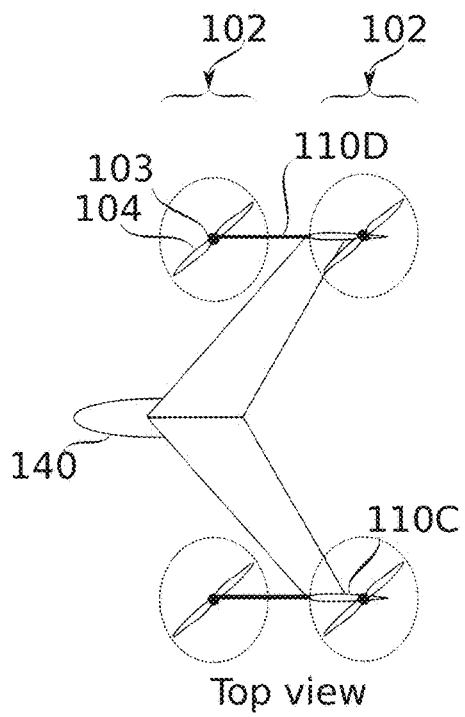
Figure 1K:
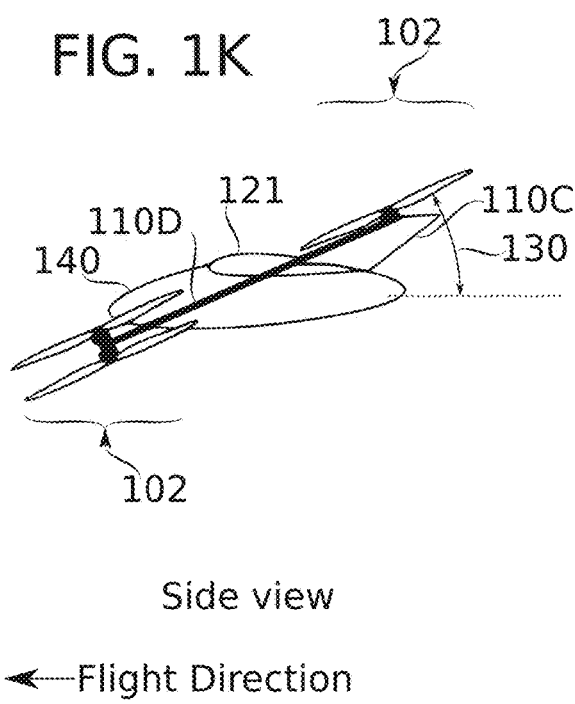
Figure 1L:
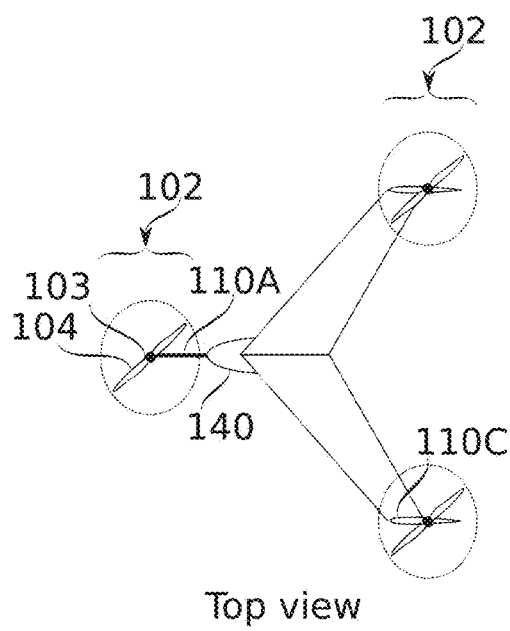
Figure 1L:
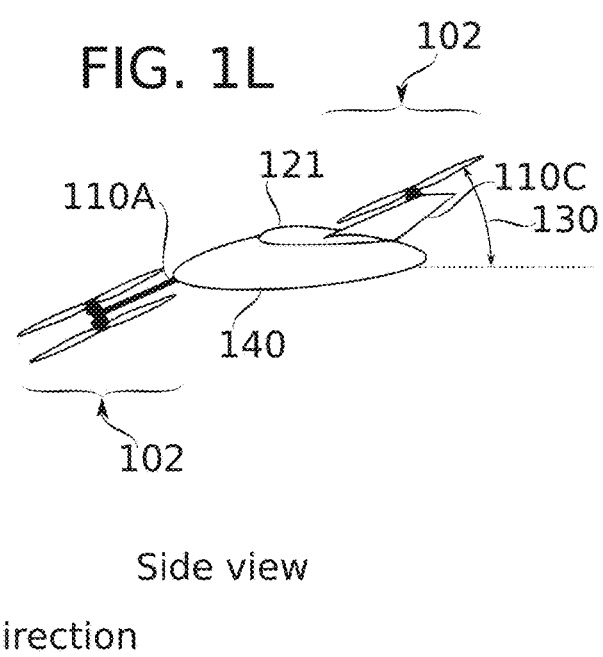
Figure 1M:
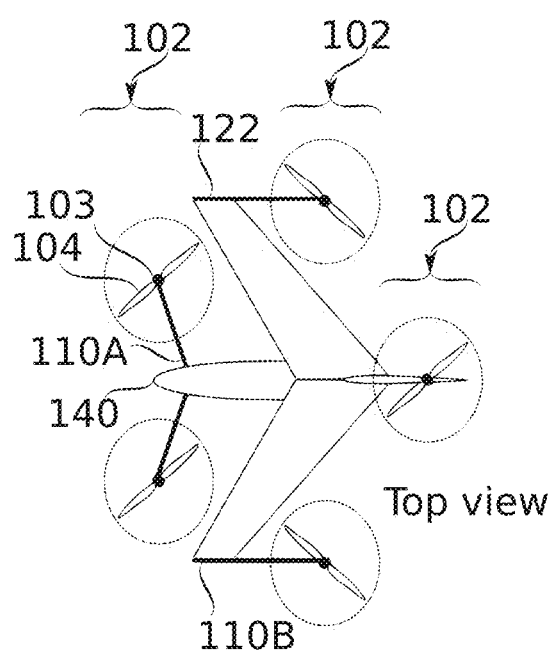
Figure 1M:
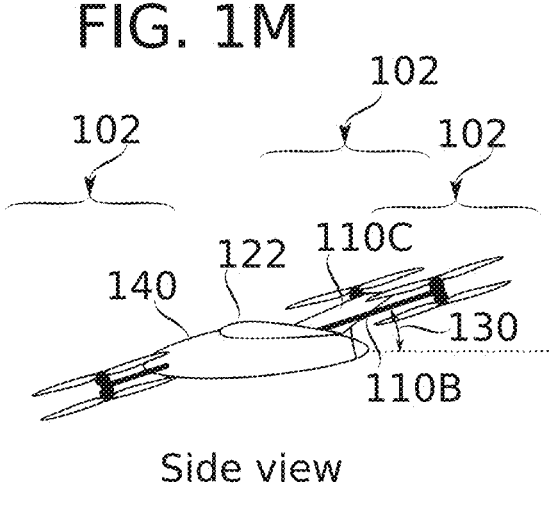

It is noted that in several respects, the overhead and swept-back wing design of FIG. 1H is similar to the design shown in FIGS. 11A-11C—two rotors 102 mounted on arms 110A ahead and partially below the fuselage 140 (and entirely below wing 121), and two rotors 102 mounted on arms 110B behind and above the fuselage. Wing 121 is mounted overhead fuselage 140. Front arms can optionally be two separate arms or one single bar, e.g., crossing the nose.

FIGS. 1I-1M illustrate examples of configurations where some motors 103 and propellers 104 are mounted on vertical stabilizers 110C.

Figure 1N:
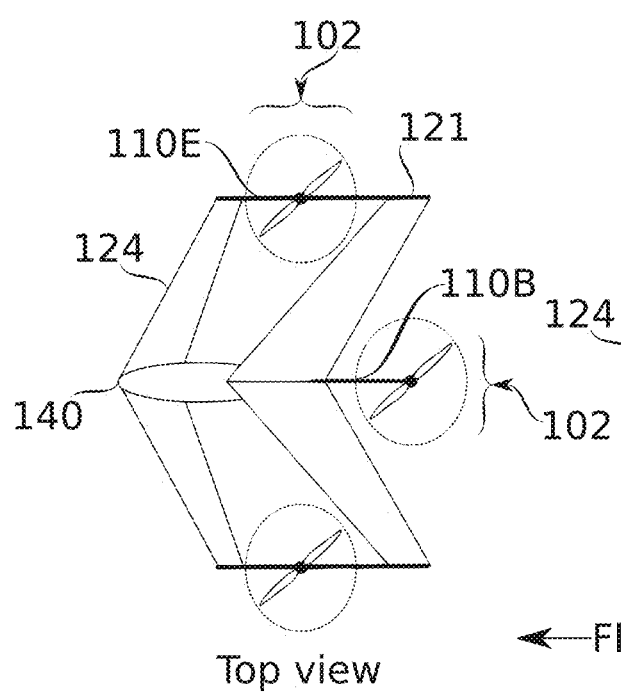
Figure 1N:
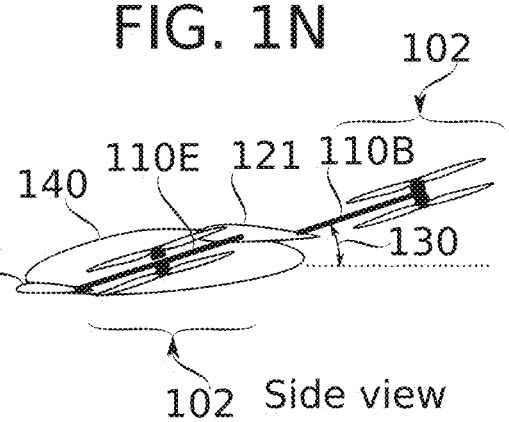
Figure 10:
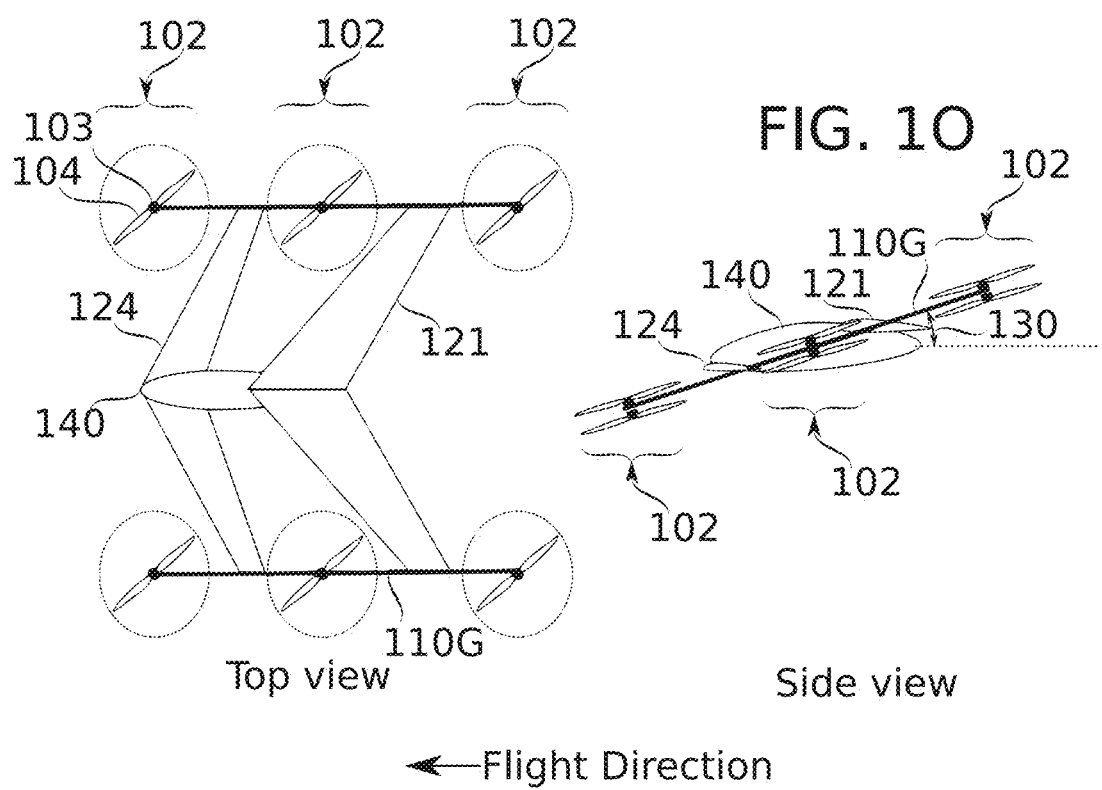
FIGS. 10A-10C schematically represent changes in aircraft attitude during takeoff and/or landing operations, according to some embodiments of the present disclosure.
FIGS. 10D-10F schematically illustrates an aircraft with forward rotors and rear rotors at different angles relative to each other, according to some embodiments of the present disclosure.
FIGS. 10G-10I schematically illustrates an aircraft with forward rotors and rear rotors at different angles relative to each other, according to some embodiments of the present disclosure.

FIGS. 1N-1O illustrate examples of configurations wherein motors are mounted on bars 110E, 110G between wings 121, 124, and optionally extensions of these bars in multi-wing or canard type configurations. Arms can connect two wings, or a wing and a stabilizer; and motors can be mounted on the arm between the two surfaces.

Figure 1P:
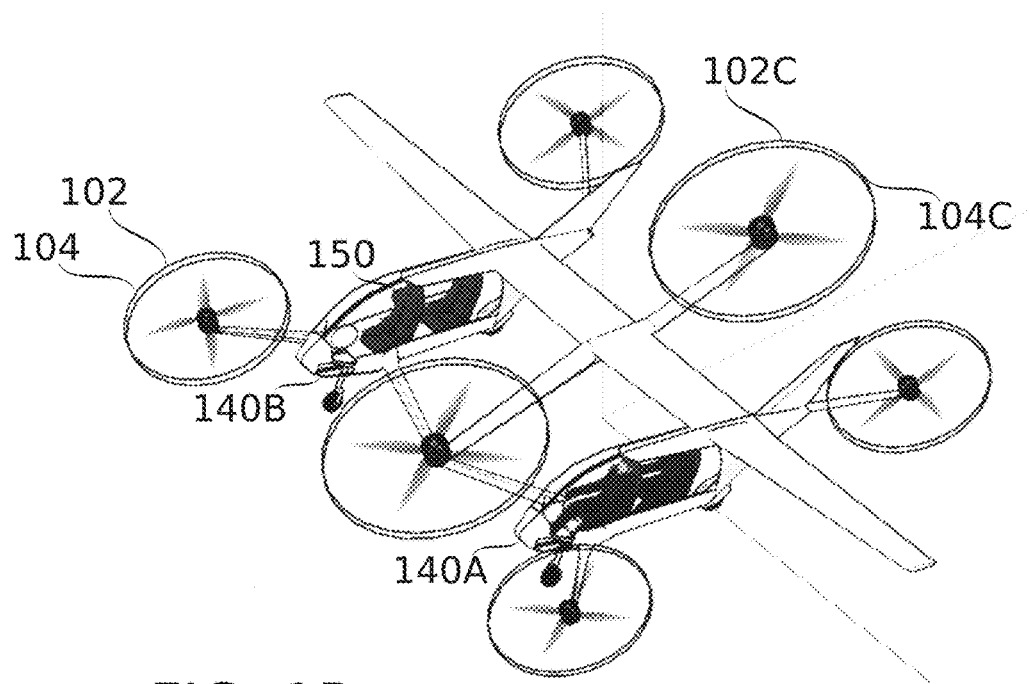
FIG. 1P schematically represents a rotor-driven aircraft comprising a wing and dual-fuselage, with rotors oriented at a fixed oblique angle relative to an orientation of the wing, according to some embodiments of the present disclosure.

Reference is now made to FIG. 1P, which schematically represents a rotor-driven aircraft comprising a wing 121 and dual-fuselage 140A, 140B, with rotors 102, 102C oriented at a fixed oblique angle relative to an orientation of the wing 121, according to some embodiments of the present disclosure. The aircraft of FIG. 1P includes seating 150 for two passengers in each of the two fuselage sections 140A, 140B. It is noted that there is no particular requirement for rotor propellers to be the same size; e.g., the propellers 104C of rotors 102C are optionally larger in size than the propellers 104 of rotors 102.

Figure 1Q:
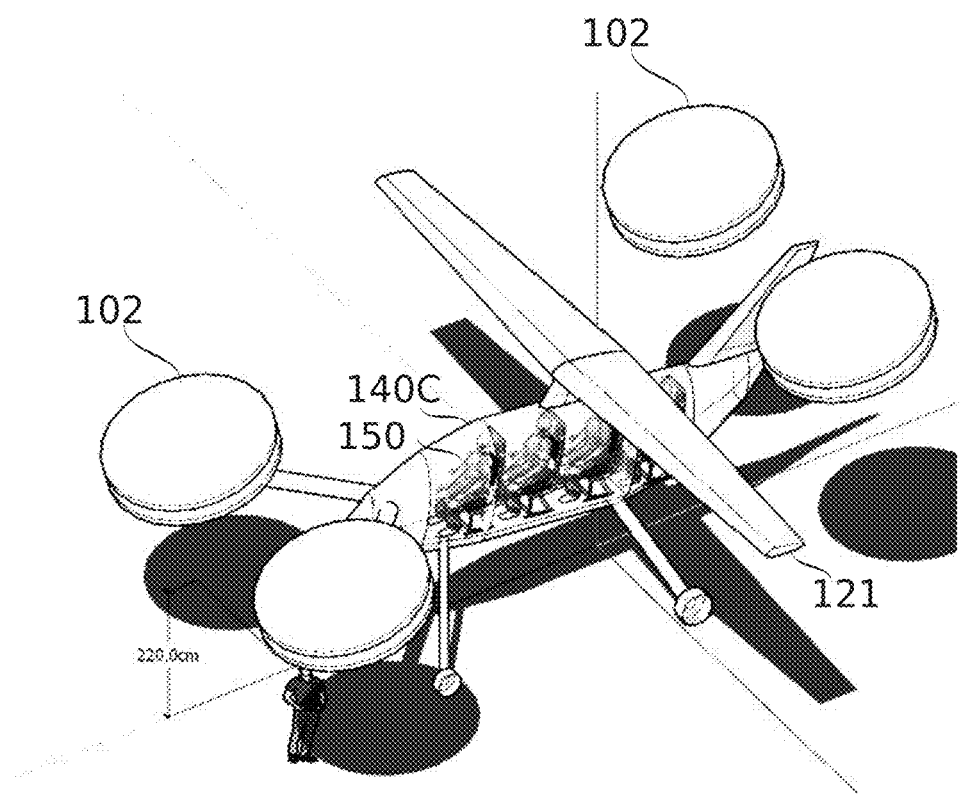
FIG. 1Q schematically represents a rotor-driven aircraft comprising a wing and four-seat fuselage, with rotors oriented at a fixed oblique angle relative to an orientation of the wing, according to some embodiments of the present disclosure.

Reference is now made to FIG. 1Q, which schematically represents a rotor-driven aircraft comprising a wing 121 and four-seat fuselage 140C, 140B, with rotors 102 oriented at a fixed oblique angle relative to an orientation of the wing 121, according to some embodiments of the present disclosure. Details of rotors 102 and their mounting struts are suppressed to allow showing the arrangement of four seats 150 within fuselage 140C.

FIGS. 1E-1Q include embodiments with up to six rotors. It should be understood that more rotors (e.g., to support a heavier aircraft) are optionally added as called for by the size and/or weight of the aircraft. For example, the fuselage 140 of FIG. 1O is elongated, in some embodiments, with additional rotors 102 added along bars 110G as needed. It is not required that additional rotors 102 be added along the same bars; for example, they could be added on additional struts or bars. It is also emphasized that there is no requirement that all rotors 102 be co-planar, nor that they all share the same oblique orientation relative to a wing 121, 124; for example, different orientation configurations are described in relation to FIGS. 10A-10I.

It should be understood that mounting options shown can be applied to air vehicles that have an empennage, canard, multiple wings or other stabilizing or lift generating elements, including configuration of such elements not explicitly shown.

Relative Element Orientations and Attitude Changes During Maneuvering

Figure 10A:
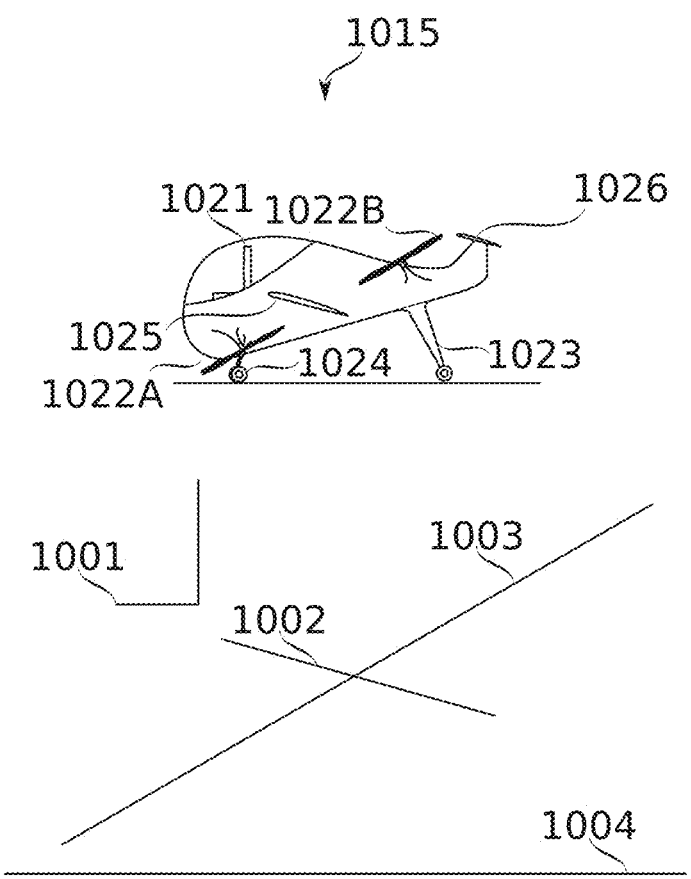
Figure 10B:
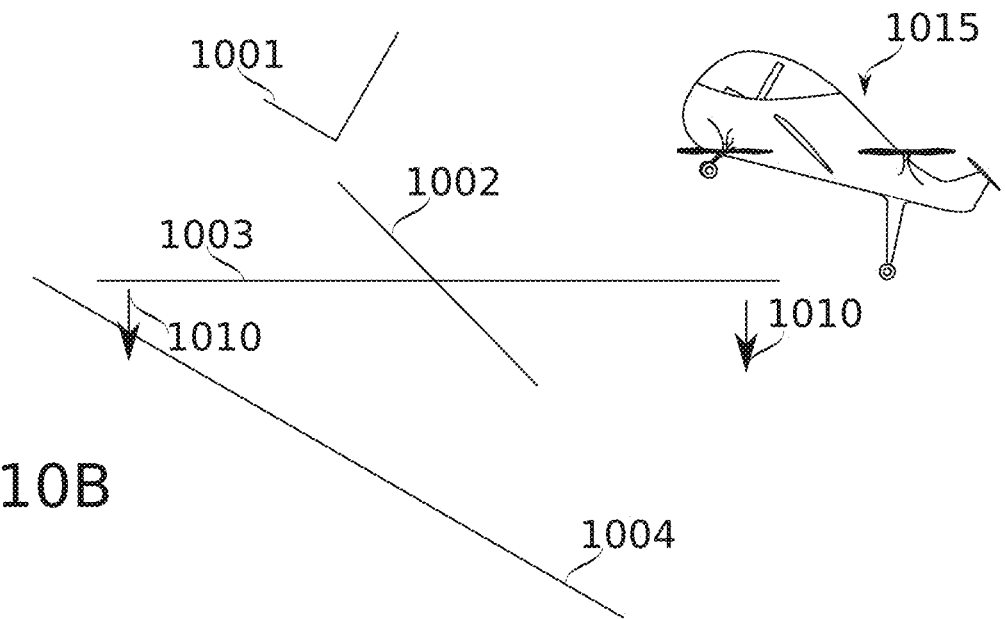
Figure 10C:
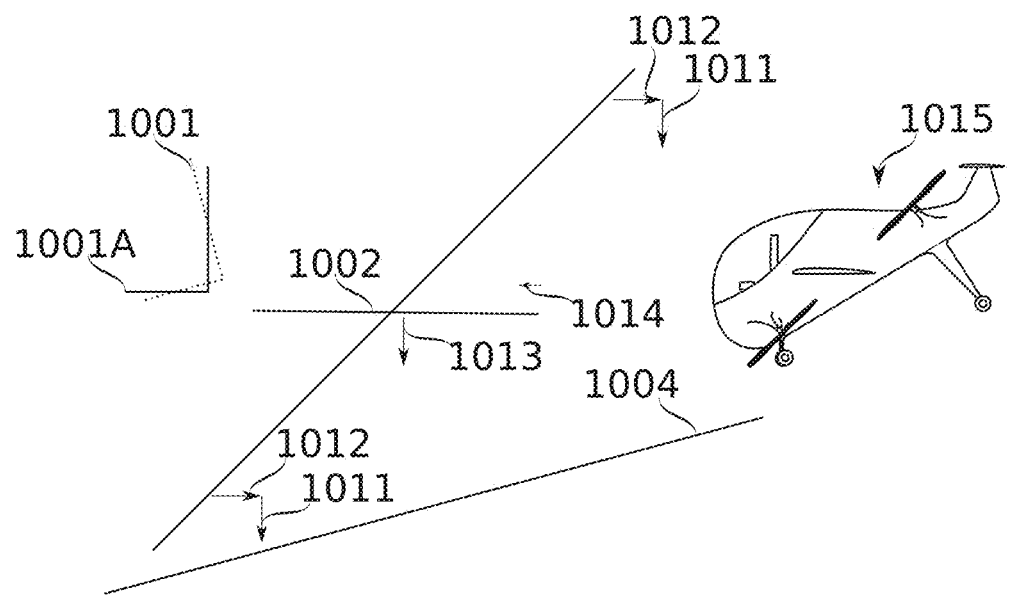

Reference is now made to FIGS. 10A-10C, which schematically represent changes in aircraft attitude during take-off and/or landing operations, according to some embodiments of the present disclosure.

FIG. 10A represents an aircraft 1015 on the ground. In the example shown, both front rotor(s) 1022A and rear rotor(s) 1022B are oriented to the same oblique pitch angle to main wing 1025 and optional secondary wing 1026 (optionally implemented as part of the aircraft empennage). Optionally, they are oriented to different pitch angles; identical pitch angles are used for purposes of description.

Also illustrated are rear and front landing gear carriages 1023, 1024, fuselage 1025, and variable-attitude ("reclining") cockpit chair 1021. Cockpit chair 1021 represents generally arrangements within the aircraft cabin which allow attitude-angle adjustments for occupants and/or cargo, independent of the overall tilt of the aircraft.

Schematic chair 1001 corresponds to the attitude of cockpit chair 1021. Wing plane 1002 corresponds to the pitch orientation of primary wing 1025 (optionally parallel to the pitch orientation of optional secondary wing 1026). Propeller plane 1003 represents a plane parallel to the propeller orientations of rotors 1022A, 1022B. Ground contact plane 1004 represents a plane within which the landing carriages 1023, 1024 make ground contact. While the landing gear carriages 1024, 1023 are optionally mobile between a plurality of positions (e.g., retracted during flight), they are illustrated as fixed for purposes of description.

In the example shown, the obliquity of the wing-rotor pitch angle shown is 45°. When the aircraft 1015 is landed, the landing gear carriages 1023, 1024 are configured to hold the aircraft at an angle where wing plane 1002 is oblique to the ground (at about 15°), and propeller plane 1003 is oblique the ground with an opposite tilt (of about 30°). Schematic chair 1001 is shown in a vertical position. Optionally schematic chair 1001 is not strictly vertical, but rather "comfortably" vertical, e.g., with respect to preferred visibility and/or ergonomics provided to cabin occupants.

FIG. 10B shows all the same elements, with their relative angles also the same, during a period of hovering and/or initial takeoff/landing contact with the whole aircraft pitched upward (nose up) by about 30°. Propeller plane 1003 is horizontally oriented, thereby directing thrust vectors 1010 (corresponding to thrusts from rotors 1022A, 1022B) vertically downward (corresponding to the production of upward lift). Wing plane 1002 is tilted out of its useful orientation for providing lift during flight, and unimportant to flight characteristics during hovering. Schematic chair 1001 is tilted backward by about 30°. For comparison, a typical airliner climbing angle is optionally about 15-20° (commercial aircraft with a typical 25° climb also exist). Optionally, cockpit chair 1021 can itself tilt forward from the position shown, e.g., by up to about 15°, during takeoff, keeping it fully within the range of normal airliner climbing angles.

FIG. 10C shows the same elements again, with most relative angles remaining the same, except that schematic chair 1001A (and the corresponding cockpit chair 1021) is shown tilted forward by about 15° from its earlier orientation (indicated by the dotted line still showing schematic chair 1001). Aircraft 1015 is oriented to a full forward-flight attitude, pitched about 30° downward from its landed orientation. With rotors 1022A, 1022B oriented at about a 45° angle relative to the ground, their thrust is split about equally between horizontal thrust 1012, and vertical thrust 1011. Forward air velocity of wing 1025 results in lift (opposite the direction of downward pushing vector 1013), and a slight amount of drag (opposite the direction of forward pushing vector 1014).

It is noted in particular that occupants of the cabin are optionally subjected to pitch changes in the range of +15° to −30° (without chair or other cabin adjustments), and with them (as illustrated) only in a range of about 0° to −30°. A chair adjustable over ±30° could reduce this range still further, e.g., to between 0° and −15°. Furthermore, the typical landed and cruising forward flight attitudes in particular are optionally kept at 0°, even though the rotors 1022A, 1022B swing through a total pitch angle of about 45° during operation—the period of greatest reclining is isolated to the periods of takeoff and/or landing. Moreover, the landed-to-forward flight transition optionally occurs through an even more limited angle—directly from the landed orientation of FIG. 10A to the forward-flight orientation of FIG. 10C pitched about 15° further forward (nose down). This potentially subjects passengers to no attitude change at all (e.g., if chair tilting is synchronized to the transition to the forward flight pitch). Particularly but not exclusively for aircraft seating relatively few passengers (e.g., 1, 2, or 3 passenger rows), the grounded configuration of the aircraft optionally sits with rows of seats at different heights, e.g., different by about 20-50 cm or more. For significantly longer aircraft (e.g., 4 or more rows of seating), this is potentially inconvenient, so a more horizontal grounded configuration of seating is optionally used. In hovering flight, the seating area in such a long aircraft potentially re-orients (along with the aircraft itself) so that, e.g., the passenger cabin floor of a corridor leading between seats slopes backward; in forward flight, the same passenger cabin floor slopes forward.

Optionally, forward attitude changes experienced by cabin occupants/cargo during deceleration before landing is kept to a minimum by decelerating slowly, making use of aerodynamic drag, reducing forward pitch gradually, and/or yawing the whole aircraft to fly backwards during a portion of the deceleration phase. Descent to landing will typically from full hover potentially still subjects occupants/cargo to the full −30° tilt (in this example). In some embodiments (e.g., with rolling landing gear), descent to landing at low ground speed (optionally backward) potentially reduces this experienced tilt still further, for conditions where such a landing approach is considered preferable.

It is noted that efficiency is potentially increased when wing lift (opposite vector 1013) dominates over downward rotor thrust vectors 1011, and more rotor thrust is directed into horizontal rotor thrust vectors 1012. Accordingly, there is a potential advantage to be achieved by accepting extra occupant tilting at some phase of flight, in exchange for a more forward-pitched flight orientation of the rotors 1022A, 1022B.

Figure 12A:
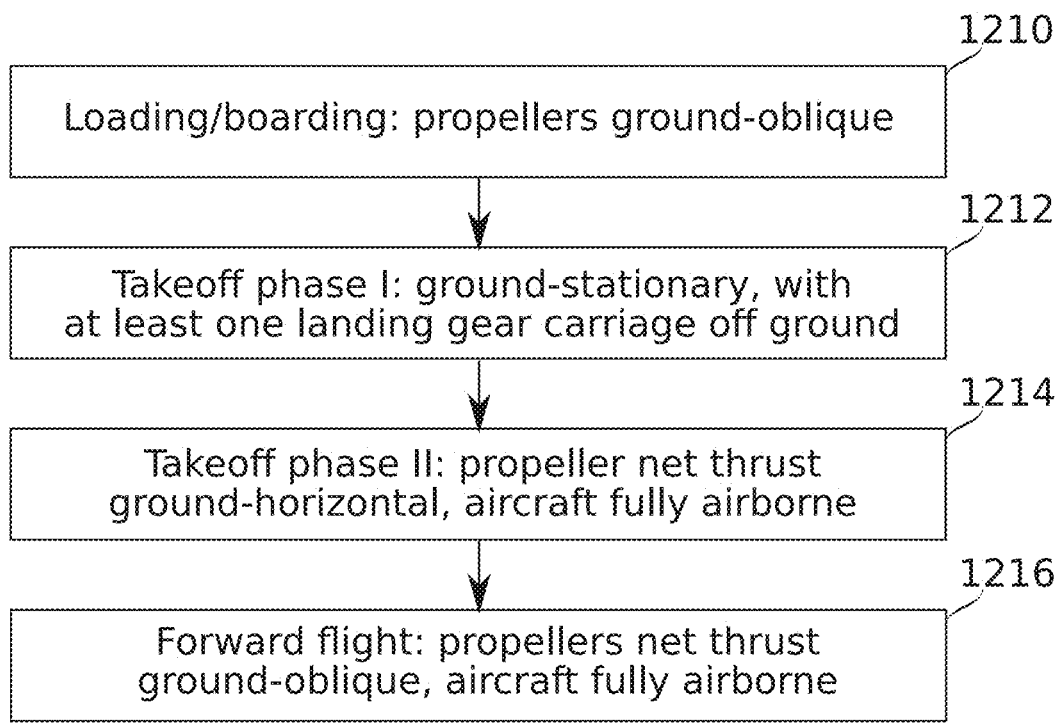
FIG. 12A is a flowchart schematically outlining a method of re-orienting an aircraft during aircraft takeoff, according to some embodiments of the present disclosure.

Reference is now made to FIG. 12A, which is a flowchart schematically outlining a method of re-orienting an aircraft during aircraft takeoff, according to some embodiments of the present disclosure. The aircraft described comprises a wing and rotors oriented at a fixed oblique angle relative to a pitch orientation of the wing 120, (for example as described in relation to FIGS. 1A-1B, 10A-10F, and/or 11A-11C).

At block 1210, in some embodiments, loading/boarding of an aircraft is performed with the aircraft grounded, and the propellers of the aircraft in a ground-oblique orientation; for example as described in relation to FIGS. 1C and/or 10A. The angle of the propellers is optionally selected from within a range, for example, of about 10°-35°, 15°-30°, or another range of angles. Optionally, a wing of the aircraft is also oriented oblique to the ground, for example, of about 10°-35°, 15°-30°, or another range of angles. Optionally, the propellers and wing are oriented at opposing oblique angles relative to the ground, so that their relative oblique angles to the ground sum to give their oblique angle relative to each other.

At block 1212, in some embodiments, a first phase of takeoff occurs. This phase is optional, and comprises re-orientation of the aircraft while a portion of the landing gear remains both in contact with the ground, and ground stationary. In some embodiments, this comprises pitching the aircraft backwards until propellers of the aircraft—initially oriented oblique to the ground—are oriented substantially parallel to the ground. In some embodiments, this also increases the pitch angle of the wing relative to the ground.

At block 1214, in some embodiments, a second phase of takeoff occurs. The aircraft leaves the ground and hovers. If the aircraft was not re-oriented while in contact with the ground as described for block 1212, it is reoriented in the air, optionally after a short period of lateral acceleration. During hovering flight, the aircraft is optionally brought to any suitable altitude in preparation for the transition to forward flight. Block 1214 is also optional for some embodiments of the invention; in some such embodiments, takeoff is direct from grounded to forward flight, bypassing hovering. A potential advantage of gaining altitude while hovering, however, is reduction of risk of collision with nearby ground objects, and/or the opportunity to re-orient the aircraft before initiating forward flight, which can potentially avoid the need for a wider turning maneuver once forward velocity has been obtained.

At block 1216, in some embodiments, forward flight ensues. The transition to forward flight, in some embodiments, comprises adjusting the power ratio between rear and front rotors (or other propulsive device). This induces tilting of the aircraft, with concomitant redirection of a component of net thrust in a horizontal direction. The transition to forward flight optionally occurs during a power regime in which at all times the aircraft is supported by downward-directed rotor thrust which is fully sufficient to keep the aircraft airborne (e.g., prevent downward acceleration and/or maintain altitude). As forward velocity is developed, the wing develops lift. Optionally a ratio of forward rotor power and rear rotor power is adjusted to maintain a targeted pitch. Optionally, for example, once a targeted altitude for cruising forward flight is reached, rotor power is reduced until a portion of the lift needed to at least maintain altitude is provided by airflow over the wing. This potentially provides increased efficiency over use of rotor thrust alone to provide vertical thrust.

Figure 12B:
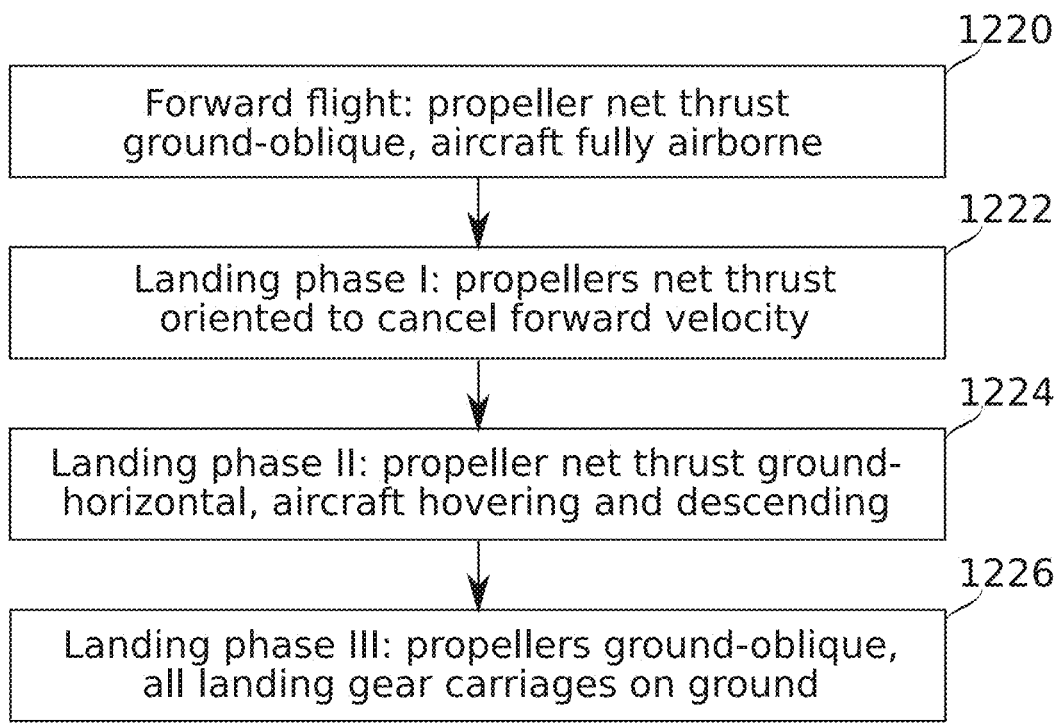
FIG. 12B is a flowchart schematically outlining a method of re-orienting an aircraft during aircraft landing, according to some embodiments of the present disclosure.

Reference is now made to FIG. 12B, which is a flowchart schematically outlining a method of re-orienting an aircraft during aircraft landing, according to some embodiments of the present disclosure. The aircraft described comprises a wing and rotors oriented at a fixed oblique angle relative to a pitch orientation of the wing 120, (for example as described in relation to FIGS. 1A-1B, 10A-10F, and/or 11A-11C).

At block 1220, in some embodiments, the aircraft is in forward flight, for example as described in relation to block 1216 of FIG. 12A.

At block 1222, in some embodiments, and during a first phase of landing, forward velocity is canceled. This is optionally performed using one or more of several techniques, for example as described in relation to FIGS. 10A-10C. In most cases, cancellation of forward velocity comprises a pitch orientation of the rotors to reduce or redirect a component of horizontal thrust. Some techniques might additionally or alternatively re-orient the rotors by yawing the whole aircraft. Cancellation of forward velocity is optional, in some embodiments, e.g., when a rolling landing is to be performed.

At block 1224, in some embodiments, and during a second phase of landing, the aircraft, its horizontal velocity canceled, descends while hovering. The propeller orientation, in this case, is typically parallel to the ground. If propellers are differently oriented (e.g., in pitch), their net horizontal thrust vector is controlled to be zero, allowing the aircraft to remain stationary.

At block 1226, in some embodiments, the aircraft is restored to the state described in relation to block 1210 of FIG. 12A.

Figure 10G:
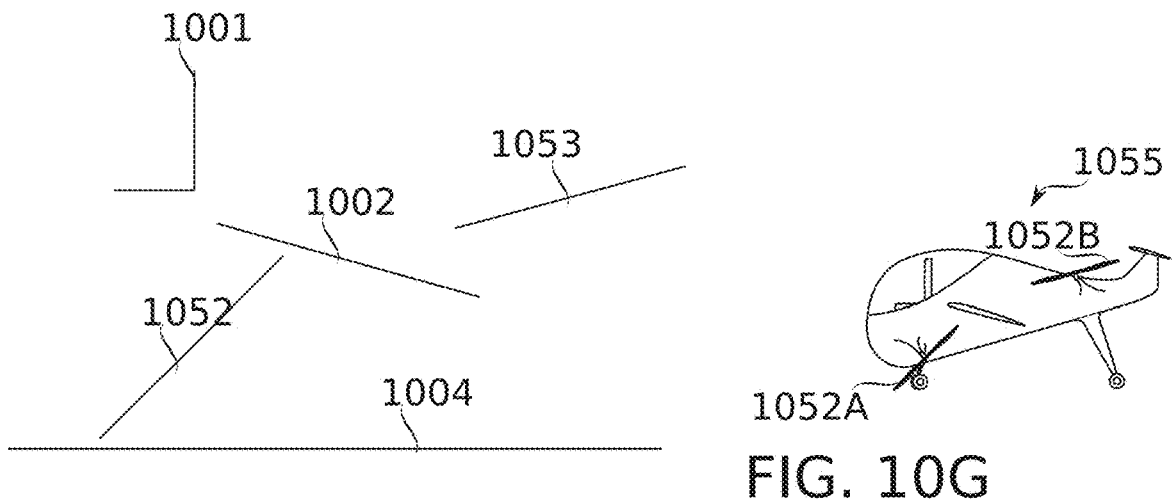
Figure 10H:
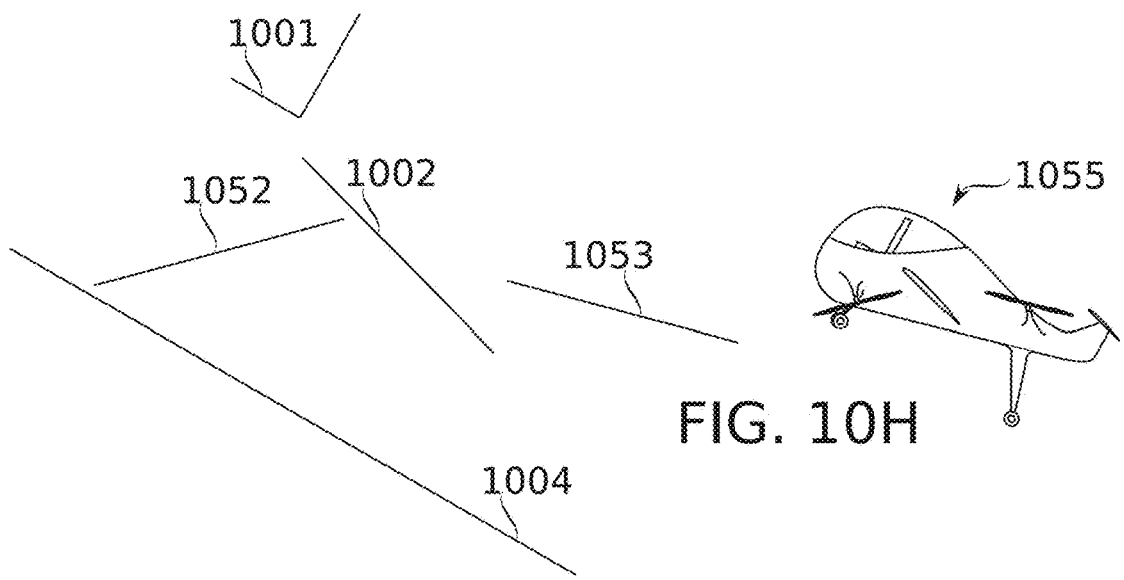
Figure 10I:
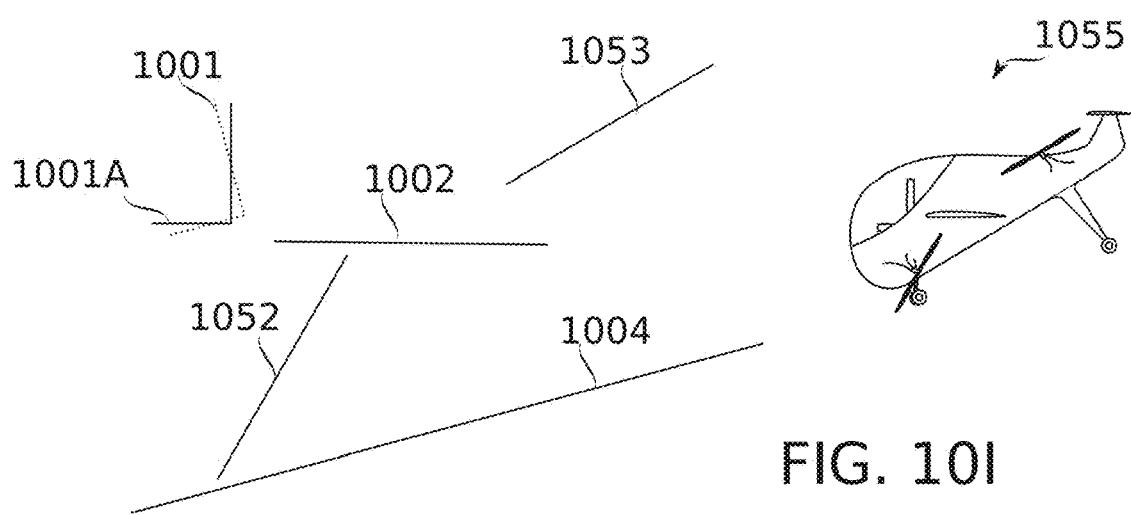

Reference is now made to FIGS. 10D-10F, which schematically illustrate an aircraft 1035 with forward rotors 1032A and rear rotors 1032B at different angles relative to each other, according to some embodiments of the present disclosure. Reference is also made to FIGS. 10G-10I, which schematically illustrate an aircraft 1055 with forward rotors 1052A, and rear rotors 1052B at different angles relative to each other, according to some embodiments of the present disclosure. In FIGS. 10D-10F, the rotors are tilted relative to each other so that their planes intersect relatively lower on or below the aircraft. In FIGS. 10G-10I, the rotors are tilted relative to each other so that their planes intersect relatively higher on or above the aircraft. Other elements of FIGS. 10D-10I are optionally the same as described, for example, in relation to FIGS. 10A-10C. Relative tilts are optionally selected from within a range of up to about 7° (e.g., 5°), which is enough to yield potentially significant performance tuning advantages (optionally differential tuning of the forward and rear motors for hovering/forward flight performance), while maintaining enough similarity of tilt to allow the motors to easily operate cooperatively in both hovering and forward flight modes. Optionally, relative tilt is selected from within a different range, e.g., up to about 15°, 30°, or another angle. However, larger differences within these ranges potentially result in increased control complexity for one or more of the flight modes, and/or diminishing performance returns, depending on the performance characteristics for which the aircraft is being optimized.

As described, for example, in relation to FIGS. 1A-1B, forward and rear rotors 1032A, 1032B 1052A, 1052B can be oriented at different fixed angles to one another (corresponding to pitch planes 1042, 1043, 1052, 1053 respectively), as well as to wing 1025 and wing plane 1002.

Optionally the transition angle between landed state (of FIGS. 10D, 10G), hovering states (as in FIGS. 10E, 10H), and/or full forward flight (as in FIGS. 10F, 10I) remains as small as for a corresponding same-orientation configuration, such as is shown in FIGS. 10A-10C.

Optionally, both sets of rotors 1032A, 1032B, 1052A, 1052B operate at equal power and opposing pitch angles (relative to horizontal) during hovering flight, and optionally they contribute equally to hovering thrust, so that their respective vertical thrusts cancel each other (e.g., as shown in FIGS. 10E, 10H). This hovering state is potentially different in control characteristics from an all-rotors-vertical configuration, since adjustments to power as such, as well as attitude adjustments affected by power will have an effect on horizontal thrust during attempted hovering. Control programming and/or electronics are preferably configured accordingly to take this into account. Optionally, unequal power and/or unequal opposing pitch angles are used during hovering. Optionally, sets of rotors on a same side of the center of gravity along the roll axis include rotors set to different orientations (e.g., two outer rotor at one orientation, middle rotor at another orientation), and the net direction of the thrust vector is controlled by powering the rotors differently. Fly-by-wire control logic is optionally used to simplify control inputs for such configurations.

FIGS. 10F, 10I show aircraft 1035, 1055 in a full forward flight attitude. Rotors 1032B (rear, FIG. 10F), or 1052A (front, FIG. 10I) are oriented to produce more nearly horizontal thrust, while rotors 1032A, 1052B are oriented to produce more nearly vertical thrust. Depending on how much lift is provided by wing 1025, rotors 1032A, 1052B are optionally throttled back considerably, e.g., reduced to a power sufficient to for control and/or maintaining level flight. By contrast, nearly all of the thrust of rotors 1032B or 1052A is available for providing forward thrust. It is noted that maintaining a somewhat oblique angle relative to the direction of forward flight provides a potential advantage by maintaining a lower advance ratio, and potentially greater efficiency at high speeds than a rotor oriented fully perpendicular to the direction of forward flight.

If an aircraft 1035, 1055 is accidentally rotated into a forward flight pitch before sufficient lift is generated from wing 1025 to keep it airborne (or otherwise affected by stall on wing 1025), aircraft 1035, 1055 is potentially returned to a stable flight mode, e.g. by increasing power to rotors 1032A, 1052B and optionally rocking pitch angle back so that rotors 1032B, 1052A also contribute more lifting thrust.

Optionally, re-assuming rotor-sufficient lift (optionally comprising lift from the rotors alone sufficient to maintain altitude and/or to prevent downward acceleration) is performed from a full forward-flight pitch (with wings leveled for providing flight lift) without simultaneously requiring an angle change, or without requiring an angle change of more than, for example, about 5° of pitch. This is not to exclude any further angle change which may potentially occurs as rotor thrusts balance the aircraft in a new equilibrium pitch: the limitation of "without requiring" refers to the level of the instantaneous vertical component of thrust being provided sufficiently to balance the weight of the aircraft and prevent altitude loss and/or downward acceleration.

In some embodiments, rotor thrust can be adjusted in flight-forward orientation to mitigate wing stall without a change in orientation, from a condition of no airspeed, a condition of low airspeed (e.g., less than about 30 kph), and/or from a condition of airspeed within 10-20 kph below the stall speed of the wing. In some embodiments, sets of rotors located ahead of and behind the aircraft's center of gravity produce net thrust vectors pitch tilted with respect to each other by an angle of less than 45°, less than 30°, or less than 15°.

Manned Aircraft Designs

Reference is now made to FIGS. 11A-11E, which schematically illustrate an aircraft 1100 optionally configured for manned flight, and comprising a wing 1120 with rotors 1102 oriented at a fixed oblique angle relative to a pitch orientation of the wing 1120, according to some embodiments of the present disclosure.

In some embodiments, aircraft 1100 comprises upswept wing 1121, optionally with winglets 1122 at its tips, and optionally mounted atop fuselage 1140. Passenger/crew compartment 1141 (e.g., a two-person crew compartment) is optionally provided with large visibility angles, optionally including a transparent canopy that extends low near the nose of the aircraft to increase downward and/or forward visibility at backwards-pitched angles such as may be assumed during hovering. In some embodiments, a low-reaching canopy is facilitated by concentrating instrumentation near the centerline, for example using a panel display 1142 as an instrumentation display and/or user interface.

Rear rotors 1102 are mounted on arms 1110B extending rearward and above wing 1121. Forward rotors are mounted on arms 1110A extending forward and below wing 1121, optionally centering the forward rotors 1102 (e.g., the centers of electric motors 1103) below the fuselage 1140. The high wing design is a potential advantage for allowing the lower rotors to be mounted not too far below the fuselage 1140; for example, the blades of rotor propellers 1104 optionally rise above the bottom of the fuselage 1140.

In some embodiments, landing gear carriages 1162 are mounted on front arms 1110A. Rear landing gear carriages 1161 are optionally attached to fuselage 1140, by dedicated struts.

Ingress to aircraft 1100 is optionally through doors defined around the forward cockpit windows 1143 of the aircraft, which are optionally hinged, e.g., near the front or along the centerline of the aircraft, to swing upward when the door is opened. Additionally or alternatively, in some embodiments, an ingress to aircraft 1100 and/or to a cargo hold of aircraft 1100 is located behind and below fuselage 1140, for example along undersurface 1144. Optionally, undersurface 1144 is configured as a door 1145 (FIG. 11D) which opens by swinging downward, optionally to form a ramp and/or stairway. The tread(s) of such a stairway are oriented to lie horizontally (parallel to a plane defined by the ground-contacting surfaces of the landing gear) when door 1145 is in its normal open configuration and the aircraft 1100 is fully grounded.

Additionally or alternatively, ingress to an aircraft 1100 is provided by a configuration comprising a side-door entrance, e.g., stairs 1147 (which optionally fold down from the fuselage), and/or doorway 1148 (shown open to a lifted configuration; optionally doorway 1148 opens in a different direction). Tread(s) of stairs 1147 are oriented to lie horizontally when aircraft 1100 is in its normal grounded configuration. It is noted that stair access is optionally provided to any embodiment of a passenger-sized aircraft described herein. In general stair treads are configured so that they deploy with treads parallel to the ground when the aircraft is fully grounded. In some embodiments, this results in a configuration with treads and wing and/or treads and rotors each oriented obliquely with respect to the other.

Figure 11A:
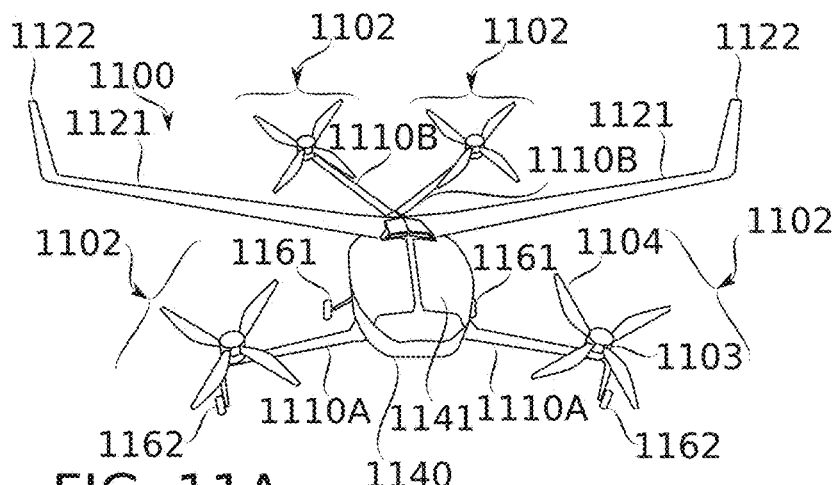
FIGS. 11A-11E schematically illustrate an aircraft configured for manned flight, and comprising a wing with rotors oriented at a fixed oblique angle relative to a level-flight pitch axis orientation of the wing, according to some embodiments of the present disclosure.
Figure 11B:
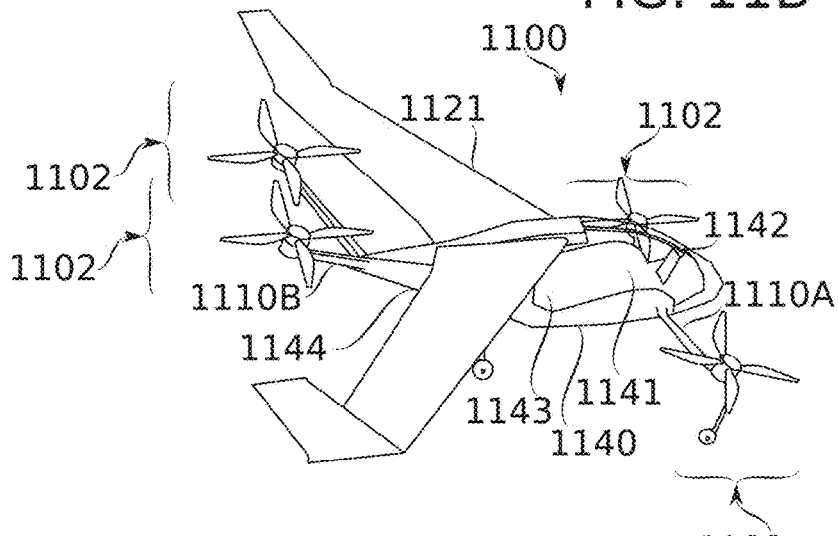
Figure 11D:
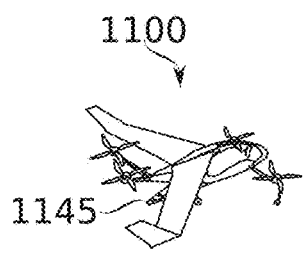
Figure 11C:
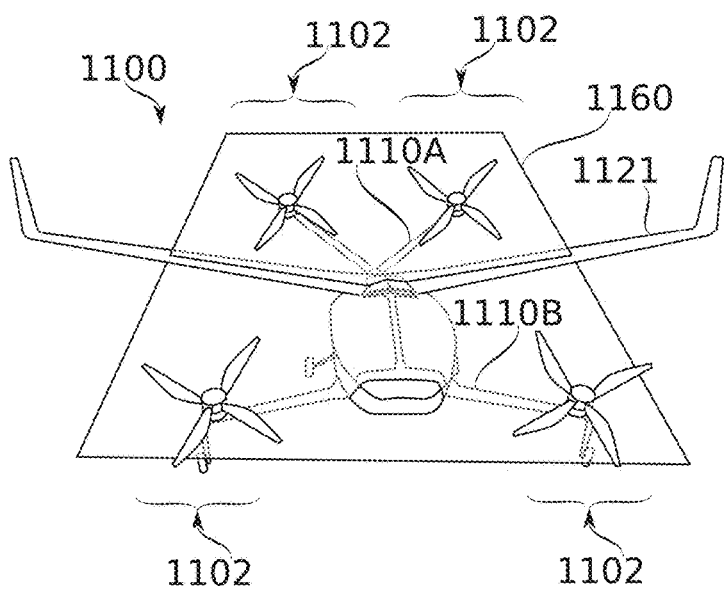
Figure 11E:
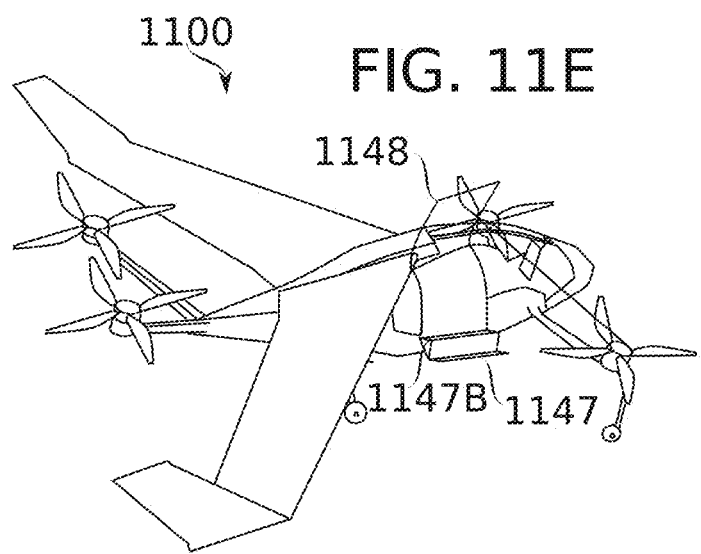

The relative oblique pitch angles of the rotors 1102 and wing 1121 can be appreciated in any of FIGS. 11A-11C. In FIG. 11C, a plane 1160 oriented parallel to the planes of propellers 1104 is shown which crosses obliquely through the wing. In the embodiments shown, this plane also intersects each of the rotors 1102 at about equal positions. This is an optional feature; in some embodiments, the rotor planes are offset and parallel. Optionally, rotor planes are also oblique to each other, for example as described in relation to FIGS. 10D-10I, herein.

Figure 16:
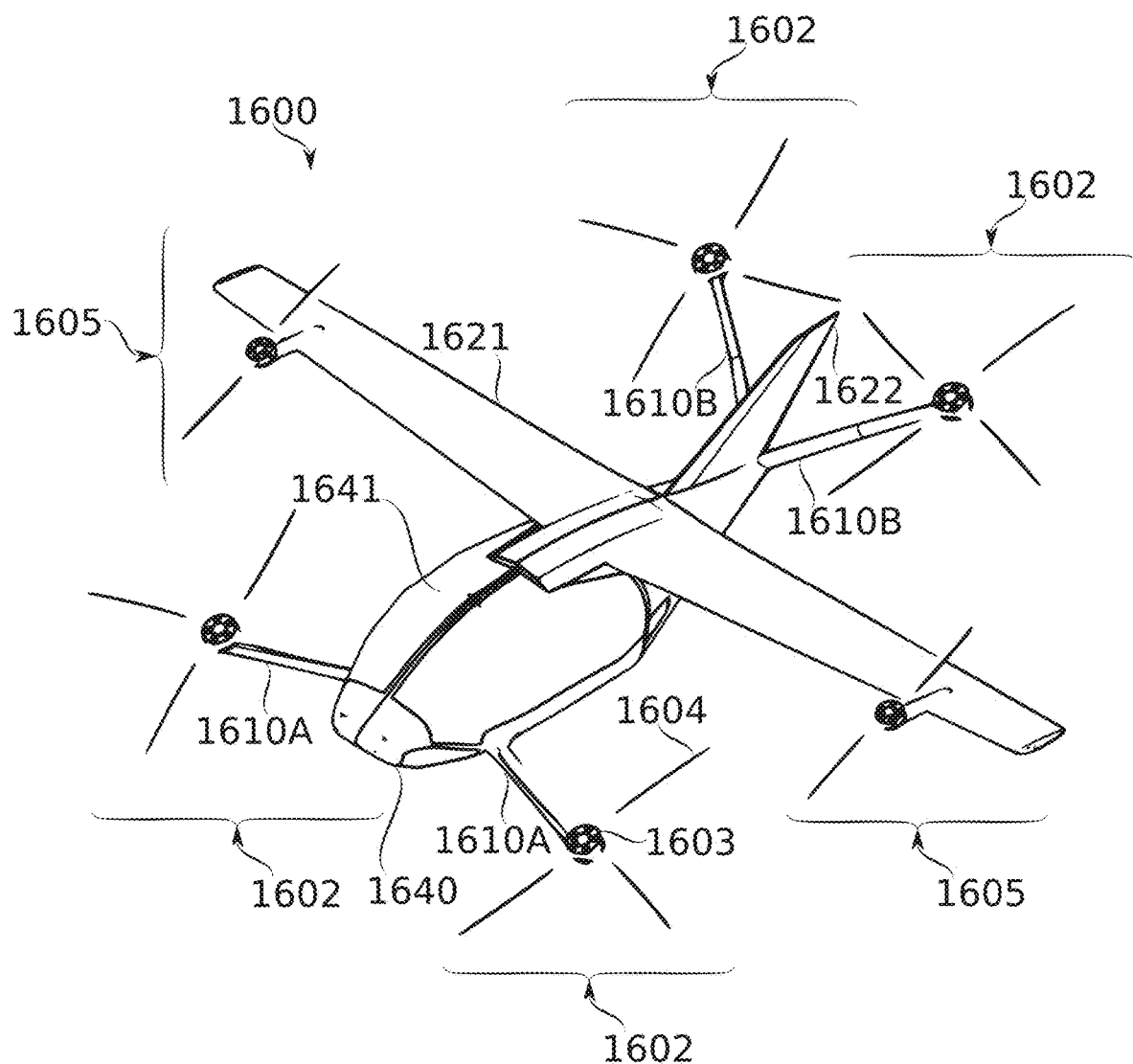
FIG. 16 schematically illustrates an aircraft, optionally configured for manned flight, and comprising a wing with rotors oriented at a fixed oblique angle relative to a level-flight pitch axis orientation of the wing, along with auxiliary rotors, according to some embodiments of the present disclosure.

Reference is now made to FIG. 16, which schematically illustrates an aircraft 1600, optionally configured for manned flight, and comprising a wing 1621 with rotors 1602 oriented at a fixed oblique angle relative to a pitch axis orientation of the wing 1621, along with auxiliary rotors 1605, according to some embodiments of the present disclosure.

In some embodiments, auxiliary rotors 1605 are mounted to wing 1621, optionally at an oblique angle to the wing. The oblique angle may be the same as the oblique rotor-wing angle of rotors 1602, or another oblique angle, for example, an oblique angle which is adjusted to take into account partial thrust vectoring by airflow from rotor 1605 that impinges on wing 1621.

In some embodiments, auxiliary rotors 1605 activate as needed to provide additional thrust for hovering, horizontal maneuvering, acceleration, deceleration, and/or balancing of opposite thrusts (particularly at landing and/or takeoff, and optionally if one or more of rotors 1602 experiences failure). In the configuration of FIG. 16, rotors 1605 are suited in particular for use to provide auxiliary hovering thrust, since their use in full forward flight would tend to exert downward thrust directly on surfaces of wing 1621. Accordingly, the propellers of auxiliary rotors 1605 are optionally configured with blade pitch angles suitable for low airspeeds.

Optionally, auxiliary rotors 1605 are configured to feather their blades, retract, and/or swivel out of the flow of air during rapid forward flight to reduce drag. During full forward flight, the propeller blades of rotors 1605 are optionally held in positions that minimize their effect on the aerodynamics of wing 1620. For example, the propeller blades of rotors 1605 are held in their most vertical position and/or perpendicular to nearby surfaces of wing 1621. Optionally, two blade propellers are used for rotors 1605. While this potentially leads to increased vibrations from these rotors during fast forward flight, vibration effects on, e.g., cabin comfort is optionally minimized by operating these rotors during takeoff, landing, and/or in emergencies.

Auxiliary rotors 1605 are optionally lighter than rotors 1602 (e.g., motor of about half the power and/or weight; propeller with fewer blades, for example two blades vs. four), reducing their deadweight penalty. Optionally, auxiliary rotors 1605 have relative shorter propeller blades than rotor 1602 (potentially reducing their parasitic drag during forward flight), and optionally they rotate at higher revolutions per minute when they do operate, potentially helping to compensate for the smaller blade size.

Optionally, auxiliary rotors 1605 can be activated during forward flight to produce extra thrust; optionally they are reversing for use, e.g., during landing maneuvers. In some embodiments, the auxiliary engines are a convenience and/or safety element, but not required for maneuvering or otherwise providing normal airworthiness of the aircraft. In some embodiments, auxiliary engines 1605 provide redundancy, e.g., for stabilization. For example, an event such as a collision (e.g., a collision with a tall ground obstacle that damages a plurality of rotor-mounting arms 1610A, 1610B, and/or a rotor-mounting arm carrying a plurality of rotors) could potentially disable a number of main rotors 1602 sufficient to create flight instability that the remaining rotors 1602 cannot fully compensate for. Auxiliary rotors 1605 are optionally activated in such a condition to help maintain at least a portion of flight stability, e.g., enough to balance the aircraft long enough to execute an emergency landing. Typically, a four-rotor configuration becomes extremely difficult to stabilize in hover if reduced to a three-rotor configuration, while a five, six, or greater number of rotors will generally be readily capable of stabilization upon rotor loss.

With respect to energy budget considerations, auxiliary rotors 1605 potentially provide an advantage by reducing hovering flight thrust generation requirements on at least some of rotors 1602, thereby allowing them to be designed for more efficient forward flight (e.g., with a larger blade pitch), and/or operated with lower power (e.g., with a smaller propeller stall zone) during hovering flight. Optionally, propellers of auxiliary rotors 1605 are stowed rotated parallel to the wing once the aircraft is landed. For a two-bladed propeller configuration, this potentially reduces interference of the auxiliary rotor propellers with ground operations and/or obstacles.

Aircraft 1600 is shown without landing gear; landing gear are optionally provided, for example, as shown in FIGS. 11A-11C, or in another configuration. Compared to the aircraft of FIGS. 11A-11C, aircraft 1600 places vertical stabilization surfaces on vertical stabilizer 1622, rather than on wingtip stabilizers. In some embodiments, vertical stabilizer 1622 confers sufficient aerodynamic stability to aircraft 1600 in forward flight that active flight control for yaw stabilization (e.g., by adjustment of rotor propeller speeds and/or rotor thrusts) is optionally turned off for forward flight.

Fuselage 1640 and passenger/crew compartment 1641 optionally correspond to fuselage 1140 and passenger/crew compartment 11140.

Balance-tilting Motor Mounting Sub-Frame

Figure 2:
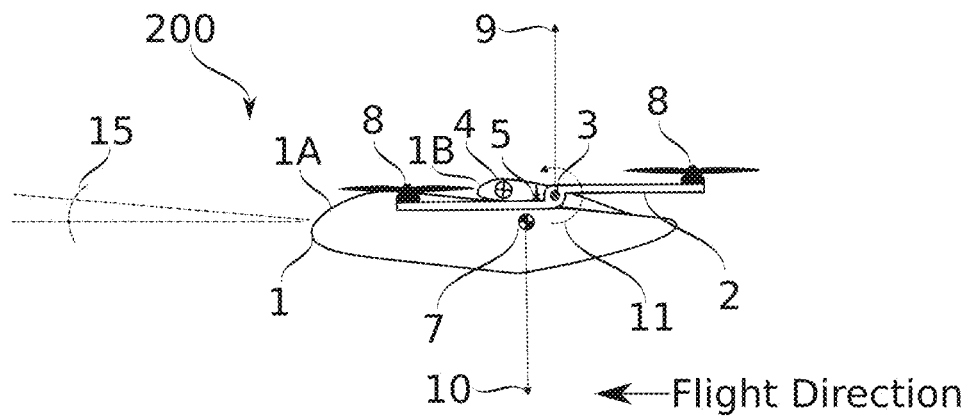
FIGS. 2, 3 and 4 schematically illustrate a transitioning-rotor orientation mechanism for an aircraft, according to some embodiments of the present disclosure.
Figure 3:
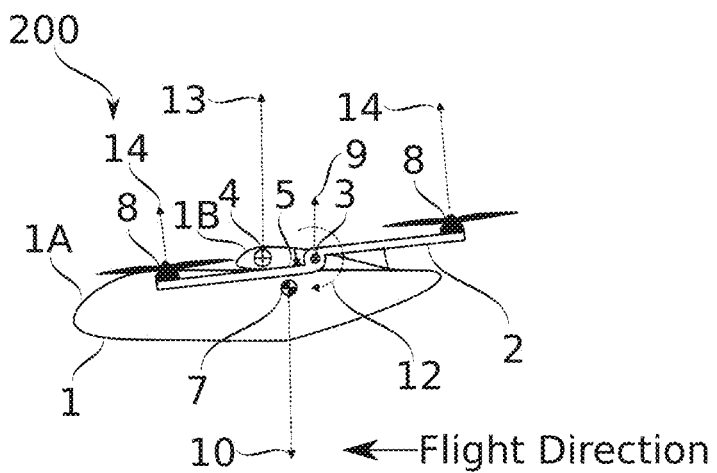
Figure 4:
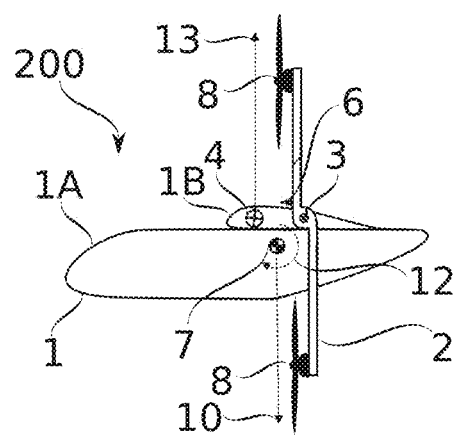

Reference is now made to FIGS. 2-4, which schematically illustrate a transitioning-rotor orientation mechanism for an aircraft 200, according to some embodiments of the present disclosure.

In some embodiments, wings 1B are pitched parallel to earth plane (wing-level) during flight and fixed to a fuselage 1A to form a wing-fuselage assembly 1. One or more motors (e.g., rotors) 8 are fixed to a sub-frame 2 that is attached to the wing fuselage assembly 1 with a hinge 3 that allows it to rotate around the air vehicle pitch axis.

In some embodiments, sub-frame 2 is free to rotate on hinge 3, but a friction device limits rotation speed.

In some embodiments, the sub-frame 2 rotation angle is limited mechanically to a maximum pitch-down angle relative to the wing and fuselage 1 that aligns motors 8 thrust with the forward axis 6 of the air-vehicle, however this angle can be less or more than the exact forward axis orientation.

The sub-frame 2 rotation angle, in some embodiments, is limited mechanically to a maximum pitch up angle relative to the wing and fuselage where the motors 8 thrust is aligned upwards and just slightly forward of the vertical axis 5 of the air vehicle 200.

The hinge longitudinal location on the fuselage and wing is behind the center of gravity 7 of the fuselage and wing assembly 1.

The hinge 3 longitudinal location on the sub-frame 2, in some embodiments, is in front of the center of gravity of the sub-frame 2. In fast forward flight, the center of lift 4 of the fuselage and wing assembly is forward of the center of gravity.

During slow speed flight, takeoff, landing and hover (FIG. 2), lift forces 13 from wing 1B are small, and the balance between gravity 10 and motors vertical lift 9 on hinge forces around hinge 3 is dominant, which causes the fuselage wing assembly 1 to rotate in pitch down direction 11 and balance at its maximum pitch down orientation relative to the sub-frame 2.

At this orientation, the sub-frame 2 generates lift forces that will cause the air vehicle to hover with fuselage 1A and wing 1B longitudinal axis with an angle 15 slightly pitched up relative to Earth plane.

At hover, the stability and maneuvering of the air vehicle are controlled, in some embodiments, using differential thrust to the motors adjusted by an electronic flight controller.

To begin forward flight, the entire air vehicle 200 uses differential thrust control to pitch down to an angle where the fuselage 1A and wing 1B longitudinal axis is parallel to Earth plane. Since at this orientation part of the motors 8 thrust is directed forward, the air vehicle 200 will start to fly forward.

As the forward speed increases (FIG. 3), the lift forces 13 generated by the fuselage and wing assembly 1 become stronger, until the torque applied by the center of lift relative to the hinge 3 is greater that the opposite torque applied at static balance by gravity 10 relative to the hinge 3. At this point, the pitch up torque applied by fuselage 1A and wing 1B on the hinge 3 causes a pitch up rotation 12 of the fuselage 1A and wing 1B relative to the hinge.

The hinge friction device, in some embodiments, optionally slows this rotation.

The flight controller is configured to sense the hinge rotation, for example by a sensor on the hinge 3, orientation sensors on sub-frame 2 and/or fuselage-wing assembly 1. The flight controller optionally applies differential thrust 14 to change the orientation of the sub-frame 2 to compensate and eliminate the fuselage and wing pitch up.

FIG. 4 shows a configuration in cruise speed where forces balance cause the sub-frame to pitch down fully to its mechanical stop 6.

Slow down process is reversed from speed up.

During forward flight, the air vehicle attitude is optionally controlled by differential thrust and/or control surfaces.

The flight control system, in some embodiments, comprises sensors, sensing the attitude (pitch orientation) of both the fuselage-wing assembly 1 and sub-frame 2, and the angle between them. This can be done by sensor on hinge 3, and/or orientation sensors on sub-frame 2 and/or fuselage wing assembly 1.

Flight control is configured, in some embodiments, to command differential thrust to maintain a targeted attitude (pitch orientation) of either the fuselage-wing assembly 1 or sub-frame 2, or an angle that is a function of the combination of both attitudes.

Optionally, the air vehicle comprises additional motors fixed on the fuselage-wing assembly. In some embodiments, the additional motors have thrust vertical and up relative to the forward flight axis, and are used only for hover and vertical takeoff and landing. Optionally, the additional motors are positioned with orientations oblique to the orientation of the wing 1B, for example as described in relation to FIGS. 1A-1O.

Additional motors are optionally used to control the attitude of the fuselage-wing assembly. The hinge can be frictionless, particularly if auxiliary motors are used. Conversely, one or more swiveling motors are optionally used primarily to adjust fuselage-wing assembly attitude. This use is optionally activated at selected moments during flight; for example during landing maneuvers, where use of an auxiliary thrust capability provides an optional alternative to variable pitch maneuvers. Swiveling out of the way (e.g., to the horizontal orientation) during forward flight potentially saves on drag; optionally, swiveling is performed by operating the swiveling motors in forward- or reverse-thrust modes to move them to their angle limits.

Motors (as such) for air vehicle 200 can include but are not limited to electric, internal combustion and/or turbine. Air thrust propulsion for this air vehicle can include but is not limited to propellers, ducted fans, jet engines, and/or rocket boosters.

Independent Thrust Control Tilting Sub-Frame

Figure 5:
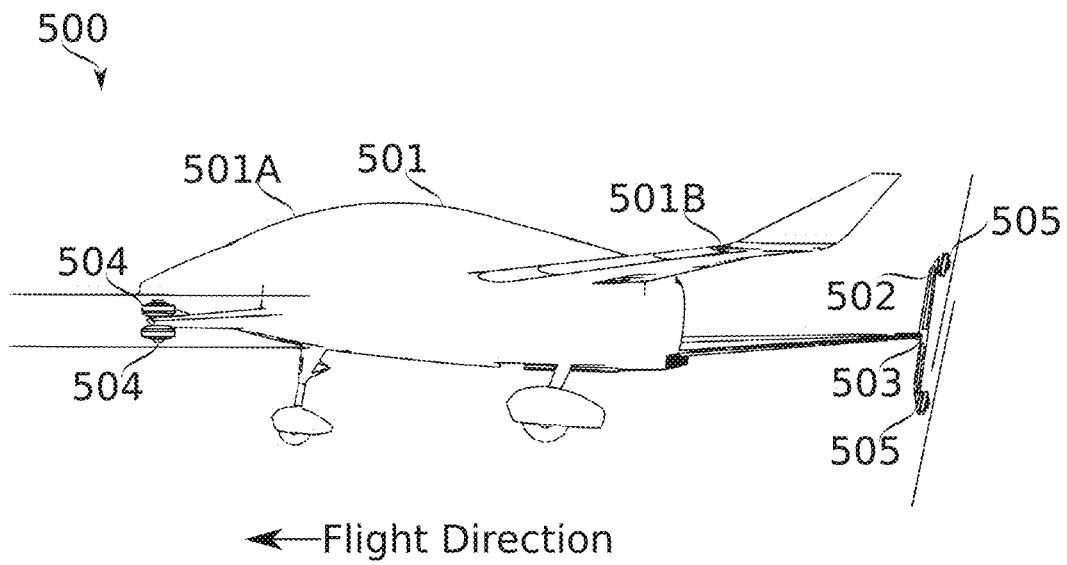
FIGS. 5 and 6 schematically illustrate a transitioning-rotor orientation mechanism for an aircraft, according to some embodiments of the present disclosure.
Figure 6:
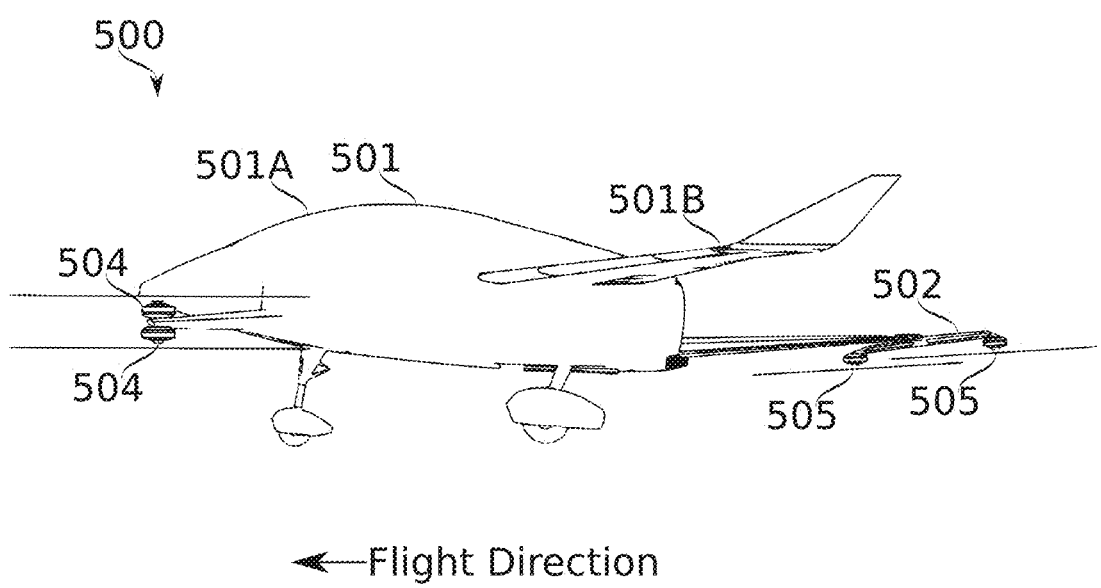

Reference is now made to FIGS. 5-6, which schematically illustrate a transitioning-rotor orientation mechanism for an aircraft 500, according to some embodiments of the present disclosure.

In some embodiments, a manned and/or unmanned aircraft 500 comprises 4 or more propellers and one or more wings, where wings 501B are configured to pitch parallel to earth plane for providing lift during flight and fixed to a fuselage 501A. A portion of the motors 504 is fixed to the fuselage-wing assembly 501 so that these motors' thrust is aligned generally upwards along the vertical axis of the air-vehicle (however this angle is optionally less or more than the exact upwards orientation). Another portion of the motors 505 is fixed to a sub-frame 502 that is attached to the wing fuselage assembly 501 with a hinge 503 that allows sub-frame 502 to rotate around the air vehicle pitch axis.

The sub-frame 502 is free to rotate on the hinge within an angle limited mechanically to a maximum pitch up angle relative to the wing 501B and fuselage 501B that generally aligns the motors' 505 thrust with the forward axis of the air vehicle 500. Optionally, this angle is less or more than the exact forward axis orientation of the aircraft.

The sub-frame 502 rotation angle is limited mechanically to a minimum pitch down angle relative to the wing 501B and fuselage 501A, at which pitch angle the thrust of motors 505 is aligned generally upwards along the vertical axis of the air-vehicle 500. Optionally, this angle is less or more than the exact upwards orientation.

The hinge 503 on sub-frame 502 is located so that there are one or more motors 505 forward of the hinge and one or more motors rear of the hinge when the sub-frame motors thrust is upward. The flight controller can sense the hinge rotation, either by sensor on the hinge, orientation sensors on sub-frame and fuselage wing assembly, or a combination of the above. The flight controller can apply differential thrust to the sub-frame motors forward and rear to the hinge to change the orientation of the sub-frame.

During takeoff (FIG. 6), landing and hover, in some embodiments, the flight controller applies differential thrust to the sub-frame motors to maintain the thrust orientation of the sub-frame motors 505 generally upward. This is done, for example, by applying more thrust to motor(s) 505 forward of the sub-frame hinge 503 and less thrust to motor(s) 505 rear of the subframe hinge 503, or whatever relative thrust keeps sub-frame 502 "pinned" against its minimum pitch down (and/or most nearly horizontal) angle.

At this orientation, the sub-frame motors 505 and the fixed motors 504 generate lift forces in a direction causing the air vehicle to hover with fuselage 501A and wing 501B oriented longitudinally parallel to Earth plane (that is, in their forward flight orientation). At hover, the stability and maneuvering of the air vehicle are controlled using differential thrust between the fixed motors 504 and the total thrust of the sub-frame motors 505. An electronic flight controller adjusts this differential thrust.

To begin forward flight (FIG. 5), differential thrust applied between sub-frame motors 505 in a relative balance opposite to that described above tilts the sub-frame 502 forward. This causes the air vehicle 500 to start flying forward. As speed increases, the wing 501B generates lift to maintain the air vehicle 500 airborne. In some embodiments, thrust of the fixed motors 504 is reduced, allowing the sub-frame 2 angle to pitch down until its thrust is directed forward.

During forward flight, the air vehicle attitude is controlled by differential thrust between the fixed motors 504, by control surfaces (e.g., of wing 501B), and/or by changes to the angle and/or total thrust of the sub-frame 502 as described above.

Optionally, during forward flight, some control configurations allow fixed motors 504 to be stopped. Motors (as such; that is, power sources) for air vehicle 500 optionally comprise, for example, electric, internal combustion and/or turbine power sources. Air thrust propulsion for air vehicle 500 optionally comprise, for example, propellers, ducted fans, jet engines, and/or rocket boosters.

Variable Pitch Propeller

Figure 7:
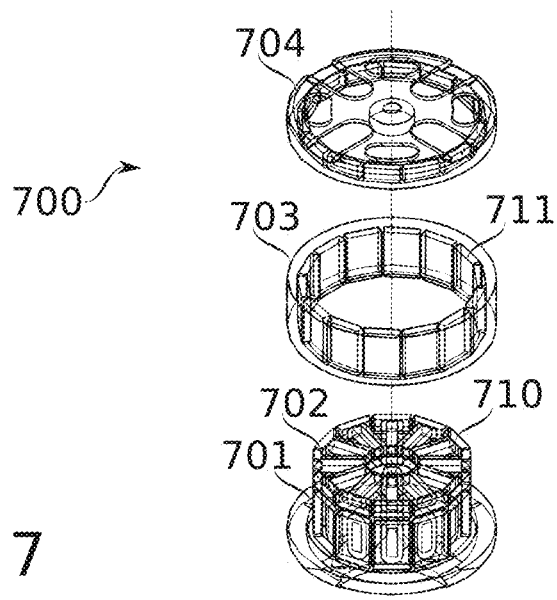
FIGS. 7, 8 and 9 schematically represent electric motor arrangements whereby an angle of attack of propeller blades can be changed during propeller rotation by applying differential thrust between two parts of the electrical motor, according to some embodiments of the present disclosure.
Figure 8:
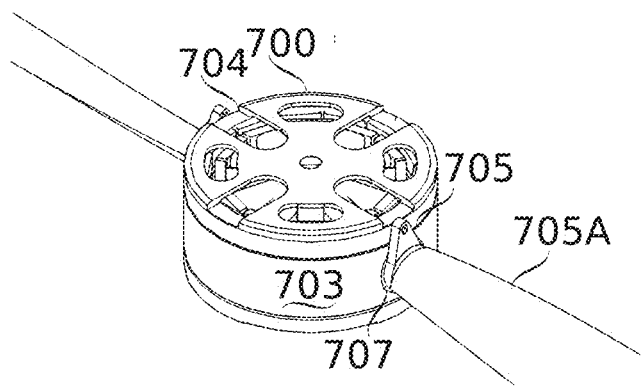
Figure 9:
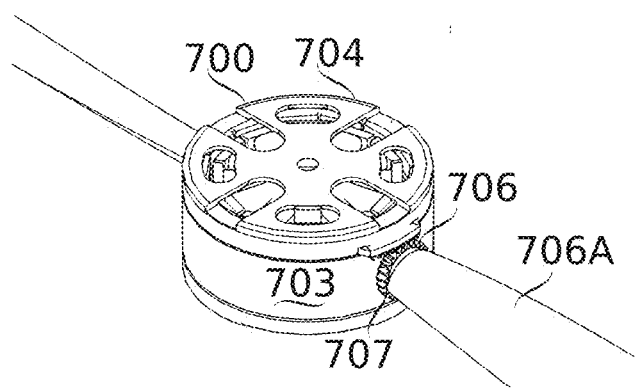

Reference is now made to FIGS. 7-9, which schematically represent electric motor arrangements whereby an angle of attack of propeller blades 705, 706 can be changed during propeller rotation by applying differential thrust between two parts of the electrical motor 700, according to some embodiments of the present disclosure.

Modification of blade angles is used, in some embodiments, to optimize propeller efficiency and power according to the axial flow speed of air through the propeller. Optionally, any of the aircraft embodiments described herein (e.g., embodiments of FIGS. 1A-1O, 10A-11E, and/or 16) are provided with variable pitch angle blades.

The electrical motor 700 (which is a "motor as such"; that is, a power source for moving propellers 705A, 706A), in some embodiments, comprises two stators 701, 702 with poles on which coils of conductive wire are wound to create a magnetic field to turn a permanent magnet rotor 703, 704.

The two stators 701, 702 are fixed one in front of (next two) the other. The two stators 701, 702 can be of similar or of different size and electrical characteristics.

Around each stator 701, 702, a corresponding free rotating rotor 703, 704 is installed on bearings or another coupling that allows rotation (to be clear, rotors 703, 704 are electro-mechanical parts of motor-as-such 700, and not self-contained propulsive units); each rotor with permanent magnets that face the stator coils. The two rotors 703, 704 can be of similar or of different size and magnetic characteristics.

In some embodiments, on one rotor 703, the blades 705A, 705B (FIGS. 8, 9) are attached with free rotating hinge 707 that allows rotation in a direction that can cause change in the blade angle of attack relative to the rotation plane of the blades 705A, 705B.

Each blade 705A is also connected to the second rotor 704, for example, by a lever 705 hinged to the second rotor 704), or by a toothed mechanism 706 comprising, for example, a cog or part of cog with teeth intermeshing into another cog or part of cog on the second rotor 704.

The connection to the second rotor 704 is configured so that a difference in position between the two rotors 703, 704 causes a change in the angle of attack of the blades 705A, 705B.

Power is provided to each stator 701, 702 from an electronic motor controller unit. The two electronic motor controller units' output power is commanded by an electronic controller.

This electronic controller receives throttle and propeller pitch command from, for example, the vehicle controls and/or from an electronic controller.

In some embodiments, the controller commands separate power levels to the two electronic motor controllers. Optionally, the sum of power provided by the two units is equal to the thrust required by throttle command. Optionally, and without commitment to any particular theory of operation, a difference in power (that is, a change in power) between (that is, exerted on) the two electronic motor controllers causes adjustment in a propeller pitch angle required by pitch command. Additionally or alternatively, and without commitment to any particular theory of operation, changing the separate power levels commanded by the controller alters forces applied to the base propeller blades, adjusting the propeller pitch angle. Optionally, one of the electrical motors is considerably stronger than the other, and exerts most of the force causing blade rotation and thrust generation. The weaker electrical motor is strong enough to overcome (working through the leverage of its linkage to the blade) forces tending to twist the propeller blade as it moves through the air.

This variable pitch method can be used in other applications where an electric motor with propeller is used for creating thrust in air or water.

Optionally, a sensor is used to control and/or confirm the pitch angle.

In some embodiments, each individual blade receives its own pitch-angle controlling stator/rotor combination, e.g., a main power stator/rotor set and four pitch-controlling stator/rotor sets, one for each of four blades. The mechanical linkages are configured differently from each other to accommodate the different relative blade-stator/rotor positions. In some embodiments, this individualized blade attitude control is operated to continuously vary the blade pitches during rotation to achieve cyclic blade control capabilities like those of a helicopter. Helicopters use cyclic blade control to change roll and pitch. While a multicopter can achieve roll/pitch control by differential operation of its rotors, the addition of cyclic blade control potentially allows, e.g., a rotor located in a more inboard position (near the center of gravity) to play a larger role in attitude control than would otherwise be achieved.

Optional Electric Motor Design and Control Method

Figure 13:
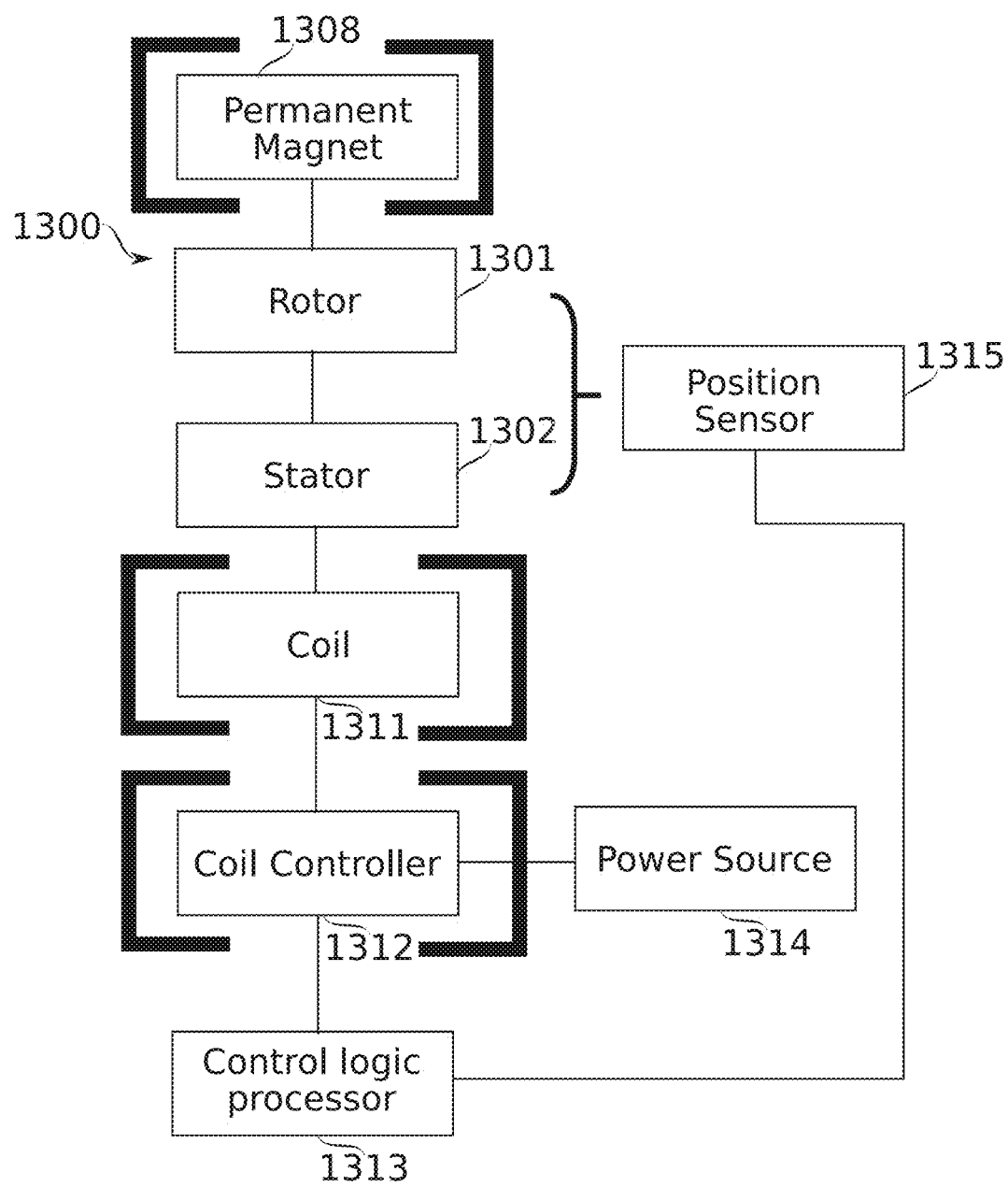
FIG. 13 is a schematic block diagram of an electrical motor (as such), according to some embodiments of the present disclosure.

Reference is now made to FIG. 13, which is a schematic block diagram of an electrical motor (as such) 1300, according to some embodiments of the present disclosure. Bracketed blocks indicated units which are included in the motor multiple times.

In some embodiments, an electrical motor 1300 (as such; which may additionally be, for example, electric motor 700 of FIG. 7) comprises at least one stator (e.g., stator 1302) with coils 1311 of conductive wires and a rotor 1301 (that is, a rotor component of electrical motor 1300) comprising permanent magnets 1308 similar to common brushless electric motors; however, unlike common electric brushless motors, each coil 1311 on the stator of embodiments of the presently described electrical motor is wound by its own conductive wire, which is not connected to other coils 1311. In common brushless motors, several coils are wound by a single wire to create a phase, and phases are connected to each other in different pair combinations (e.g., each of the six pairing and polarity combinations of a three-phase motor) to successively push the stator in circles.

Also, in some embodiments, each coil 1311 has its own controller unit 1312, comprising electrical power switching components. Switching components can optionally switch between providing power to the coil at a determined polarity or inverted polarity to create north or south magnetic field at the edge of coil, or disconnect power from coil. Switching between these three options can be toggled repeatedly at very high rates, for example at up to thousands of Hertz.

The targeted state of each switching unit on each coil 1311 is determined in turn by logic circuitry and/or control microprocessor 1313.

Optionally, a logic circuitry or control microprocessor 1313 can be mounted on each controller unit of each coil, and/or at a central logic circuitry or control microprocessor (for example as shown) connected and controlling all coils' power switching units.

Power from battery or other external source 1314 is distributed to all coil control units by positive and negative polarity DC buses connected to all coil control units.

Optionally, rotor position sensors 1315 (for example of any one or more of types known in common brushless motors) can be used to determine rotor 1301 position in relation to stator 1302, to allow logic circuitry or microprocessor 1314 to time switching during motor 1300 operation. Optionally, power is determined by sensing current generated on any currently unpowered coil 1311 (using back EMF).

A potential advantage of motor 1300 over common brushless motors is that all coils can be used to power the motor most of the time, unlike common 3-phase brushless motors where only ⅔ of coils are energized at any given moment. This potentially increases torque and power of the invented motor per weight of motors in relation to common brushless motors.

In some embodiments, other potential advantages include weight savings and/or power loss reduction by elimination of wires running between coils and phase wires exiting the motor and connecting to an external controller.

Another potential advantage is that, while with common brushless electric motors a failure of the motor controller results in failure of the motor, electric motor 1300 includes redundancy wherein failure of a coil controller 1312 causes partial power reduction, about proportional to the rated power of the motor 1300 divided by the number of coils 1311.

There are also potential advantages for manufacturing: while manufacturing process of common motors requires winding of the entire motor, motor 1300 is easily assembled from identical and separate coils 1311, each with its own control unit 1312. It is also possible to replace a single coil 1311 for maintenance without needing to unwind and rewind the entire motor 1300.

Motor 1300 is optionally configured with stator 1302 as its inner component and permanent magnet rotor 1301 on the outside or with stator 1302 on the outside and permanent magnet rotor 1301 on the inside, or with stator 1302 and rotor 1301 one above the other in a direction along a rotational axis of motor 1300, or in any other relative position used in common brushless motors.

Any size and number of stator coil 1311 and rotor magnet 1308 pairs can be used.

Propeller Guard

Figure 14A:
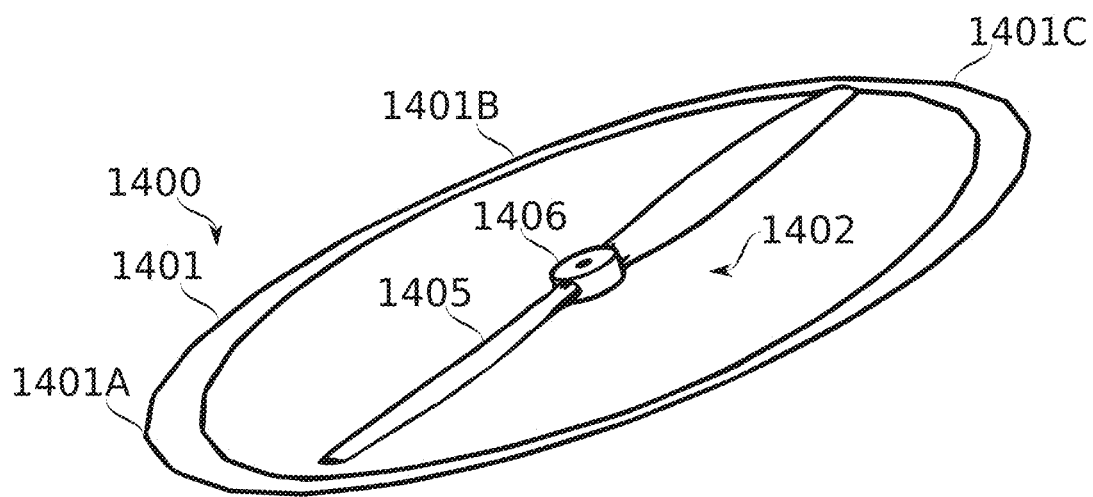
FIGS. 14A-14C schematically represent an angled propeller guard of an aircraft, according to some embodiments of the present disclosure.
Figure 14B:
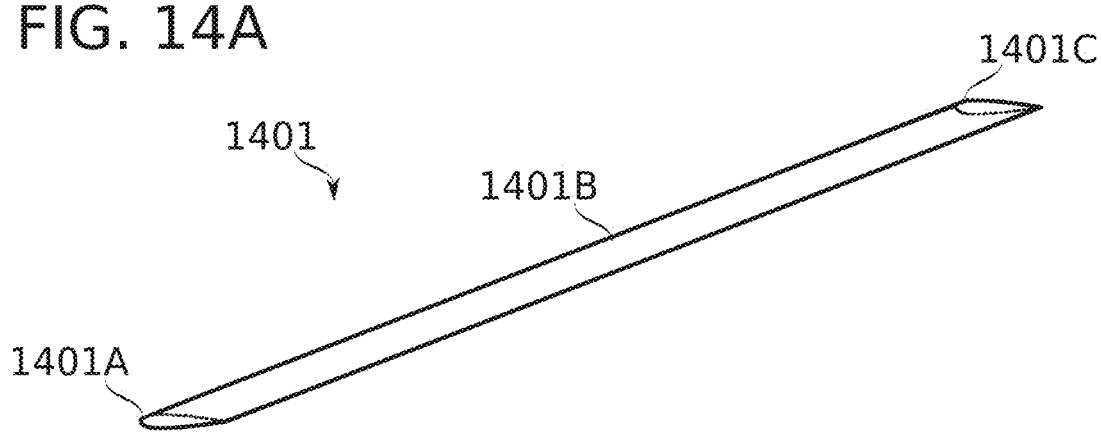
Figure 14C:
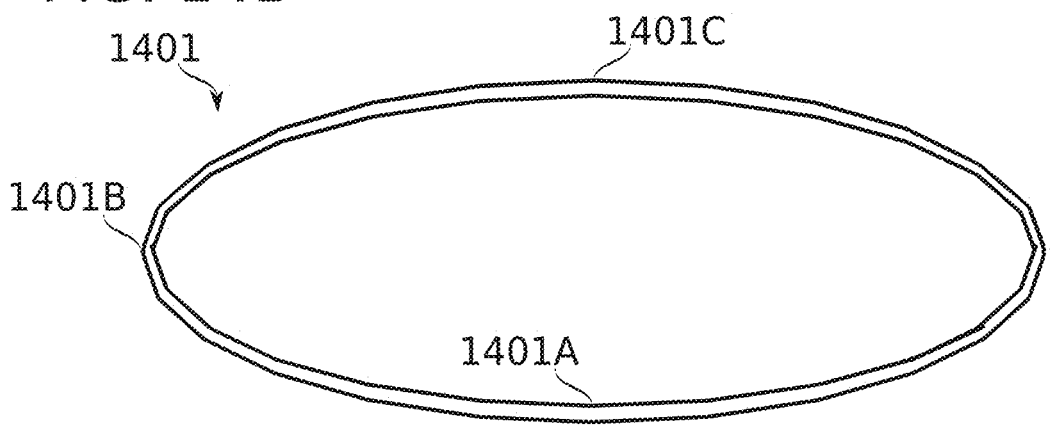

Reference is now made to FIGS. 14A-14C, which schematically represent an angled propeller guard 1401 of an aircraft, according to some embodiments of the present disclosure.

FIG. 14A shows rotor installation 1400 including rotor guard 1401 along with rotor 1402. Rotor 1402 comprises at least one motor 1406 and associated propeller blades 1405. In some embodiments, rotor guard 1401 is oriented in about the same plane as propeller 1402.

FIG. 14B shows rotor guard 1401 as it would be seen from the aircraft side. FIG. 14C shows rotor guard 1401 as it would be seen from the front of the aircraft, and slightly above rotor guard 1401. In some embodiments, rotor guard 1401 has a forward section 1401A which is relatively flattened in cross-section to a horizontally longer (in a horizontal-radial direction), vertically shorter shape. Optionally, this approximates a wing- or wing-like cross-section. Optionally, this wing-like cross-section is oriented with its optimal angle of attack the same as the optimal angle of attack of a wing 120 of the aircraft.

Mid-sections 1401B of rotor guard 1401 are more vertically oriented, in some embodiments—that is, vertically longer and horizontally shorter (in a horizontally-radial direction). Rear section 1401C is optionally flattened in cross-section, for example, to the same shape as forward section 1401A. The overall shape of rotor guard 1401 is optionally understood as comprising roughly a short oblique cylinder, wherein the top and bottom of the short cylinder are shifted in one direction relative to each other. Optionally, the shifting allows rotor guard 1401 to present a minimal profile to the direction of forward flight.

Potential advantages of rotor guard 1401 include minimization of drag by the propeller guard 1401, and even a potential contribution of lift from the propeller guard 1401. In some embodiments, the whole rotor installation 1400 comprises a plurality of rotors (e.g., a stack of two contra-rotating propellers). Rotor guard 1401 is optionally tilted so that it also crosses the propeller stack at a slight oblique angle, e.g., in the front, it is level with the lower rotor, and at the back it is level with the upper rotor.

Coordinated Power Delivery

Figure 15:
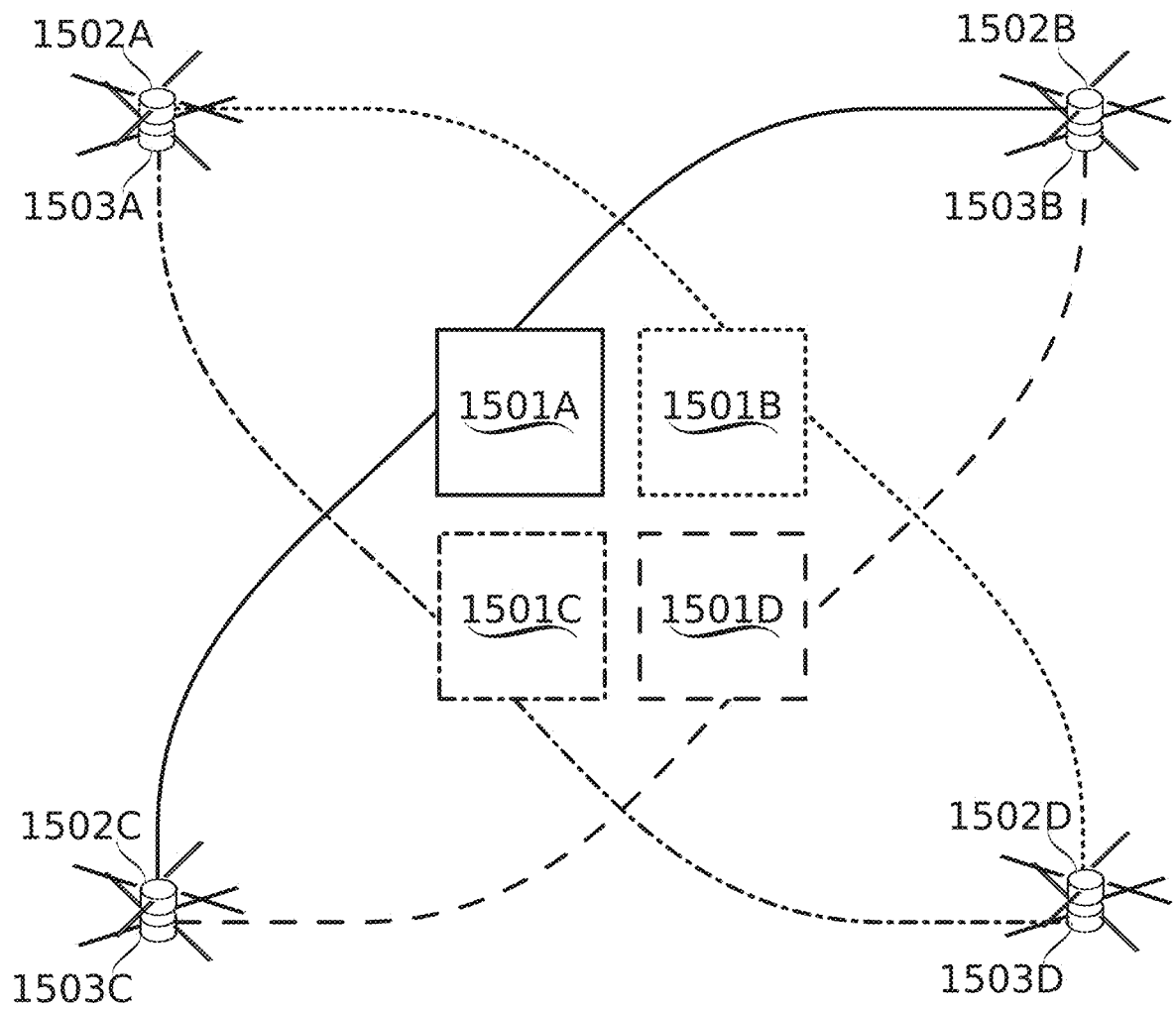
FIG. 15 schematically represents power connectivity for a plurality of battery units connecting to a plurality of motors, according to some embodiments of the present disclosure.

Reference is now made to FIG. 15, which schematically represents power connectivity for a plurality of battery units 1501A, 1501B, 1501C, 1501D connecting to a plurality of motors 1502A, 1502B, 1502C, 1502D, 1503A, 1503B, 1503C, 1503D, according to some embodiments of the present disclosure. The motors are shown in approximations of their physical placement around the perimeter of an aircraft; the physical placement of the battery unites is optionally in any suitable configuration. Motors are paired as contrarotating dual-rotor assemblies, i.e., 1502A and 1503A, 1502B and 1503B, 1502C and 1503C, and 1502D and 1503D.

Several embodiments of the present disclosure describe motor arrangements including motors positioned at diagonally opposite corners of the aircraft. A class of potentially unstable flight modes arises when a rotor or rotors of a single corner of the aircraft become weakened or inoperable. In this mode, the rotor or rotors at the opposite corner may provide sufficient thrust to flip the aircraft before control can be asserted to prevent this. For example, if motor 1502B became inactive, any thrust exerted from motor 1502C would tend to rotate the whole aircraft around an axis extending roughly parallel to a line between motor(s) 1502A and 1502D.

In an electrically powered system, one of the ways that failure of rotor(s) potentially occurs is by battery failure. In some embodiments of the present disclosure, rotor powering is distributed among a plurality of battery units so that battery unit failure affects rotors in sets with mutually balanced roles in aircraft stabilization. Optionally (for example, as shown in FIG. 15), a plurality of separate battery units powers each rotor set.

Thus, for example, motors 1502B and 1502C are attached in common to battery unit 1501A; motors 1503B and 1503B are attached in common to battery unit 1501D. Motors 1502A and 1502D are attached in common to battery unit 1501B; motors 1503A and 1503D are attached in common to battery unit 1501C. Failure of any single battery unit would leave the remaining rotor sets still operating in balance. For purposes of descriptions herein, rotors in a set of "balanced role" rotors are positioned so that they act from opposite corners relative to the aircraft's center of gravity and a frame of reference set by its normal direction of forward flight movement: i.e., laterally offset from the center of gravity both away from a center axis extending from the front of the aircraft to its rear, and a horizontal axis transverse to the center axis. In some embodiments, rotors in a balanced role moreover have at least one rotor positioned between them, e.g., since if they did not, they would tend to allow an uncontrolled diagonal axis of rotation extending between them.

Flight Controller

Figure 17:
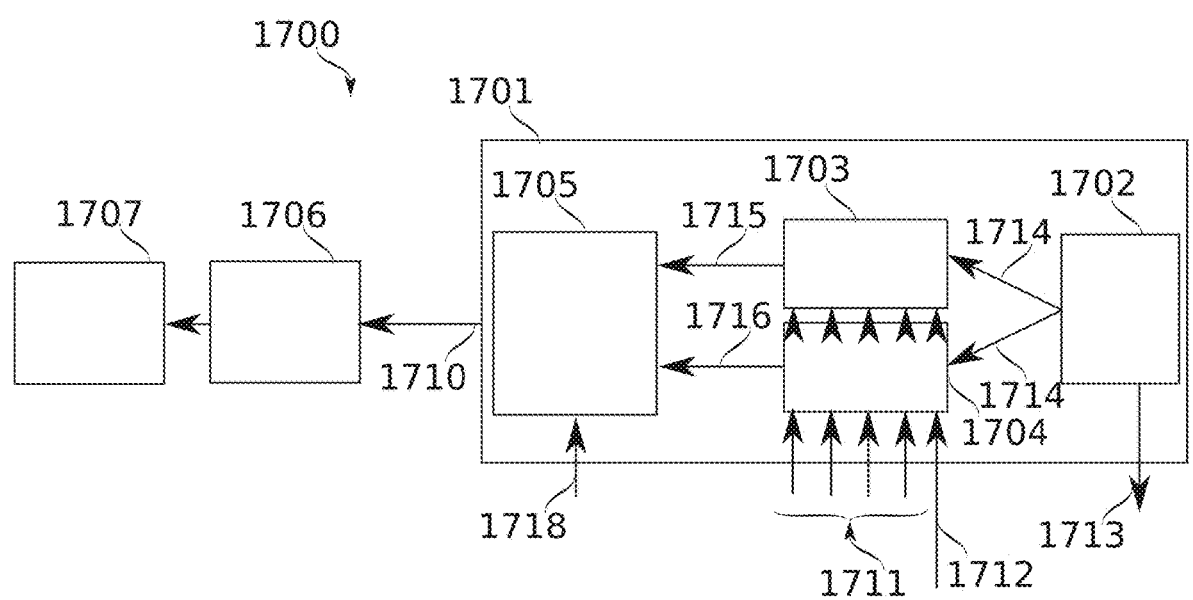
FIG. 17 schematically represents a control unit of a distributed flight control system, according to some embodiments of the present disclosure.

Reference is now made to FIG. 17, which schematically represents a control unit 1700 of a distributed flight control system, according to some embodiments of the present disclosure.

In some embodiments, all elements of control unit 1700 are provided to each individual rotor (and optionally each motor/propeller subunit of a multi-propeller rotor). This provides a potential advantage that failure of a single flight controller 1701 seriously affects operation of only a single motor.

In some embodiments, flight controller 1701 comprises an optional inertial measurement unit 1702 (IMU), modules for performing rates calculation 1703 (in each of three spatial axes) and/or attitude calculation 1704 based on flight measurement data 1714 received from IMU 1702, flight measurement data 1711 received from other flight controllers 1701, and optionally flight measurement data 1712 from a central IMU. In embodiments comprising an individual IMU per control unit 1700, flight measurement data 1713 is output to other flight controllers.

Current calculated rates 1715 and attitude 1716 are forwarded to command calculating unit 1705, which uses these along with control inputs 1718 (e.g., received from a control stick, mission controller, and/or attitude command) to produce a power command 1710 provided to motor controller 1706. Motor controller 1706 in turn controls power of a motor (e.g., a power source of a rotor) 1707. Optionally, control commands delivered along with power command 1710 includes other aspects of the operation of motor 1707, for example blade pitch, differential control of the propellers of a rotor comprising a plurality of propellers, or another control aspect.

In some embodiments, each flight controller 1701 is located at a position mounted close to the motor 1707. As a result, sensing by IMU 1702 automatically take into account airframe and/or strut flex (flex of the aircraft frame), which potentially improves control response time and/or precision. For example, a central IMU potentially does not sense the full and/or immediate change in orientation of rotor thrust when a motor command is given, due to an absorption of some of the rotor thrust attitude change by flexing of a mounting strut. Locating IMU 1702 close to motor 1707 potentially reduces this type of sensing skew.

Optionally, an average or other combination and/or selection of sensor data is used. In some embodiments, a targeted state of the aircraft is the same for all flight controllers 1701, and based on an estimated current flight state of the aircraft accessible by all the flight controller 1701. In some embodiments, the estimated current flight state is calculated, e.g., by a central controller which receives input from the aircraft's flight controllers, and distributes the result back to them. Additionally or alternatively, the estimated current flight state of the overall aircraft is calculated at each individual flight controller 1701 using flight data 1711 from a same common group of IMUs 1702; optionally all IMUs 1702. Optionally, data from one or more IMUs 1702 is excluded from the calculation, e.g., because it fails to correlate with flight data from other IMUs, or for another reason.

In some embodiments, rate and attitude calculations give preference to local IMU data 1714, but use comparisons with other available IMU data 1711, 1712 to validate it. In some embodiments, data from local IMU 1714 is given particular preference and/or relevance during more dynamic flight periods (changes in control inputs, for example), potentially increasing response speed and/or reducing control resonances.

With particular respect to attitude, attitude calculation module 1704 optionally uses an average or other combination and/or selection of all available inputs (e.g., most extreme sensed attitude consistent with normally expected measurement variability), potentially avoiding attitude sensing skew from causing different rotors to attempt to maneuver the aircraft to different attitudes.

When local data is found to give unreasonable differences from the consensus of other inputs (e.g., different than the majority of other inputs by a physically unrealistic amount, assuming the airframe is intact), it is optionally ignored in favor of other available data. Similarly, individual inputs from other data sources are optionally ignored when they produce unreasonable readings contradicted by, e.g., a majority of other data sources.

Optionally, the other available IMU data 1711, 1712 allow the local flight controller 1701 to make more sophisticated control decisions, e.g., taking into account how other control units 1700 are likely to react. Optionally, rotors are configured to provide "watchdog" signals to each other indicating their continuing functional status, and/or report to each other when they fail and/or partially fail to operate normally. Optionally, the flight control system modules enter a fallback mode which relies more fully on independent control (or, alternatively, more fully on centralized control) when it is sensed that one or more of the rotors has ceased to report and/or operate normally. Optionally, which of central and independent control is selected depends on the pattern of failure detected.

However, it is a potential advantage for simplicity and/or flight characteristic analyzability for each flight controller to rely, at least normally, entirely or almost entirely on its own sensor readings. These can, in any case, be understood as also inherently "sensing", en masse, the combined behavior of the rest of the control system. Insofar as each individual flight controller 1701 "knows" what state its own IMU data should be in for responding a given set of control inputs 1718, it can act to increase power, decrease power, or otherwise control motor 1707 to move the speed and orientation of the aircraft toward that target state.

In some embodiments of the invention, a flight controller 1701 (optionally, another flight controller configuration) is configured to control yaw by controlling the rotational speed of just one propeller spin direction of a rotor comprising a plurality of contra-rotating propellers. Optionally, the rotors are oriented with a tilt that directs some thrust in the yaw direction. This control method potentially allows both yaw thrust and yaw torque to be used in exerting yaw authority, for example as described in the Overview.

General

It is expected that during the life of a patent maturing from this application many relevant power sources for driving thrust generating motors will be developed; the scope of the term power source is intended to include all such new technologies a priori.

As used herein with reference to quantity or value, the term "about" means "within ±10% of".

The terms "comprises", "comprising", "includes", "including", "having" and their conjugates mean: "including but not limited to".

The term "consisting of" means: "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

The words "example" and "exemplary" are used herein to mean "serving as an example, instance or illustration". Any embodiment described as an "example" or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the present disclosure may include a plurality of "optional" features except insofar as such features conflict.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

Throughout this application, embodiments may be presented with reference to a range format. It should be understood that the description in range format is merely for convenience and brevity and should not be construed as an inflexible limitation on the scope of descriptions of the present disclosure. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Although descriptions of the present disclosure are provided in conjunction with specific embodiments, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

It is appreciated that certain features which are, for clarity, described in the present disclosure in the context of separate embodiments, may also be provided in combination in a single embodiment. Conversely, various features, which are, for brevity, described in the context of a single embodiment, may also be provided separately or in any suitable subcombination or as suitable in any other described embodiment of the present disclosure. Certain features described in the context of various embodiments are not to be considered essential features of those embodiments, unless the embodiment is inoperative without those elements.

In addition, any priority document(s) of this application is/are hereby incorporated herein by reference in its/their entirety.

What is claimed is:

1. An aircraft comprising:
a wing; and
motor assemblies including:
a first set of one or more motor assemblies positioned, when the aircraft is in a level forward flight mode, above the wing and behind a center of gravity of the aircraft, and
a second set of one or more motor assemblies positioned, when the aircraft is in the level forward flight mode, below the wing and in front of the center of gravity,
wherein at least one of the first and second sets of motor assemblies includes a plurality of motor assemblies, of which said plurality of motor assemblies there is, respectively, at least one motor assembly positioned on either side of a midline plane passing longitudinally along the aircraft and through the center of gravity;
wherein:
each motor assembly is configured to generate thrust by movement of air past the motor assembly along a respective axis of thrust of the motor assembly;
the orientations of the axes of thrust are each fixed, during operation of the aircraft, at a constant respective pitch angle oblique to the pitch orientation of the wing;
the first and second sets of motor assemblies are operable together to both fully support the aircraft in a hovering mode, and to fully propel the aircraft forward in the level forward flight mode; and
the orientations of the axes of thrust are oriented within 30° of each other.

2. The aircraft of claim 1, wherein the wing is configured to provide at least 25% of lift needed to support the weight of the aircraft in the forward flight mode, at a speed above 55 km/h generated by thrust from the plurality of motor assemblies.

3. The aircraft of claim 2, wherein the wing provides at least 50% of lift needed to support the aircraft against the acceleration of gravity in the forward flight mode, at a speed generated by thrust from the plurality of motor assemblies.

4. The aircraft of claim 1, wherein the axes of thrust are oriented between about 55°-80° away from the pitch orientation of the wing.

5. The aircraft of claim 1, wherein the plurality of motor assemblies is operable to fully support the aircraft during ground-stationary hovering of the aircraft as well as to fully maintain its ground-stationary position during said hovering.

6. The aircraft of claim 5, wherein the plurality of motor assemblies is operable to provide horizontal thrust to the aircraft, while fully supporting the weight of the aircraft.

7. The aircraft of claim 6, wherein the plurality of motor assemblies is operable to provide horizontal thrust to the aircraft, while fully supporting the aircraft against downward acceleration due to gravity, and while the aircraft is pitched with the wing at its most efficient angle of attack.

8. The aircraft of claim 1, wherein at least two of the plurality of motor assemblies is mounted within a span of the wing.

9. The aircraft of claim 1, wherein the wing is configured to provide less than 100% of lift needed to support the weight of the aircraft in the forward flight mode.

10. The aircraft of claim 1, configured to rotate through a pitch angle from a hovering orientation using thrust from the plurality of motor assemblies to a forward flight orientation with the wing at its most efficient angle of attack, while the motor assemblies fully support the aircraft against downward acceleration due to gravity.

11. The aircraft of claim 1, wherein the aircraft is configured to rotate through a pitch angle from a grounded orientation of the aircraft resting on level ground to a hovering orientation using thrust from the plurality of motor assemblies by pitching a nose of the aircraft upward.

12. The aircraft of claim 1, wherein the aircraft is sized to carry at least one human passenger.

13. The aircraft of claim 1, comprising a fuselage attached to the wing, and wherein the motor assemblies are attached to the aircraft through the fuselage.

14. The aircraft of claim 1, wherein the oblique pitch angles between the axes of thrust and the pitch orientation of the wing are less than 75°.

15. The aircraft of claim 1, wherein the oblique pitch angles between the axes of thrust of at least the first set of one or more motor assemblies and the pitch orientation of the wing are greater than 45°.

16. The aircraft of claim 1, comprising landing gear, wherein a plane of contact of the landing gear with the ground with the aircraft at rest on the ground is oblique to both the pitch orientation of the wing and the axes of thrust of the plurality of motor assemblies.

17. The aircraft of claim 1, wherein, in the forward flight mode, the second set of one or more motor assemblies generates more thrust than the first set of motor assemblies.

18. The aircraft of claim 1, wherein, in the forward flight mode, thrust from the second set of one or more motor assemblies is oriented more nearly horizontally than thrust from the first set of motor assemblies.

19. The aircraft of claim 1, wherein the forward flight mode is a mode of level flight wherein the wing is oriented to its most efficient angle of attack.

20. The aircraft of claim 1, wherein the wing does not intersect with any right cylinder, wherein the right cylinder is:
   centered on any motor assembly,
   has a central longitudinal axis aligned with the axis of thrust of the motor assembly, and
   has a radius equal to a radius of a propeller of the motor assembly.

\* \* \* \* \*